United States Patent
Yeo et al.

(10) Patent No.: US 10,693,599 B2
(45) Date of Patent: *Jun. 23, 2020

(54) METHOD AND APPARATUS FOR PARTIAL RETRANSMISSION IN WIRELESS CELLULAR COMMUNICATION SYSTEM

(71) Applicant: Samsung Electronics Co., Ltd., Gyeonggi-do (KR)

(72) Inventors: Jeongho Yeo, Gyeonggi-do (KR); Sungjin Park, Incheon (KR); Jinyoung Oh, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,050

(22) Filed: Nov. 6, 2019

(65) Prior Publication Data

US 2020/0076543 A1 Mar. 5, 2020

Related U.S. Application Data

(63) Continuation of application No. 16/416,843, filed on May 20, 2019, which is a continuation of application
(Continued)

(30) Foreign Application Priority Data

Nov. 24, 2016 (KR) .................. 10-2016-0157171
Dec. 23, 2016 (KR) .................. 10-2016-0177820

(51) Int. Cl.
*H04L 1/18* (2006.01)
*H04W 84/04* (2009.01)

(52) U.S. Cl.
CPC .......... *H04L 1/1812* (2013.01); *H04L 1/1896* (2013.01); *H04W 84/042* (2013.01)

(58) Field of Classification Search
CPC .................................................. H04L 1/1812
(Continued)

(56) References Cited

U.S. PATENT DOCUMENTS

| 2009/0313516 A1 | 12/2009 | Shin et al. |
| 2011/0004799 A1 | 1/2011 | Shimanuki et al. |
| 2017/0303284 A1 | 10/2017 | Xu et al. |

FOREIGN PATENT DOCUMENTS

| EP | 3 200 376 | 8/2017 |
| KR | 1020150078668 | 7/2015 |
| WO | WO 2015/184919 | 12/2015 |

OTHER PUBLICATIONS

Samsung, "Partial Retransmission for eMBB", R1-1612535, 3GPP TSG RAN WG1 Meeting #87, Nov. 14-18, 2016, 3 pages.
(Continued)

*Primary Examiner* — Joel Ajayi
(74) *Attorney, Agent, or Firm* — The Farrell Law Firm, P.C.

(57) ABSTRACT

A communication method and system are provided for converging a 5G communication system for supporting higher data rates beyond a 4G system with an IoT technology. A method by a base station in a wireless communication system includes transmitting, to a terminal, first information related to a number of code block groups (CBGs) included in a transport block (TB), wherein the first information is transmitted to the terminal by radio resource control (RRC) signaling; determining CBGs for the TB based on a number of code blocks (CBs) included in the TB and the first information, wherein the determined CBGs include a first group of a first number of CBs and a second group of a second number of CBs, and wherein the first number of CBs and the second number of CBs are determined based on dividing of the number of CBs included in the TB by the number of CBGs associated with the first information;
(Continued)

transmitting, to the terminal, the determined CBGs and control information including second information related to transmission of the TB and third information; and receiving, from the terminal, feedback information for the TB transmitted based on the determined CBGs.

12 Claims, 27 Drawing Sheets

Related U.S. Application Data

No. 15/821,358, filed on Nov. 22, 2017, now Pat. No. 10,298,362.

(58) Field of Classification Search
USPC .......................................................... 370/328
See application file for complete search history.

(56) References Cited

OTHER PUBLICATIONS

MediaTek Inc., "Discussion on Throughput Enhancement with Multiple HARQ-ACK/NACK Bits Per TB", R1-1612137, 3GPP TSG RAN WG1 Meeting #87, Nov. 14-18, 2016, 3 pages.
International Search Report dated Mar. 23, 2018 issued in counterpart application No. PCT/KR2017/013548, 3 pages.
Nokia, Alcatel-Lucent Shanghai Bell, "CRC attachment for eMBB data", 3GPP TSG-RAN WG1 #87, Reno, U.S.A., Nov. 14-18, 2016, R1-1612279, pp. 4.
European Search Report dated Oct. 18, 2019 issued in counterpart application No. 17873376.2-1219, pp. 8.

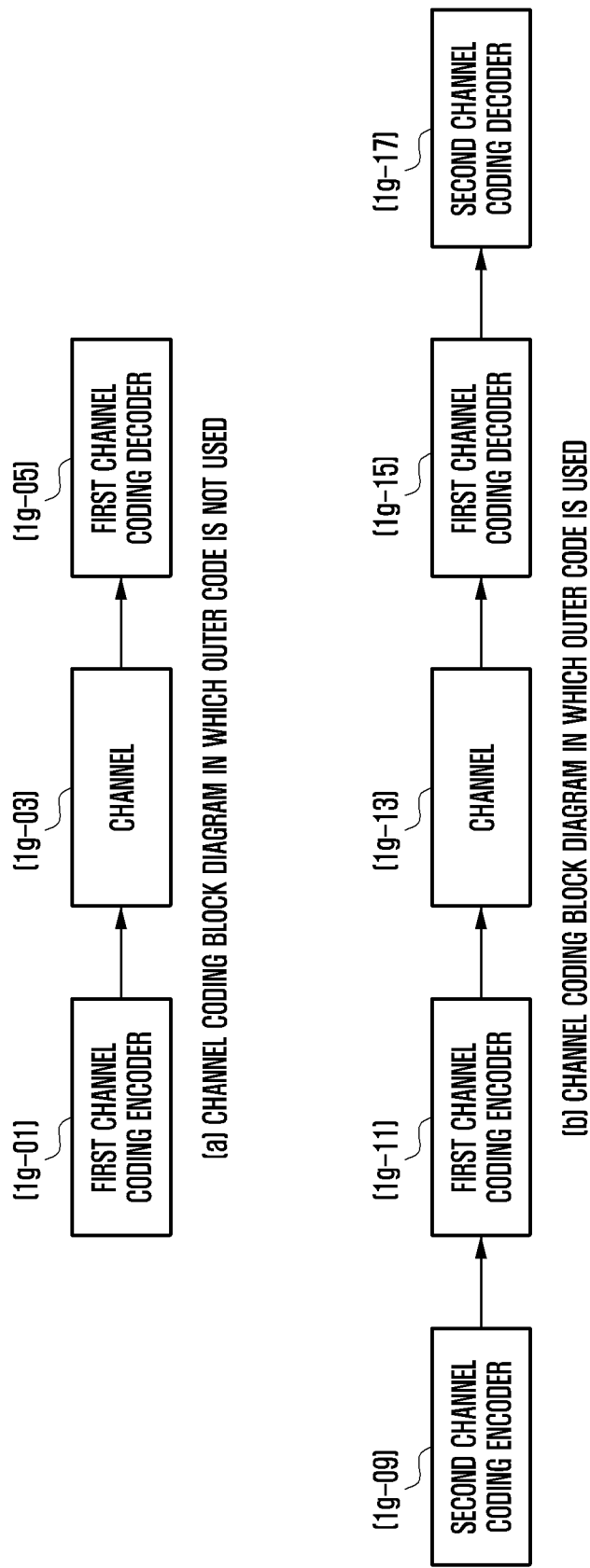

FIG. 1H
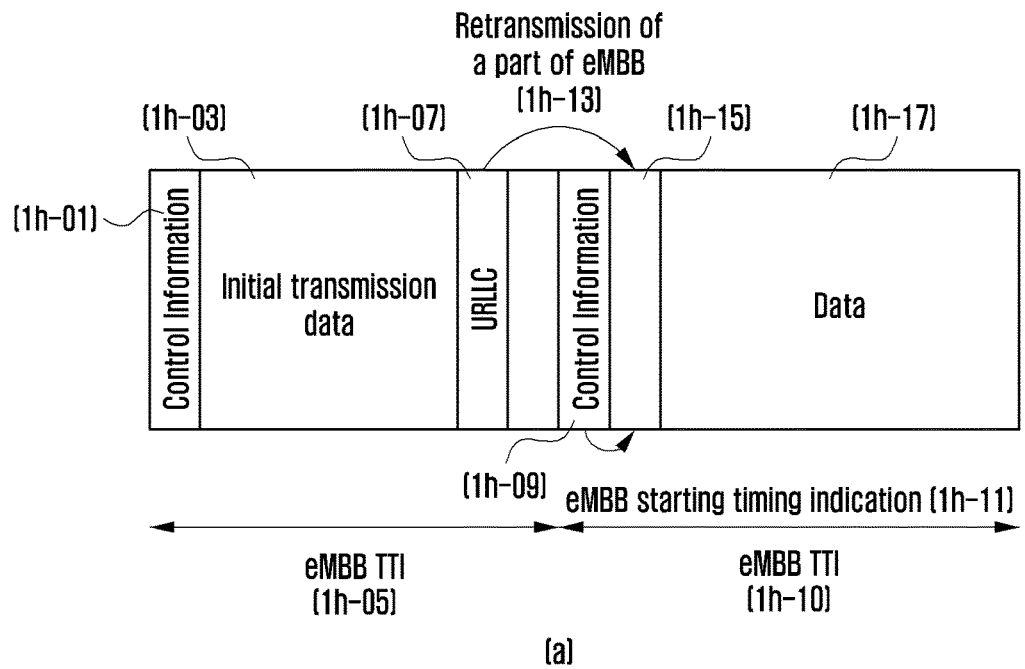
(a)
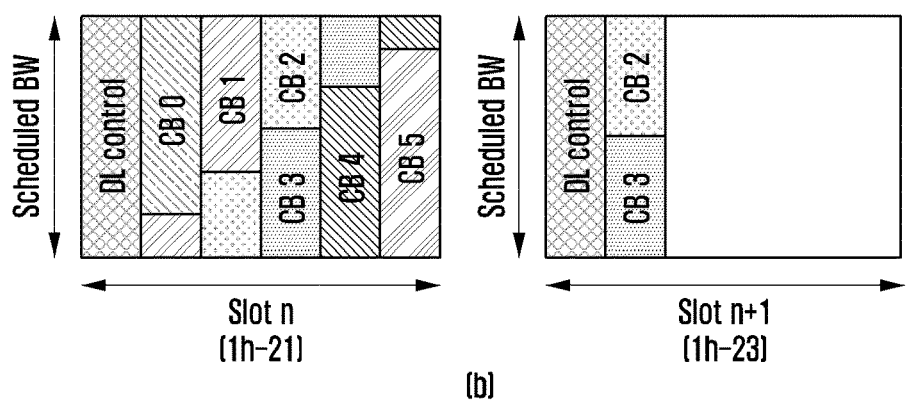
(b)
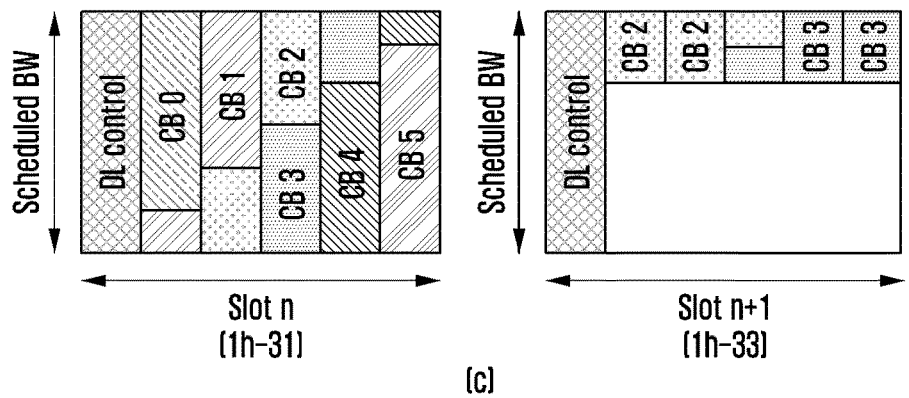
(c)

FIG. 1KE
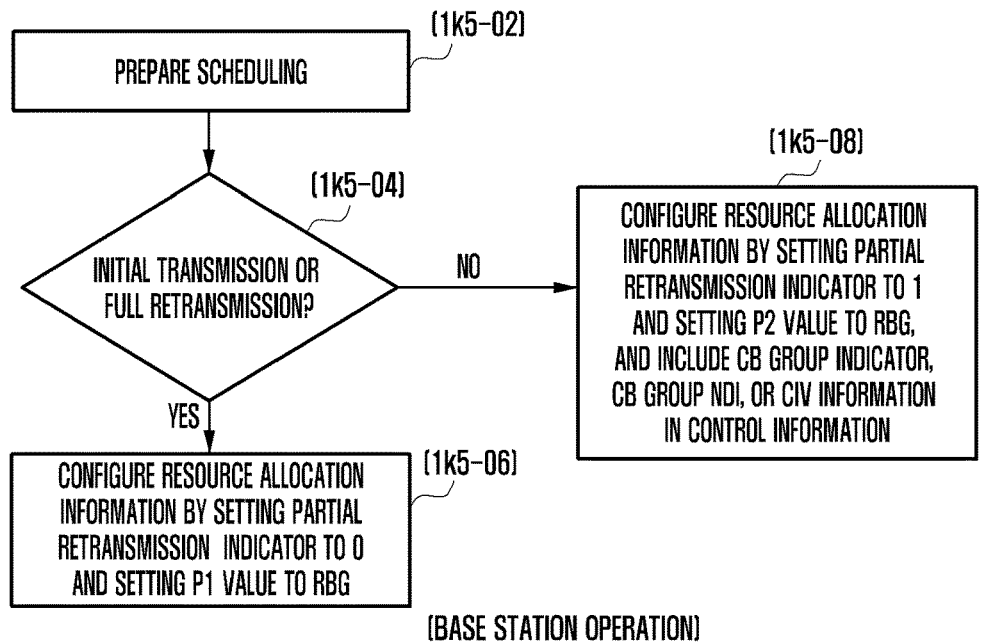
(BASE STATION OPERATION)
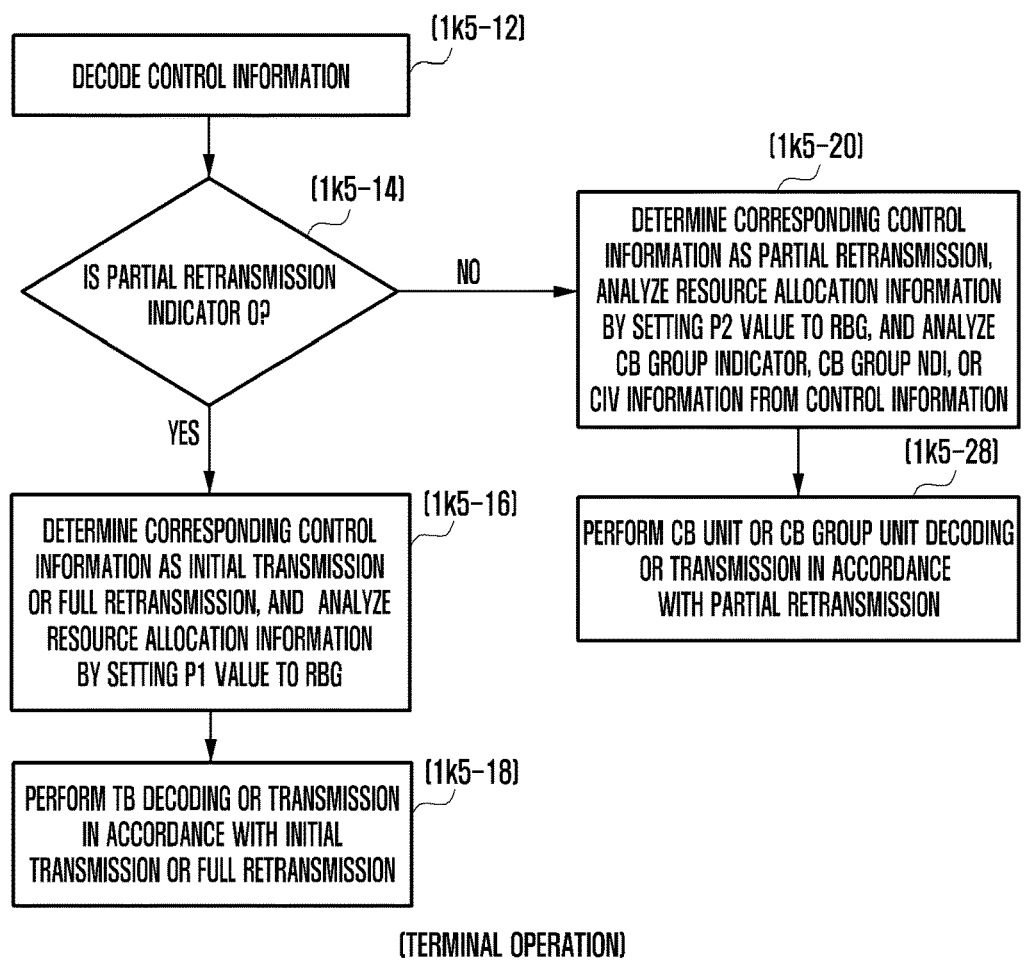
(TERMINAL OPERATION)

FIG. 2C
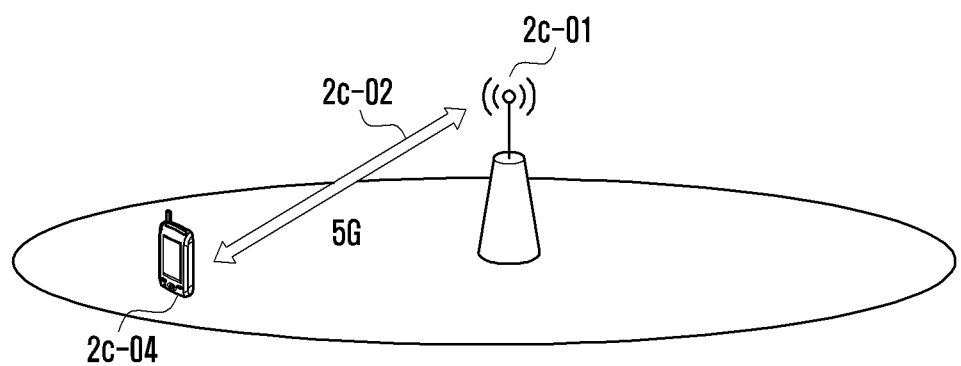
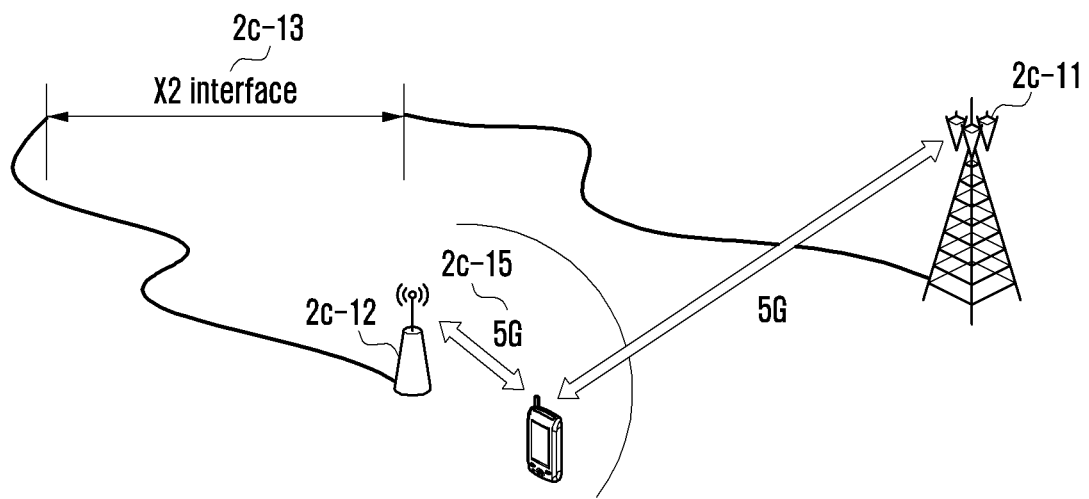

FIG. 2D
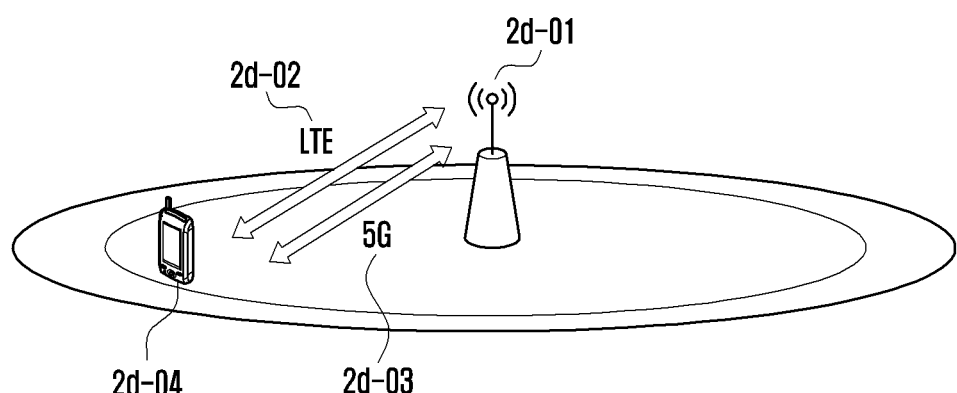
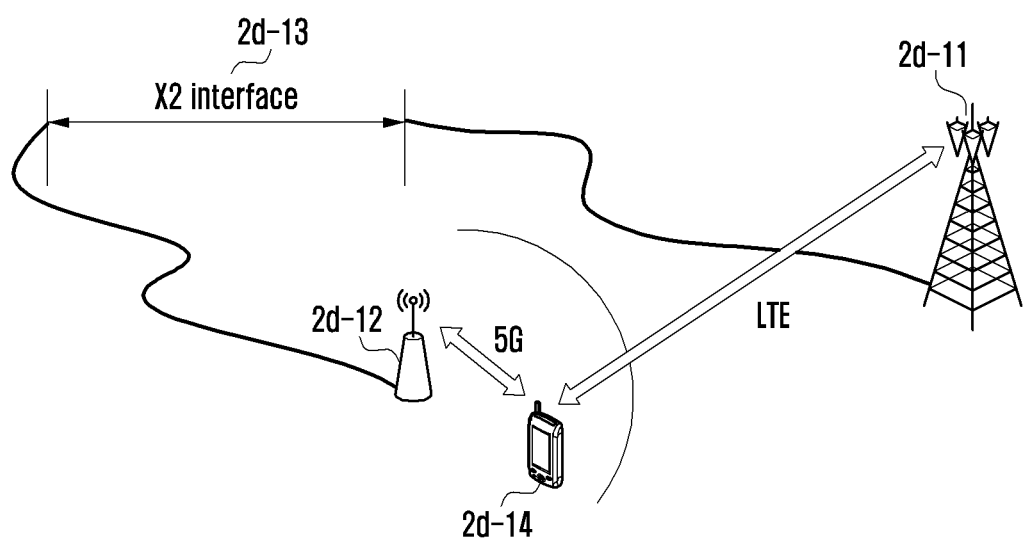

METHOD AND APPARATUS FOR PARTIAL RETRANSMISSION IN WIRELESS CELLULAR COMMUNICATION SYSTEM

PRIORITY

This application is a Continuation of U.S. application Ser. No. 16/416,843, which was filed in the U.S. Patent and Trademark Office (USPTO) on May 20, 2019, which is a Continuation of U.S. application Ser. No. 15/821,358, which was filed in the USPTO on Nov. 22, 2017, issued as U.S. Pat. No. 10,298,362 on May 21, 2019, and claims priority under 35 U.S.C. § 119(a) to Korean Patent Application Serial No. 10-2016-0157171, which was filed in the Korean Intellectual Property Office on Nov. 24, 2016, and Korean Patent Application Serial No. 10-2016-0177820, which was filed in the Korean Intellectual Property Office on Dec. 23, 2016, the entire content of each of which is incorporated herein by reference.

BACKGROUND

1. Field of the Disclosure

The present disclosure relates generally to a wireless communication system, and more particularly, to a method and an apparatus for performing retransmission with respect to a code block requiring the retransmission among transport blocks, if retransmission of the initially transmitted transport blocks is required.

2. Description of the Related Art

In order to meet the demand for wireless data traffic that is on an increasing trend after commercialization of 4G communication systems, efforts have been made to develop improved 5G or pre-5G communication system. For this reason, the 5G or pre-5G communication system is also called a beyond 4G network communication system or a post LTE system.

In order to achieve high data rate, implementation of a 5G communication system in an ultrahigh frequency (mmWave) band (e.g., like 60 GHz band) has been considered. In order to mitigate a path loss of radio waves and to increase a transfer distance of the radio waves in the ultrahigh frequency band, technologies of beamforming, massive MIMO, full dimension MIMO (FD-MIMO), array antenna, analog beam-forming, and large scale antennas for the 5G communication system have been discussed.

Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation.

In addition, in the 5G system, hybrid FSK and QAM modulation (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the Internet of things (IoT) where distributed entities, such as things, exchange and process information. The Internet of everything (IoE), which is a combination of the IoT technology and big data processing technology through connection with a cloud server, has emerged.

As technology elements, such as sensing technology, wired/wireless communication and network infrastructure, service interface technology, and security technology, have been demanded for IoT implementation, a sensor network for machine-to-machine connection, machine-to-machine (M2M) communication, machine type communication (MTC), and so forth have been recently researched. Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, machine to machine (M2M) communication, and MTC have been implemented by techniques for beam-forming, MIMO, and array antennas, which correspond to the 5G communication technology. As the big data processing technology as described above, application of a cloud radio access network (RAN) would be an example of convergence between the 5G technology and the IoT technology.

In a conventional wireless communication system, and particularly, in a conventional long term evolution (LTE) system, data is transmitted in a unit of a transport block (TB). The TB is normally divided into several code blocks (CBs), and channel coding is performed in a unit of a CB. However, after a decoding failure of an initial transmission, retransmission is performed in the unit of a TB, even if decoding of only one CB has failed. That is, conventionally, it is necessary that an entire TB be retransmitted.

SUMMARY

Accordingly, the present disclosure is made to address at least the problems and/or disadvantages described above and to provide at least the advantages described below.

An aspect of the present disclosure is to provide a method for performing retransmission in the unit of a CB.

Another aspect of the present disclosure is to provide a method of performing retransmission in a unit of a CB, in which a CB index for notifying of an order of CBs is inserted into a CB to be operated.

Another aspect of the present disclosure is to provide a method and an apparatus capable of efficiently performing communication between a base station and a terminal (or terminal-to-terminal communication), wherein a terminal variously configures downlink or uplink frequency bandwidths among radio frequency resource regions used to perform downlink or uplink communication with a base station or a network, and receives a downlink signal or transmits an uplink signal through different frequency bandwidths in accordance with time or base station configuration or the kind of signals received or transmitted by the terminal.

Another aspect of the present disclosure is to provide a method for performing retransmission in a unit of a CB or a CB group if such retransmission is necessary in transmitting one or two TBs, such that a base station and a terminal can perform efficient transmission to reduce unnecessary data transmission. That is, resources required for the retransmission can be saved through transmission of only a part of the initial transmission during the retransmission using partial retransmission.

Another aspect of the present disclosure is to efficiently perform communication between a base station and a terminal (or terminal-to-terminal communication), by configuring one or more frequency bandwidths or radio resource regions so that they have different sizes.

In accordance with an aspect of the present disclosure, a method is provided for a base station in a wireless communication system. The method includes transmitting, to a terminal, first information related to a number of code block groups (CBGs) included in a transport block (TB), wherein the first information is transmitted to the terminal by radio resource control (RRC) signaling; determining CBGs for the TB based on a number of code blocks (CBs) included in the TB and the first information, wherein the determined CBGs include a first group of a first number of CBs and a second group of a second number of CBs, and wherein the first number of CBs and the second number of CBs are determined based on dividing of the number of CBs included in the TB by the number of CBGs associated with the first information; transmitting, to the terminal, the determined CBGs and control information including second information related to transmission of the TB and third information; and receiving, from the terminal, feedback information for the TB transmitted based on the determined CBGs. The first number of CBs included in the first group is a smallest integer that is larger than or equal to a value obtained by dividing the number of CBs included in the TB by the number of CBGs associated with the first information. The second number of CBs included in the second group is a largest integer that is smaller than or equal to the value obtained by dividing the number of CBs included in the TB by the number of CBGs associated with the first information. The second information includes resource allocation information related to the transmission of the TB. The third information indicates one or more CBGs among the determined CBGs that are transmitted. A bit length of the third information is determined based on the first information.

In accordance with another aspect of the present disclosure, a method is provided for a terminal in a wireless communication system. The method includes receiving, from a base station, first information related to a number of code block groups (CBGs) included in a transport block (TB), wherein the first information is transmitted from the base station by radio resource control (RRC) signaling; receiving, from the base station, the TB and control information including second information related to transmission of the TB and third information; determining the CBGs for the TB based on a number of code blocks (CBs) included in the TB and the first information, wherein the determined CBGs include a first group of a first number of CBs and a second group of a second number of CBs, and wherein the first number of CBs and the second number of CBs are determined based on dividing the number of CBs included in the TB by the number of CBGs associated with the first information; decoding the determined CBGs based on the second information and the third information; and transmitting, to the base station, feedback information for the determined CBGs based on a result of the decoding. The first number of CBs included in the first group is a smallest integer that is larger than or equal to a value obtained by dividing the number of CBs included in the TB by the number of CBGs associated with the first information. The second number of CBs included in the second group is a largest integer that is smaller than or equal to the value obtained by dividing the number of CBs included in the TB by the number of CBGs associated with the first information. The second information includes resource allocation information related to the transmission of the TB. The third information indicates one or more CBGs among the determined CBGs that are received. A bit length of the third information is determined based on the first information.

In accordance with another aspect of the present disclosure, a base station is provided in a wireless communication system. The base station includes a transceiver; and a controller coupled with the transceiver and configured to transmit, to a terminal, first information related to a number of code block groups (CBGs) included in a transport block (TB), wherein the first information is transmitted to the terminal by radio resource control (RRC) signaling, determine the CBGs for the TB based on a number of code blocks (CBs) included in the TB and the first information, wherein the determined CBGs include a first group of a first number of CBs and a second group of a second number of CBs, and wherein the first number of CBs and the second number of CBs are determined based on dividing of the number of CBs included in the TB by the number of CBGs associated with the first information, transmit, to the terminal, the determined CBGs and control information including second information related to transmission of the TB and third information, and receive, from the terminal, feedback information for the TB transmitted based on the determined CBGs. The first number of CBs included in the first group is a smallest integer that is larger than or equal to a value obtained by dividing the number of CBs included in the TB by the number of CBGs associated with the first information. The second number of CBs included in the second group is a largest integer that is smaller than or equal to the value obtained by dividing the number of CBs included in the TB by the number of CBGs associated with the first information. The second information includes resource allocation information related to the transmission of the TB. The third information indicates one or more CBGs among the determined CBGs that are transmitted. A bit length of the third information is determined based on the first information.

In accordance with another aspect of the present disclosure, a terminal is provided in a wireless communication system. The terminal includes a transceiver; and a controller coupled with the transceiver and configured to receive, from a base station, first information related to a number of code block groups (CBGs) included in a transport block (TB), wherein the first information is transmitted from the base station by radio resource control (RRC) signaling, receive, from the base station, the TB and control information including second information related to transmission of the TB and third information, determine the CBGs for the TB based on a number of code blocks (CBs) included in the TB and the first information, wherein the determined CBGs include a first group of a first number of CBs and a second group of a second number of CBs, and wherein the first number of CBs and the second number of CBs are determined based on dividing the number of CBs included in the TB by the number of CBGs associated with the first information, decode the determined CBGs based on the second information and the third information, and transmit, to the base station, feedback information for the determined CBGs based on a result of the decoding. The first number of CBs included in the first group is a smallest integer that is larger than or equal to a value obtained by dividing the number of CBs included in the TB by the number of CBGs associated with the first information. The second number of CBs included in the second group is a largest integer that is smaller than or equal to the value obtained by dividing the number of CBs included in the TB by the number of CBGs associated with the first information. The second information includes resource allocation information related to the transmission of the TB. The third information indicates one or more CBGs among the determined CBGs that are received. A bit length of the third information is determined based on the first information.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 1G illustrates a communication system in which an outer code is used according to an embodiment of the present disclosure;

FIG. 1H illustrates an example of partial retransmission according to an embodiment of the present disclosure;

FIG. 1KB is a flowchart illustrating a method for a terminal to decode received data in accordance with a bit field of a CB group indicator according to an embodiment of the present disclosure;

FIG. 1KC is a flowchart illustrating a method for a base station to configure a bit field of a CB group NDI according to an embodiment of the present disclosure;

FIG. 1KD is a flowchart illustrating a method for a terminal to decode received data in accordance with a bit field of a CB group NDI according to an embodiment of the present disclosure;

FIG. 1KE is a flowchart illustrating a method for a base station and a terminal according to an embodiment of the present disclosure;

FIG. 1MB is a flowchart illustrating a method for a terminal to perform channel code decoding based on a control information type according to an embodiment of the present disclosure;

FIG. 1O illustrates a base station according to an embodiment of the present disclosure;

FIGS. 2C and 2D illustrate communication systems to which the present disclosure is applied;

DETAILED DESCRIPTION

First Embodiment

Figure 1A:
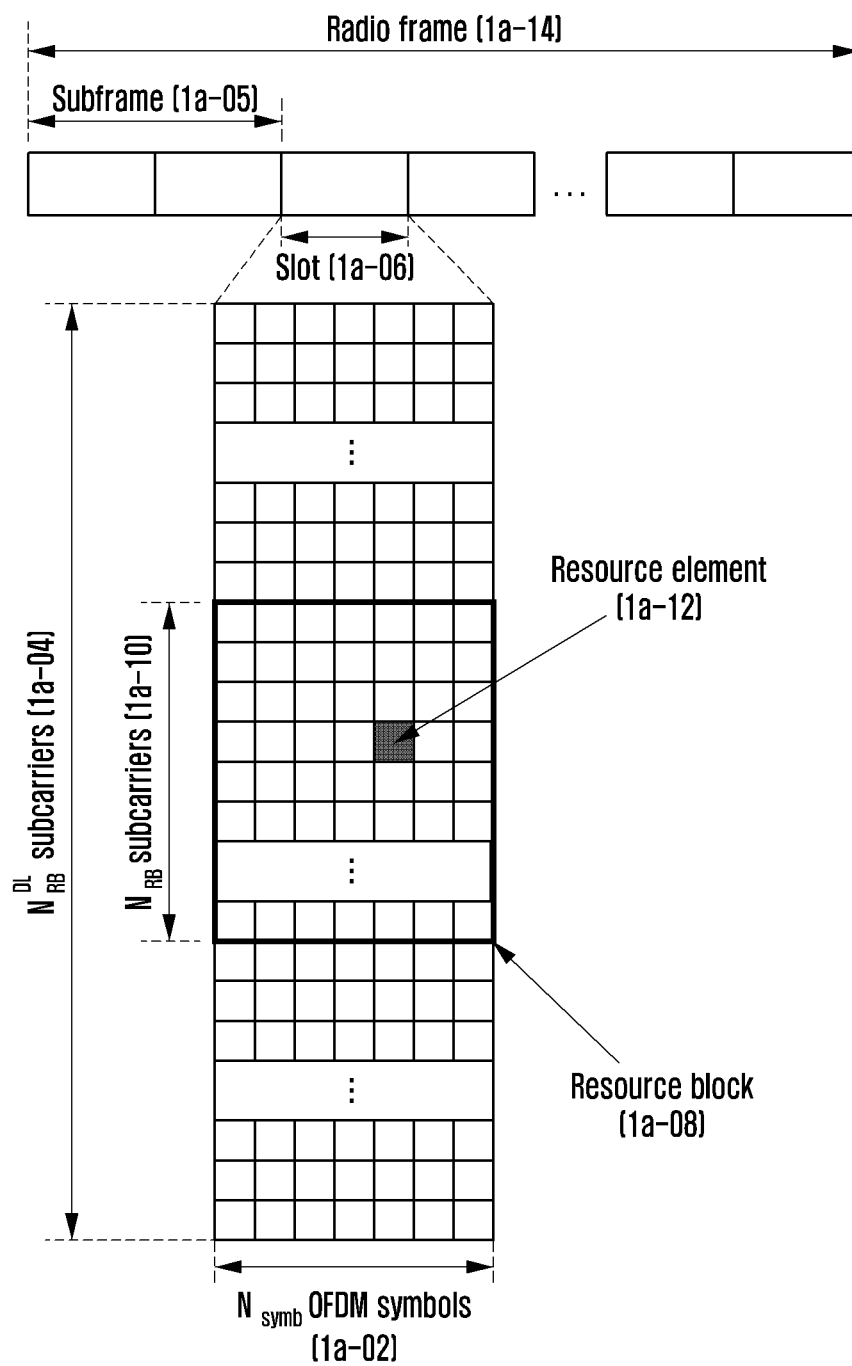
FIG. 1A illustrates a downlink time-frequency domain transmission structure of an LTE or LTE-advanced (LTE-A) system.

In order to meet the demand for wireless data traffic that is on an increasing trend after commercialization of 4G communication systems, efforts have been made to develop improved 5G or pre-5G communication system. For this reason, the 5G or pre-5G communication system is also called a beyond 4G network communication system or a post LTE system. In order to achieve high data rate, implementation of a 5G communication system in an ultrahigh frequency (mmWave) band (e.g., like 60 GHz band) has been considered.

In order to mitigate a path loss of radio waves and to increase a transfer distance of the radio waves in the ultrahigh frequency band, technologies of beamforming using array antennas, massive MIMO, full dimension MIMO (FD-MIMO), hybrid beamforming, and large scale antennas for the 5G communication system have been discussed. Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation.

In addition, in the 5G system, hybrid FSK and QAM modulation (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the Internet of things (IoT) where distributed entities, such as things, exchange and process information. The Internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, a sensor network for machine-to-machine connection, machine-to-machine (M2M) communication, machine type communication (MTC), and so forth have been recently researched.

Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, machine to machine (M2M) communication, and MTC have been implemented by techniques for beam-forming, MIMO, and array antennas, which correspond to the 5G communication technology. As the big data processing technology as described above, application of a cloud radio access network (RAN) would be an example of convergence between the 5G technology and the IoT technology.

On the other hand, in a new radio access technology (NR) that is a new 5G communication, various services are designed to be freely multiplexed in time and frequency resources, and accordingly, waveform/numerology and a reference signal may be dynamically or freely allocated in accordance with necessity of the corresponding services. In order to provide optimum services to a terminal in wireless communication, it is important to provide optimized data transmission through measurement of a channel quality and an interference amount, and thus accurate channel state measurement is essential.

However, in the case of 5G channels, in contrast with 4G communications in which channel and interference characteristics are not greatly changed in accordance with frequency resources, the channel and interference characteristics are greatly changed in accordance with services, and thus support of frequency resource group (FRG)-level subset for divided measurement of the services becomes necessary. On the other hand, in an NR system, the kind of supported services may be divided into categories of enhanced mobile broadband (eMBB), massive machine type communications (mMTC), and ultra-reliable and low-latency communications (URLLC). The eMBB may be a service aiming at high-speed transmission of high-capacity data, and the mMTC may be a service aiming at minimization of a terminal power and connection of multiple terminals. The URLLC may be a service aiming at ultra-reliability and low latency. Different requirements may be applied in accordance with the kind of services applied to the terminal.

In a communication system as described above, a plurality of services may be provided to a user, and in order to provide such services to the user, there is a need for a method capable of providing respective services to match the features in the same time domain and an apparatus using the same.

Hereinafter, various embodiments of the present disclosure will be described in detail with reference to the accompanying drawings. However, the present disclosure is not limited to the embodiments disclosed hereinafter, but can be implemented in diverse forms.

The matters defined in the description, such as the detailed construction and elements, are provided to assist those of ordinary skill in the art in a comprehensive understanding of the disclosure, and the present disclosure is only defined within the scope of the appended claims.

In explaining the embodiments, explanations of technical contents which are well known in the art to which the present disclosure pertains and are not directly related to the present disclosure will be omitted, in order to clearly describe the present disclosure more without obscuring the same with unnecessary detail.

In the accompanying drawings, sizes and relative sizes of some constituent elements may be exaggerated, omitted, or briefly illustrated. Further, sizes of the respective constituent elements do not completely reflect the actual sizes thereof. Additionally, the same drawing reference numerals may be used for the same or corresponding elements across various figures.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

Each block of a flowchart, and combinations of blocks in a flowchart, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, instruct a device to implement the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of a flowchart may represent a module, segment, or portion of code, which includes one or more executable instructions for implementing the specified logical function(s). Alternatively, the functions noted in the blocks may occur in different orders. For example, two blocks shown in succession may in fact be executed substantially concurrently or the blocks may sometimes be executed in the reverse order, depending upon the functionality involved.

Herein, the term "unit", may refer to a software and/or hardware component, such as a field-programmable gate array (FPGA) or an application-specific integrated circuit (ASIC), which performs certain tasks. However, a "unit" is not limited to software or hardware. The term "unit" may advantageously be configured to reside on the addressable storage medium and configured to execute on one or more processors. Thus, a "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or further separated into additional components and "units". Further, the components and "units" may be implemented to operate one or more central processing units (CPUs) in a device or a security multimedia card. A, "unit" may include one or more processors.

A wireless communication system has escaped from an initial voice-oriented service providing system, and has been developed as a broadband wireless communication system that provides high-speed and high-quality packet data services in accordance with the communication standards, such as high speed packet access (HSPA) of 3GPP, long term evolution (LTE) or evolved universal terrestrial radio access (E-UTRA), LTE-advanced (LTE-A), high rate packet data (HRPD) of 3GPP2, ultra-mobile broadband (UMB), and 802.16e of IEEE. Further, for the 5G wireless communication system, 5G or new radio (NR) communication standards have been made.

In an LTE system that is a representative example of the broadband wireless communication system, an orthogonal frequency division multiplexing (OFDM) method is adapted for a downlink (DL), and a single carrier frequency division multiple access (SC-FDMA) method is adapted for an uplink (UL). The uplink means a radio link through which a terminal (user equipment (UE) or mobile station (MS)) transmits data or a control signal to a base station (BS or eNode B), and the downlink means a radio link through which the base station transmits data or a control signal to the terminal. In general, the multiple access method as described above separates data and control information from each other for each user by allocating and operating time-frequency resources on which the data or the control information is carried for each user so that the resources do not overlap each other, that is, so that the orthogonality is realized.

The LTE system adapts a hybrid automatic repeat request (HARQ) method in which a physical layer re-transmits the corresponding data if a decoding failure occurs during initial transmission. The HARQ method enables a receiver to transmit information (negative acknowledgement (NACK)) for notifying a transmitter of the decoding failure if the receiver could not accurately decode the data, so that the transmitter can re-transmit the corresponding data on the physical layer. The receiver combines the data re-transmitted by the transmitter with the previous data of which the decoding has failed to heighten data reception performance. Further, if the receiver has accurately decoded the data, it transmits information (acknowledgement (ACK)) for notifying the transmitter of a decoding success, so that the transmitter can transmit new data.

FIG. 1A illustrates a time-frequency domain that is a radio resource region from which data or a control channel is transmitted through a downlink in an LTE system.

Referring to FIG. 1A, a horizontal axis represents a time domain, and a vertical axis represents a frequency domain. In the time domain, the minimum transmission unit is an orthogonal frequency division multiplexing (OFDM) symbol, and $N_{symb}$ OFDM symbols 1a-02 are included in one slot 1a-06, and two slots constitute one subframe 1a-05. The length of a slot is 0.5 ms, and the length of a subframe is 0.1 ms. Further, the radio frame 1a-14 is a time domain interval including 10 subframes. The minimum transmission unit in the frequency domain is a subcarrier, and the transmission bandwidth of the entire system is $N_{BW}$ subcarriers 1a-04 in total.

In the time-frequency domain, the basic unit is a resource element (RE) 1a-12, which may be indicated as an OFDM symbol index and a subcarrier index.

A resource block (RB) 1a-08 or a physical resource block (PRB) is defined as $N_{symb}$ successive OFDM symbols 1a-02 in the time domain and $N_{RB}$ successive subcarriers 1a-10 in the frequency domain. Accordingly, the RB 1a-08 is composed of $N_{symb} \times N_{RB}$ REs 1a-12.

In general, the minimum transmission unit of data is the RB unit as described above. In an LTE system, it is common that $N_{symb}=7$, $N_{RB}=12$, and $N_{BW}$ and $N_{RB}$ are in proportion to the system transmission bandwidth. However, in another system that is not an LTE system, different values may be used.

The data rate increases in proportion to the number of RBs being scheduled to a terminal. In an LTE system, 6 transmission bandwidths are defined and operated. In a frequency division duplex (FDD) system that divides and operates a downlink and an uplink through a frequency, the transmission bandwidth of the downlink and the transmission bandwidth of the uplink may differ from each other. The channel bandwidth indicates a radio frequency (RF) bandwidth that corresponds to the system transmission bandwidth.

Table 1, below, presents a corresponding relationship between a system transmission bandwidth defined in an LTE system and a channel bandwidth. For example, in an LTE system having a channel bandwidth of 10 MHz, a transmission bandwidth includes 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information may be transmitted within the first N OFDM symbols in the subframe, e.g., N={1, 2, 3}. Accordingly, based on the amount of control information to be transmitted in the current subframe, the value N may be variably applied for each subframe. The transmitted control information includes a control channel transmission interval indicator indicating how many OFDM symbols the control information is transmitted through, scheduling information on downlink data or uplink data, and a hybrid automatic repeat request (HARQ) acknowledgement/negative acknowledgement (ACK/NACK) signal.

In an LTE system, scheduling information on the downlink data or the uplink data is transferred from the base station to the terminal through downlink control information (DCI). The DCI may be defined in accordance with various formats, and may indicate whether the scheduling information is uplink (UL) data scheduling information (a UL grant) or downlink (DL) data scheduling information (a DL grant), whether the DCI is compact DCI having a small size of control information, whether spatial multiplexing using multiple antennas is applied, or whether the DCI is DCI for power control. For example, a DCI format 1 for scheduling control information (a DL grant) of the downlink data may include at least one of the following control information.

Resource allocation type 0/1 flag: This flag notifies whether a resource allocation type is type 0 or type 1. The type 0 allocates resources in a unit of a resource block group (RBG) by applying a bitmap type. In an LTE system, the basic unit for scheduling is an RB that is expressed as a time and frequency domain resource, and an RBG includes a plurality of RBs to be considered as the basic unit for scheduling in the type 0. The type 1 allocates a specific RB in the RBG.

Resource block assignment: This assignment indicates an RB that is allocated for data transmission. The expressed resource is determined in accordance with the system bandwidth and the resource allocation method.

Modulation and coding scheme (MCS): This scheme indicates a modulation method used for data transmission and the size of a transport block that is data to be transmitted.

HARQ process number: This number indicates the process number of HARQ.

New data indicator: This indicator indicates whether HARQ transmission is an initial transmission or a retransmission.

Redundancy version: This version indicates a redundancy version of HARQ.

Transmit power control (TPC) command for physical uplink control channel (PUCCH): This command indicates a transmission power control command for a PUCCH that is an uplink control channel.

The DCI may be transmitted through a physical downlink control channel (PDCCH) (or control information) that is a downlink physical control channel or an enhanced PDCCH (EPDCCH) (or enhanced control information) after passing through a channel coding and modulation process.

In general, the DCI is scrambled by a specific radio network temporary identifier (RNTI) (or terminal identifier) independently with respect to each terminal, is added with a CRC, is channel-coded, and then is configured as an independent PDCCH to be transmitted. In the time domain, the PDCCH is mapped and transmitted for the control channel transmission interval. The mapping location of the frequency domain of the PDCCH is determined by the identifier (ID) of each terminal, and the PDCCH is transmitted through the transmission band of the whole system.

The downlink data may be transmitted on a physical downlink shared channel (PDSCH). The PDSCH may be transmitted after the control channel transmission interval, and scheduling information, such as a concrete mapping location or a modulation method in the frequency domain, is determined based on the DCI that is transmitted through the PDCCH.

Through an MCS among control information constituting the DCI, the base station notifies the terminal of the modulation scheme applied to the PDSCH to be transmitted to the terminal and a transport block size (TBS). For example, the MCS may include 5 bits, more than 5 bits, or less than 5 bits. The TBS corresponds to a size of a TB before channel coding for error correction is applied thereto, in order to be transmitted by the base station.

A TB may include a medium access control (MAC) header, a MAC control element (CE), one or more MAC service data units (SDUs), and padding bits. Further, the TB may indicate a unit of data downloaded from a MAC layer to a physical layer, or a MAC protocol data unit (PDU).

Modulation methods supported in an LTE system are quadrature phase shift keying (QPSK), 16 quadrature amplitude modulation (16QAM), and 64QAM, and respective modulation orders (Qm) correspond to 2, 4, and 6. That is, for QPSK modulation, 2 bits per symbol may be transmitted, for 16QAM modulation, 4 bits per symbol may be transmitted, and for 64QAM modulation, 6 bits per symbol may be transmitted. Further, in accordance with the system modification, a modulation method of 256QAM or more may be used.

Figure 1B:
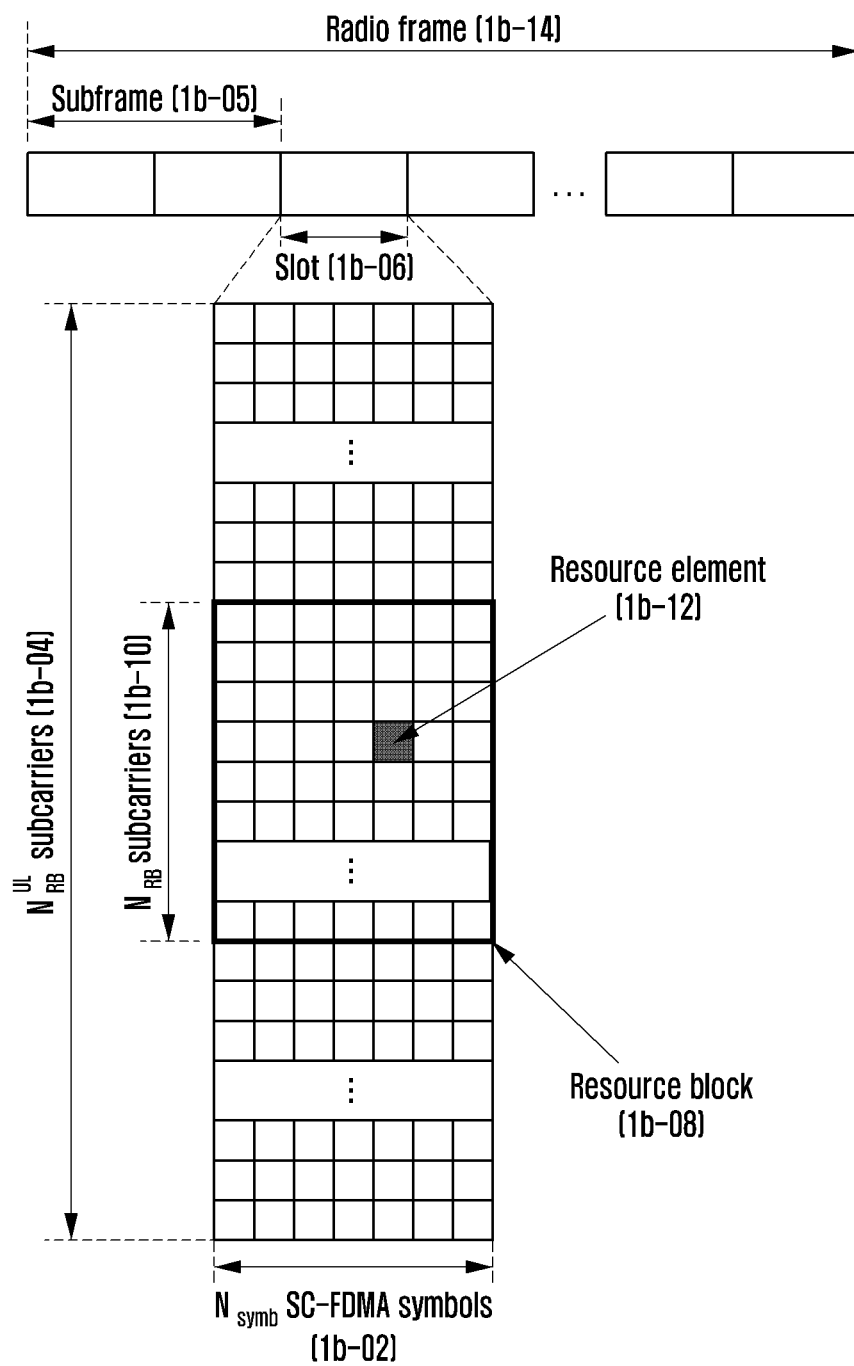
FIG. 1B illustrates an uplink time-frequency domain transmission structure of an LTE or LTE-A system.

FIG. 1B illustrates a time-frequency domain that is a radio resource region from which data or a control channel is transmitted through an uplink in an LTE-A system.

Referring to FIG. 1B, a horizontal axis represents a time domain, and a vertical axis represents a frequency domain. In the time domain, the minimum transmission unit is a single carrier frequency division multiple access (SC-FDMA) symbol 1b-02, and $N_{symb}^{UL}$ SC-FDMA symbols constitute one slot 1b-06. Further, two slots constitute one subframe 1b-05. The minimum transmission unit in the frequency domain is a subcarrier, and the transmission bandwidth 1b-04 of the entire system is $N_{BW}$ subcarriers in total. $N_{BW}$ may have a value that is in proportion to the system transmission band.

In the time-frequency domain, the basic unit of a resource is a resource element (RE) 1b-12, and the resource may be defined as an SC-FDMA symbol index and a subcarrier index. The RB pair 1b-08 is defined as $N_{symb}^{UL}$ successive SC-FDMA symbols in the time domain and $N_{sc}^{RB}$ successive subcarriers in the frequency domain. Accordingly, one RB includes $N_{symb}^{UL} \times N_{sc}^{RB}$ REs.

In general, the minimum transmission unit of data or control information is the RB unit. A PUCCH is mapped onto the frequency domain corresponding to 1 RB, and is transmitted for one subframe.

In an LTE system, the timing relationship between a PDSCH that is a physical channel for transmitting downlink data or a PDCCH/EPDDCH including a semi-persistent scheduling (SPS) release and a PUCCH or a PUSCH that is an uplink physical channel through which a corresponding HARQ ACK/NACK is transmitted has been defined. For example, in an LTE system that operates as an FDD, the HARQ ACK/NACK corresponding to the PDSCH transmitted in the (n−4)-th subframe or the PDCCH/EPDCCH including the SPS release is transmitted through the PUCCH or the PUSCH in the n-th subframe.

In an LTE system, a downlink HARQ uses an asynchronous HARQ method in which data re-transmission time is not fixed. That is, if the HARQ NACK is fed back from the terminal with respect to the initially transmitted data transmitted by the base station, the base station freely determines the transmission time of re-transmitted data through the scheduling operation. The terminal buffers the data that is determined as an error, as the result of decoding the received data for the HARQ operation, and then performs combining with the next re-transmitted data.

If the PDSCH including the downlink data transmitted from the base station in the subframe n is received, the terminal transmits the uplink control information including the HARQ ACK or NACK of the downlink data to the base station through the PUCCH or PUSCH in the subframe n+k. Here, k is differently defined in accordance with the FDD or time division duplex (TDD) of the LTE system and the subframe configuration. For example, in an FDD LTE system, k is fixed to 4. However, in a TDD LTE system, k may be changed in accordance with the subframe configuration and the subframe number.

In an LTE system, in contrast with a downlink HARQ, an uplink HARQ adapts a synchronous HARQ method in which the data transmission time is fixed. That is, the uplink/downlink timing relationship among a physical uplink shared channel (PUSCH) that is a physical channel for transmitting the uplink data, a PDCCH that is a preceding downlink control channel, and a physical hybrid indicator channel (PHICH) that is a physical channel through which the downlink HARQ ACK/NACK corresponding to the PUSCH is transmitted is fixed based on the following:

If the PDCCH including the uplink scheduling control information transmitted from the base station in the subframe n or the PHICH through which the downlink HARQ ACK/NACK is transmitted is received, the terminal transmits the uplink data corresponding to the control information through the PUSCH in the subframe n+k. Here, k is differently defined in accordance with the FDD or TDD of the LTE system and its configuration. For example, in an FDD LTE system, k is fixed to 4.

In a TDD LTE system, k may be changed in accordance with the subframe configuration and the subframe number. In the FDD LTE system, if the base station transmits, to the terminal, an uplink scheduling grant or a downlink control signal and data in the subframe n, the terminal receives the uplink scheduling grant or the downlink control signal and the data in the subframe n. When receiving the uplink scheduling grant in the subframe n, the terminal transmits uplink data in the subframe n+4. When receiving the downlink control signal and the data in the subframe n, the terminal transmits the HARQ ACK or NACK for the downlink data in the subframe n+4. Accordingly, the time at which the terminal receives the uplink scheduling grant and transmits the uplink data or the terminal receives the downlink data and transfers the HARQ ACK or NACK, becomes 3 ms corresponding to three subframes.

Further, if the terminal receives a PHICH that carries the downlink HARQ ACK/NACK from the base station in the subframe i, the PHICH corresponds to the PUSCH transmitted by the terminal in the subframe i-k. Here, k is differently defined in accordance with the FDD or TDD of the LTE system and its configuration. For example, in an FDD LTE system, k is fixed to 4. However, in a TDD LTE system, k may be changed in accordance with the subframe configuration and the subframe number.

Figure 1C:
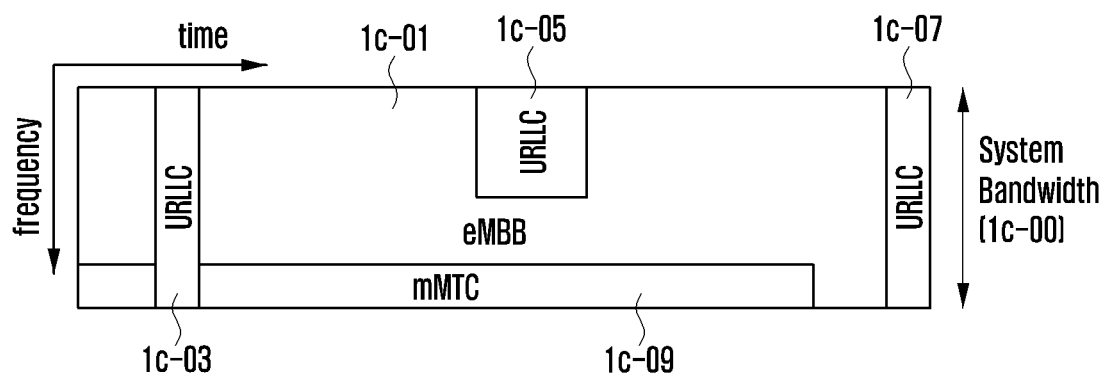
FIG. 1C illustrates data for enhanced mobile broadband (eMBB), ultra-reliable and low-latency communications (URLLC), and massive machine type communications (mMTC) allocated in frequency-time resources in a communication system.
Figure 1D:
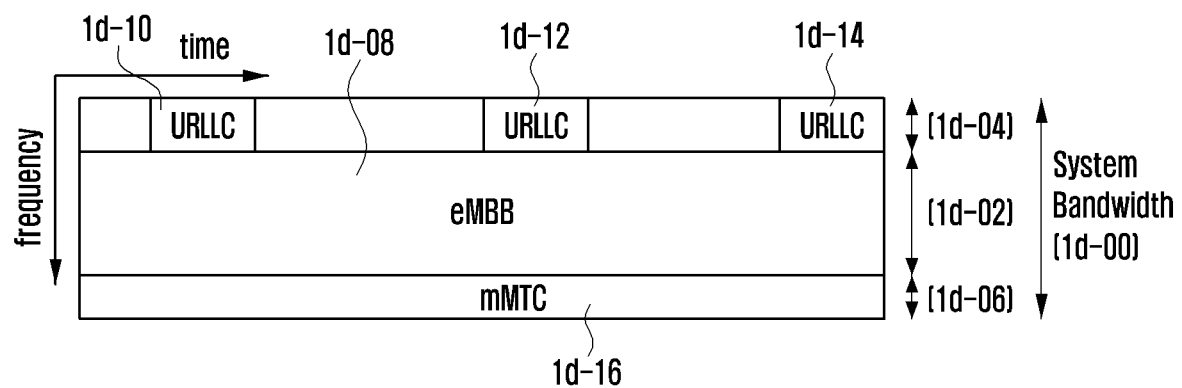
FIG. 1D illustrates data for eMBB, URLLC, and mMTC allocated in frequency-time resources in a communication system.

FIGS. 1C and 1D illustrate data for eMBB, URLLC, and mMTC allocated in frequency-time resources in a communication system.

Referring to FIGS. 1C and 1D, a method for allocating frequency and time resources for information transmission in each system will be described.

Referring to FIG. 1C, data for eMBB, URLLC, and mMTC is allocated in the entire system frequency band 1c-00. If URLLC data 1c-03, 1c-05, and 1c-07 are generated and transmission thereof becomes necessary while eMBB 1c-01 and mMTC 1c-09 are allocated in a specific frequency band to be transmitted, the URLLC data 1c-03, 1c-05, and 1c-07 may be transmitted by emptying portions that have already been allocated with the eMBB 1c-01 and mMTC 1c-09 or without transmitting the eMBB 1c-01 and mMTC 1c-09.

Among the above-described services, since the URLLC is required to reduce latency, the URLLC data 1c-03, 1c-05, and 1c-07 may be transmitted where they are allocated to a part of the resource to which the eMBB 1c-01 has been allocated. If the URLLC is transmitted where it is additionally allocated to the resource to which the eMBB has been allocated, the eMBB data may not be transmitted, and thus, the transmission performance of the eMBB data may be lowered. That is, in the above-described example, the eMBB data transmission may fail due to the URLLC allocation.

Referring to FIG. 1D, the entire system frequency band 1d-00 is divided into subbands 1d-02, 1d-04, and 1d-06, which are used to transmit services and data. Information related to the subband configuration may be predetermined, and this information may be transmitted from a base station to a terminal through upper layer signaling. Further, information related to the subbands 1d-02, 1d-04, and 1d-06 may be optionally divided by the base station or a network node, and services may be provided to the terminal without transmitting separate subband configuration information to the terminal. As illustrated in FIG. 1D, subband 1d-02 is used to transmit eMBB data, subband 404 is used to transmit URLLC data, and subband 1d-06 is used to transmit mMTC data.

The length of a transmission time interval (TTI) used to transmit URLLC may be shorter than the length of a TTI used to transmit eMBB or mMTC. Further, a response to the URLLC related information can be transmitted faster than the eMBB or mMTC, and thus, the information can be transmitted or received at low latency.

Figure 1E:
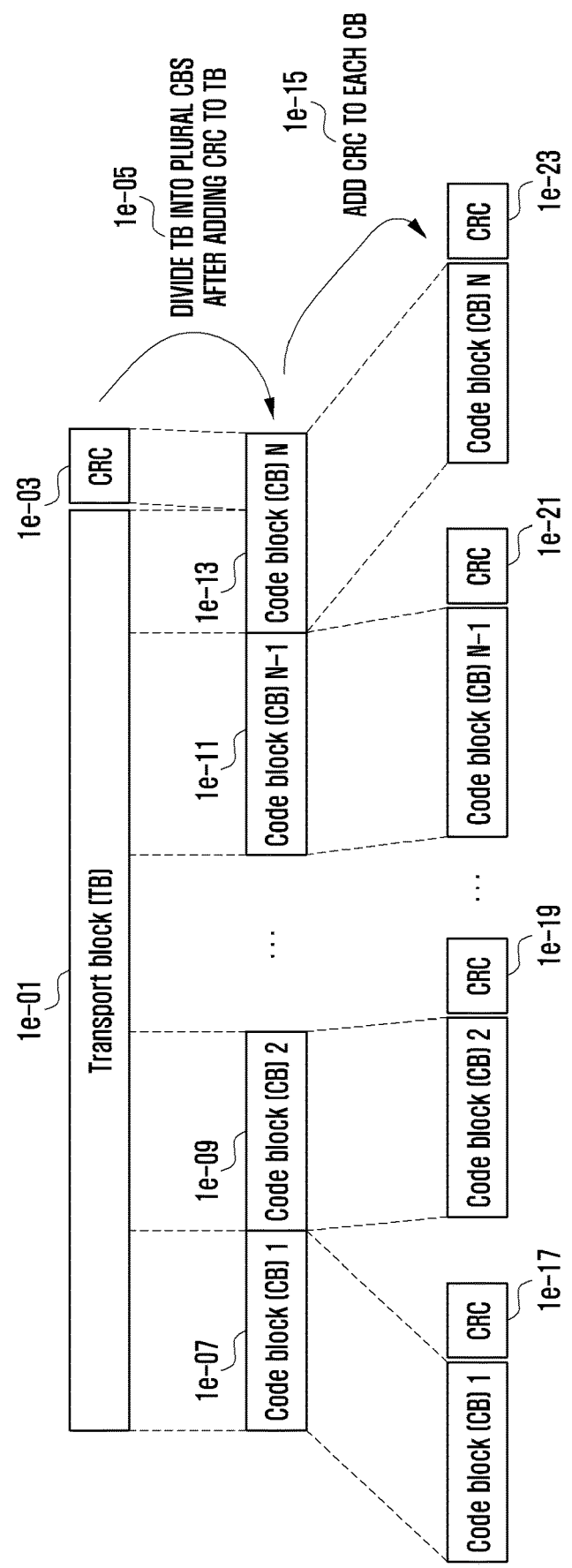
FIG. 1E illustrates one transport block that is divided into several code blocks and includes a cyclic redundancy check (CRC) is added thereto according to an embodiment of the present disclosure.

FIG. 1E illustrates a transport block being divided into several code blocks and including a CRC according to an embodiment.

Referring to FIG. 1E, in an uplink or a downlink, a CRC 1e-03 may be added to a last portion or a head portion of the TB 1e-01. The CRC 1e-03 may include 16 or 24 bits or a prefixed number of bits, or may include a variable number of bits in accordance with the channel situations. The CRC 1e-03 may be used to determine success/failure of the channel coding.

Blocks 1e-01 and 1e-03 to which a TB and a CRC are added may be divided into several CBs 1e-07, 1e-09, 1e-11, and 1e-13 (1e-05). The maximum size of a CB may be predetermined, and in this case, the last code block 1e-13 may have a size that is larger or smaller than that of other CBs, or may have a length that matches the length of other CBs by putting 0, a random value, or 1 thereto.

CRCs 1e-17, 1e-19, 1e-21, and 1e-23 may be added to the divided code blocks (1e-15). The CRC may include 16 or 24 bits or a prefixed number of bits, and may be used to determine success/failure of the channel coding. However, the CRC 1e-03 added to the TB and the CRCs 1e-17, 1e-19, 1e-21, and 1e-23 added to the CBs may be omitted depending on the kind of the channel code to be applied to the CB.

For example, if a low density parity check (LDPC) code, other than a turbo code, is applied to the CB, the CRCs 1e-17, 1e-19, 1e-21, and 1e-23 to be inserted into the CB may be omitted. However, even if the LDPC is applied, the CRCs 1e-17, 1e-19, 1e-21, and 1e-23 may be added to the CB as they are. Even if a polar code is used, the CRC may be added or omitted.

Figure 1F:
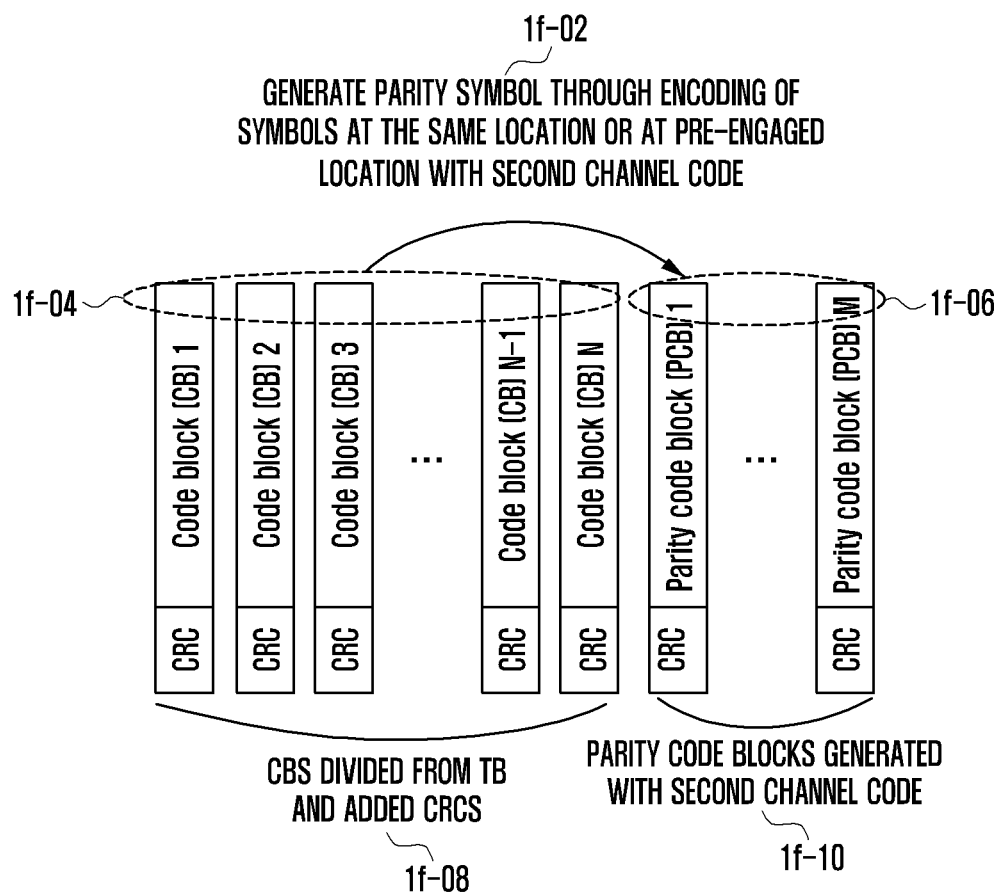
FIG. 1F illustrates a transmission method using an outer code according to an embodiment of the present disclosure.

FIG. 1F illustrates a transmission method in which an outer code is used, and FIG. 1G illustrates a communication system in which an outer code is used.

Referring to FIGS. 1F and 1G, a method for transmitting a signal using an outer code will be described.

Referring to FIG. 1F, a transport block is divided into several code blocks, and bits or symbols 1*f*-04 that are at the same location in the respective code blocks may be encoded with the second channel code to generate parity bits or symbols 1*f*-06 (1*f*-02). Thereafter, CRCs may be added to the respective code blocks and parity code blocks generated through the second channel code encoding (1*f*-08 and 1*f*-10).

The addition of the CRCs may differ depending on the kind of the channel code. For example, if a turbo code is used as the first channel code, the CRCs 1*f*-08 and 1*f*-10 are added, but thereafter, the respective code blocks and parity code blocks may be encoded through the first channel code encoding. The transport block is transferred from an upper layer to a physical layer.

In the physical layer, the TB is considered as data. The CRC is added to the TB. In order to generate the CRC, TB data bits and a cyclic generator polynomial may be used, and the cyclic generator polynomial may be defined in various methods.

For example, if the cyclic generator polynomial for 24-bit CRC is $g_{CRC24A}(D)=D^{24}+D^{23}+D^{18}+D^{17}+D^{14}+D^{11}+D^{10}+D^7+D^6+D^5+D^4+D^3+D+1$, and L is L=24, the CRC $p_0, p_1, p_2, p_3, \ldots, p_{L-1}$ is determined as a value obtained by dividing $a_0 D^{A+23}+a_1 D^{A+22}+ \ldots +a_{A-1}D^{24}+p_0 D^{23}+p_1 D^{22}+ \ldots +p_{22}D^1+p_{23}$ by the $g_{CRC24A}(D)$ with the remainder of 0 with respect to TB data $a_0, a_1, a_2, a_3, \ldots a_{A-1}$.

In the above-described example, although the CRC length L=24, various lengths, such as, 12, 16, 32, 40, 48, and 64 may be used. The CRCs are added to the divided CBs, and a cyclic generator polynomial that is different from that of the CRC of the TB may be used as the CRC of the CB.

In a conventional LTE system, during retransmission due to an initial transmission failure, the initially transmitted TB is retransmitted. However, retransmission in a unit of a CB or several CBs other than in the unit of a TB may become possible. For this, a terminal may transmit several-bit HARQ-ACK feedback per TB. Further, during the retransmission, information is provided as control information for scheduling transmitted from the base station, indicating what portion of the TB is being retransmitted.

Referring to FIG. 1G, if an outer code is used, data to be transmitted passes through a second channel coding encoder 1*g*-09. As a channel code used for the second channel coding, e.g., a Reed-Solomon code, a DCH code, a raptor code, or a parity bit generation code may be used. The bits or symbols that have passed through the second channel coding encoder 1*g*-09 pass through the first channel coding encoder 1*g*-11. A channel code used for the first channel coding may be a convolutional code, an LDPC code, a turbo code, or a polar code.

If the channel coded symbols are received in a receiver, after passing through a channel 1*g*-13, the receiver side may successively operate the first channel coding decoder 1*g*-15 and the second channel coding decoder 1*g*-17 based on the received signal. The first channel coding decoder 1*g*-15 and the second channel coding decoder 1*g*-17 may perform operations corresponding to the operations of the first channel coding encoder 1*g*-11 and the second channel coding encoder 1*g*-09.

However, if the outer code is not used, although the first channel coding encoder 1*g*-11 and the first channel coding decoder 1*g*-05 are used in the transceiver, the second channel coding encoder and the second channel coding decoder are not used. Even if the outer code is not used, the first channel coding encoder 1*g*-11 and the first channel coding decoder 1*g*-05 may be configured in the same manner as when the outer code is used.

Herein, an eMBB service is referred to as a first type service, and data for eMBB is referred to as first type data. The first type service or the first type data is not limited to the eMBB, but may correspond to a scenario in which high-speed data transmission is required or broadband transmission is performed.

Further, an URLLC service is referred to as a second type service, and data for URLLC is referred to as second type data. The second type service or the second type data is not limited to the URLLC, but may correspond to a scenario in which low latency is required or ultra-reliable transmission is necessary, or may correspond to another system in which both low-latency and ultra-reliability are required.

Further, an mMTC service is referred to as a third type service, and data for mMTC is referred to as third type data. The third type service or the third type data is not limited to the mMTC, but may correspond to a scenario in which a low speed, a wide coverage, or a low power is required.

Further, the first type service may or may not include the third type service.

In order to transmit three kinds of services or data as described above, different physical layer channel structures may be used for the respective types. For example, at least one of a TTI length, a frequency resource allocation unit, a control channel structure, and a data mapping method may differ.

Although three kinds of services and three kinds of data have been described, more kinds of services and corresponding data may exist, and the present disclosure may be applied thereto.

Although methods and the apparatuses are described below with reference to an LTE or LTE-A system, and use terminology of these systems, the present disclosure is also applicable to other wireless communication systems. For example, 5G mobile communication technology (5G or new radio (NR)) developed after LTE-A may be included therein.

As described above, an embodiment of the present disclosure proposes a method for defining transmission/reception operations of a terminal and a base station for transmitting first to third type services or data, and for operating terminals that receive different types of services or data scheduling together in the same system. The first to third type terminals receive the first to third type services or data scheduling. The first to third type terminals may be the same terminals or different terminals.

Hereinafter, embodiments of the present disclosure will be described in detail with reference to the accompanying drawings. In describing the present disclosure, a detailed description of related functions or configurations will be omitted if it is determined that it obscures the disclosure in unnecessary detail. Further, all terms used in the description are general terms that are widely used in consideration of their functions in the present disclosure, but may differ depending on intentions of a person skilled in the art to which the present disclosure belongs, customs, or appearance of new technology. Accordingly, they should be defined based on the contents of the whole description of the present disclosure.

Herein, a base station that performs resource allocation to the terminal may be an eNode B, a Node B, a base station (BS), a radio access unit, a base station controller, or node on a network. The terminal may include a user equipment (UE), a mobile station (MS), a cellular phone, a smart phone, a computer, or a multimedia system that can perform a communication function.

A DL is a radio transmission path of a signal that is transmitted from the base station to the terminal, and a UL is a radio transmission path of a signal that is transmitted from the terminal to the base station.

Further, although an LTE or LTE-A system is hereinafter exemplified in explaining an embodiment of the present disclosure, the embodiment of the present disclosure may be applied to even other communication systems having similar technical backgrounds or channel types. For example, the 5G mobile communication technology (5G or new radio (NR)) developed after LTE-A may be included therein. Further, the embodiment of the present disclosure may also be applied to other communication systems through partial modifications thereof in a range that does not greatly deviate from the scope of the present disclosure through the judgment of those skilled in the art.

A TTI may be a unit in which a control signal and a data signal are transmitted, or may be a unit in which the data signal is transmitted. For example, in a downlink in existing conventional LTE system, the TTI becomes a subframe that is a time unit of 1 ms. However, in an uplink according to an embodiment of the present disclosure, a TTI is a unit in which a control signal or a data signal is transmitted, or is a unit in which the data signal is transmitted. In the uplink in the conventional LTE system, the TTI is a subframe that is a time unit of 1 ms in the same manner as in the down link.

Unless specially mentioned, a shortened-TTI terminal includes a terminal capable of transmitting control information, data, control information, and/or data at a TTI of 1 ms or shorter, and a normal-TTI type terminal includes a terminal capable of transmitting control information, data, control information and/or data at the TTI of 1 ms. Further, in the present disclosure, a shortened-TTI, a shorter-TTI, a short TTI, and an sTTI have the same meaning, and may be used interchangeably. Further, in the present disclosure, a normal-TTI, a subframe TTI, and a legacy TTI have the same meaning, and may be used interchangeably.

As described above, 1 ms that is a basis for discriminating between the shortened-TTI and the normal-TTI may differ depending on the system. That is, in a specific NR system, based on 0.2 ms, if the TTI is shorter than 0.2 ms, it may be a shortened-TTI, and if the TTI is 0.2 ms, it may be a normal-TTI.

An important factor of performance of a wireless cellular communication system is packet data latency. In an LTE system, signal transmission/reception is performed in a unit of a subframe having a TTI of 1 ms. Therefore, a terminal having a TTI shorter than 1 ms (i.e., a short-TTI UE) may be supported.

However, in the NR, which is a 5G mobile communication system, a TTI may be shorter than 1 ms.

It is expected that a short-TTI terminal will be suitable for a voice over LTE (VoLTE) service in which the latency is important and a remote control service. Further, the short-TTI terminal is expected to be capable of realizing cellular-based mission-critical Internet of things (IoT).

In the present disclosure, shortened-TTI data refers to data that is transmitted from a PDSCH or PUSCH in a unit of a shortened TTI, and a normal-TTI data refers to data that is transmitted from the PDSCH or PUSCH in a unit of a subframe. A control signal for a shortened-TTI refers to a control signal for a shortened-TTI mode operation, i.e., an sPDCCH, and a control signal for a normal-TTI refers to a control signal for a normal-TTI mode operation. For example, a control signal for a normal-TTI may be a physical control format indicator channel (PCFICH), a PHICH, PDCCH, EPDCCH, or PUCCH in a conventional LTE system.

Herein, the terms "physical channel" and "signal" may be used interchangeably with "data" or "control signal". For example, although the PDSCH is a physical channel through which normal-TTI data is transmitted, the PDSCH may be referred to as normal-TTI data. Further, although the sPDSCH is a physical channel through which shortened-TTI data is transmitted, the sPDSCH may be referred to as shortened-TTI data. Similarly, shortened-TTI data transmitted in the downlink and the uplink may be referred to as sPDSCH and sPUSCH.

Herein, an uplink scheduling grant signal and a downlink data signal are referred to as a first signal, and an uplink data signal for the uplink scheduling grant and the HARQ ACK/NACK for the downlink data signal are referred to as a second signal. A signal that expects a response from the terminal among signals that the base station transmits to the terminal may be the first signal, and the response signal of the terminal corresponding to the first signal may be the second signal. Further, the service kinds (or types) of the first signal and the second signal may belong to categories, such as eMBB, mMTC, and URLLC.

A TTI length of the first signal refers to a length of time over which the first signal is transmitted, and a TTI length of the second signal refers to a length of time over which the second signal is transmitted. The transmission timing of the second signal may be information on when the terminal transmits the second signal and when the base station receives the second signal, and may be referred to as the second signal transmission/reception timing.

Unless a TDD system is specifically mentioned, it is generally assumed that the communication system being referred to is an FDD system. However, the methods and apparatuses according to the present disclosure are applicable to a TDD system through simple modification thereof.

Herein, an upper (or upper layer) signaling is a method for transferring a signal from the base station to the terminal using the downlink data channel of the physical layer or a method for transferring a signal from the terminal to the base station using the uplink data channel of the physical layer, and may also be referred to as a radio resource control (RRC) signaling or a MAC CE.

Hereinafter, $\lceil X \rceil$ indicates a smallest integer that is larger than X, and $\lfloor X \rfloor$ indicates a largest integer that is smaller than X.

FIG. 1H illustrates an example of partial retransmission according to an embodiment of the present disclosure.

Referring to FIG. 1H, a base station schedules eMBB data 1h-03 to a terminal a using a control signal 1h-01. Thereafter, if the eMBB data 1h-03 is transmitted, a part 1h-07 of a resource onto which the eMBB data is to be mapped is used to transmit another data 1h-07 to the terminal a or another terminal b. Thereafter, a part 1h-05 of the eMBB data that has been transmitted or has not been transmitted to the terminal a is retransmitted to a next TTI 1h-10. The unit of the partial retransmission may be a CB or a CB group including one or more CBs.

The eMBB control signal 1h-01 transfers scheduling information for the eMBB data 1h-03 to the terminal a. If URLLC data is generated during transmission of the eMBB data 1h-03, the base station transmits a URLLC control signal and data to terminal b (1h-07). The transmission of the URLLC control signal and data is performed through mapping of the URLLC control signal and the data (1h-07) onto a resource to be transmitted, without mapping a part of the existing scheduled eMBB data 1h-03 onto the resource.

Accordingly, a part of the eMBB is not transmitted from the existing TTI 1h-05. As a result, the eMBB terminal may fail to decode the eMBB data. To supplement this, a part of the eMBB data that is not transmitted at the TTI 1h-05 is transmitted at the TTI 1h-10 (1h-13). The partial transmission is performed at the TTI 1h-10 after the initial transmission, and may be performed without receiving HARQ-ACK information for the initial transmission from the terminal. Through the partial transmission, scheduling information may be transferred from a control signal region 1h-09 of the next TTI.

The control signal region 1h-09 of the next TTI may include information on a symbol location at which the resource mapping of the eMBB or another data 1h-17 starts when the eMBB or another data 1h-17 is transmitted to another terminal (1h-11). The information may be transferred from partial bits of the DCI transmitted from the control signal region 1h-09. Using the information on the symbol location at which resource mapping of the eMBB or another data 1h-17 starts, a specific symbol performs partial transmission 1h-15 for the previous initial transmission. The eMBB control signal 1h-01 or 1h-09 of FIG. 1H may not be transferred from the entire indicated region, but may be transferred only from the partial region. Further, it is also possible to transfer the control signal 1h-01 or 1h-09 from a partial frequency band other than the entire frequency band.

Although the partial retransmission 1h-15 is performed at the next TTI since a part of the eMBB is not transmitted for transmission of the URLLC data 1h-07, the partial retransmission may be used in a manner that the base station optionally retransmits a specific part of data although it is not caused by the URLLC data transmission. Further, because a part of the eMBB is not transmitted for transmission of the URLLC data 1h-07, the partial retransmission 1h-05 is performed at the next TTI. However, the partial retransmission 1h-15 may be discriminated as the initial transmission of the corresponding part. That is, the terminal that has received the partial retransmission 1h-15 at the next TTI 1h-10 does not perform HARQ decoding through combination with the received part at the previous TTI 1h-05, but may perform separate decoding using only the partial retransmission 1h-15 at the next TTI 1h-10.

Further, although the retransmission is performed from the first symbol after the control signal at the TTI 1h-10 after the initial transmission, the location of the retransmission may be variously changed to be applied.

Although the downlink transmission has been described as an example, the retransmission is also applicable to the uplink transmission. As indicated in (b) and (c) in FIG. 1H, CB2 and CB3 among 6 initially transmitted CBs are retransmitted.

(1-1)-th Embodiment

In accordance with an embodiment of the present disclosure, a method for configuring a piece of control information for transferring scheduling information for partial retransmission of data will be described with reference to FIGS. 1H, 1I, and 1J. Scheduling information provided in this embodiment may be referred to as single-level control information or single-stage control information.

Referring again to FIG. 1H, control information 1h-01 and 1h-09 is transmitted for scheduling of initial transmitted data 1h-03 and partial retransmission 1h-15. The control information 1h-01 and 1h-09 may include bit fields having a same size. The control information 1h-01 and 1h-09 may include bit fields for the partial retransmission. The bit fields for the partial retransmission may be a CB group indicator and a CB group NDI.

Figure 1I:
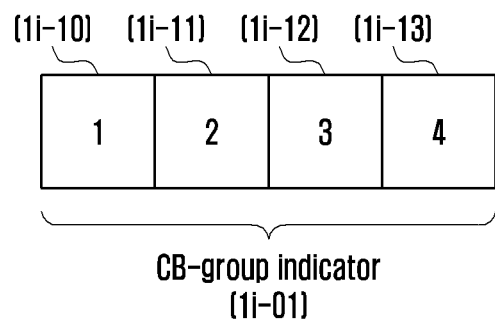
FIG. 1I illustrates an example bit configuration of a CB group indicator according to an embodiment of the present disclosure.

FIG. 1I illustrates an example bit configuration of a CB group indicator according to an embodiment of the present disclosure.

Referring to FIG. 1I, the CB group indicator 1i-01 may indicate CBs that are included in one TB of data currently scheduled for downlink data transmission. If the scheduling is for uplink transmission, the CB group indicator may indicate the CBs that the terminal should transmit in one TB.

For example, FIG. 1I illustrates a CB group indicator 1i-01 including 4 bits 1i-10, 1i-11, 1i-12, and 1i-13. In mapping the CBS indicated by the respective bits, a method provided according to the (1-3)-th embodiment below may be applied. Simply, for example, if one TB is composed of 4 CBs, information indicating one CB may be mapped onto one bit in order from the front. For example, if 4 bits 1i-10, 1i-11, 1i-12, and 1i-30 of the CB group indicator 1i-01 indicate 0110, second and third CBs may be transmitted. If 4 bits 1i-10, 1i-11, 1i-12, and 1i-30 of the CB group indicator 1i-01 indicate 0000, the base station and the terminal may determine that the corresponding transmission corresponds to an initial transmission.

Figure 1J:
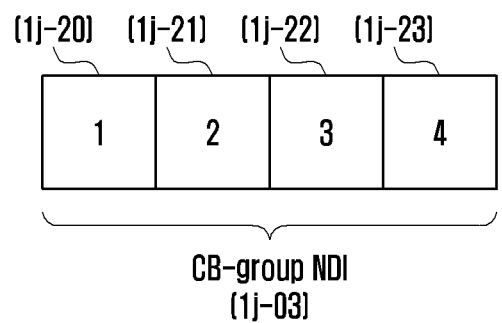
FIG. 1J illustrates an example bit configuration of a CB group new data indicator (NDI) according to an embodiment of the present disclosure.

FIG. 1J illustrates an example bit configuration of a CB group NDI according to an embodiment of the present disclosure.

Referring to FIG. 1J, the CB group NDI 1j-03 may indicate whether decoding is performed using information of the initially transmitted CB or the currently transmitted CB by discarding the information of the initially transmitted CB in decoding the currently received CB or CB groups through downlink data transmission. The CB group NDI may not be included in the control information for uplink scheduling.

For example, FIG. 1J illustrates the CB group NDI 1j-03 including bits 1j-20, 1j-21, 1j-22, and 1j-23. In mapping the CB indicated by respective bits, a method provided according to the (1-3)-th embodiment below may be applied. Simply, for example, if one TB is composed of 4 CBs, information indicating one CB may be mapped onto one bit in order from the front. For example, if 4 bits 1j-20, 1j-21, 1j-22, and 1j-23 of the CB group NDI 1j-03 indicate 0110, decoding may be performed using currently received second and third CB portions by non-using or discarding the second and third CB information previously received in decoding the second and third CBs.

In analyzing the CB group NDI, the CB group NDI may be connected to the CB group indicator as described above because only partial CBs may be transmitted in the current retransmission, and therefore, the CB group NDI may be effective only with respect to the currently retransmitted CBs. Accordingly, in decoding the CB or the CB group, if it is determined to discard the initially transmitted information, determination may be made by multiplying bits of respective components of the CB group NDI and the CB group indicator. When 4 CBs are transmitted, e.g., if the CB group NDI is 0101 and the CB group indicator is 0110, the terminal may determine that the second and third CBs are currently transmitted in accordance with the CB group indicator. In decoding the second CB in accordance with multiplication 0100 of components of the CB group NDI and the CB group indicator, decoding may be performed by discarding the initially transmitted result, and in decoding the third CB, decoding may be performed together with the initially transmitted result.

Figure 1K:
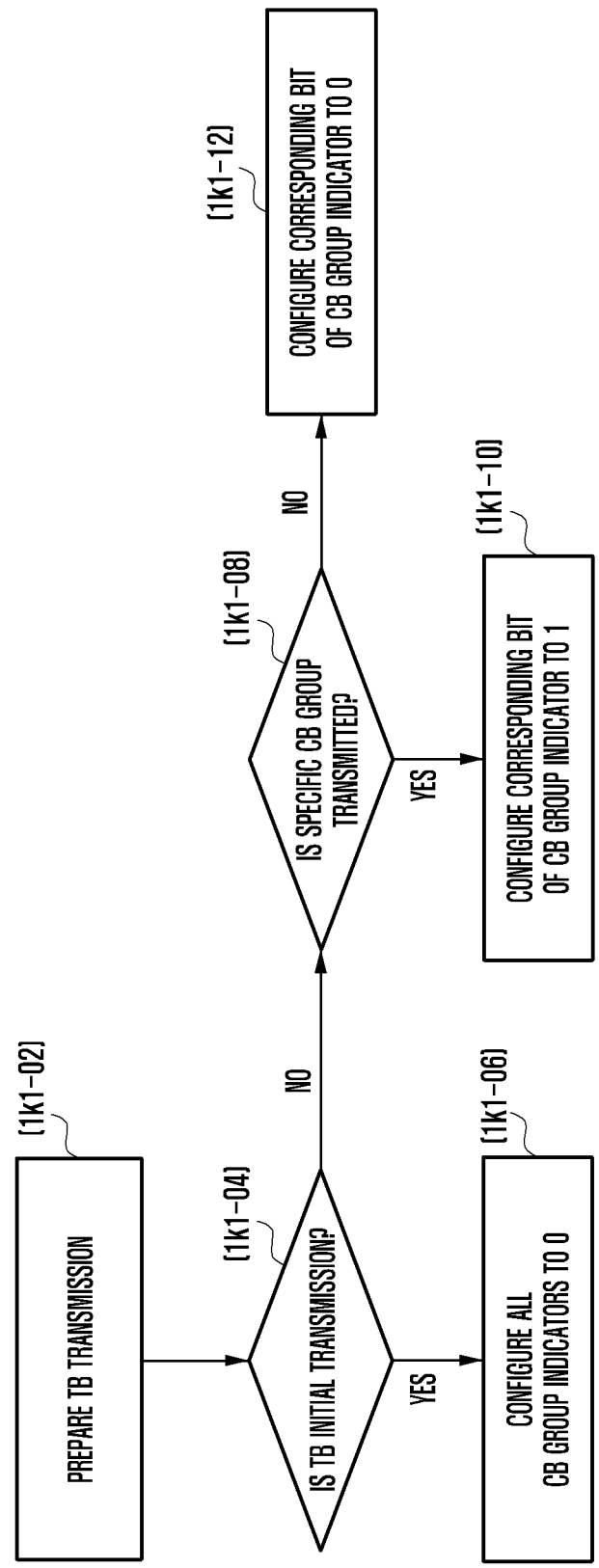
FIG. 1KA is a flowchart illustrating a method for a base station to configure a bit field of a CB group indicator according to an embodiment of the present disclosure.
Figure 1K:
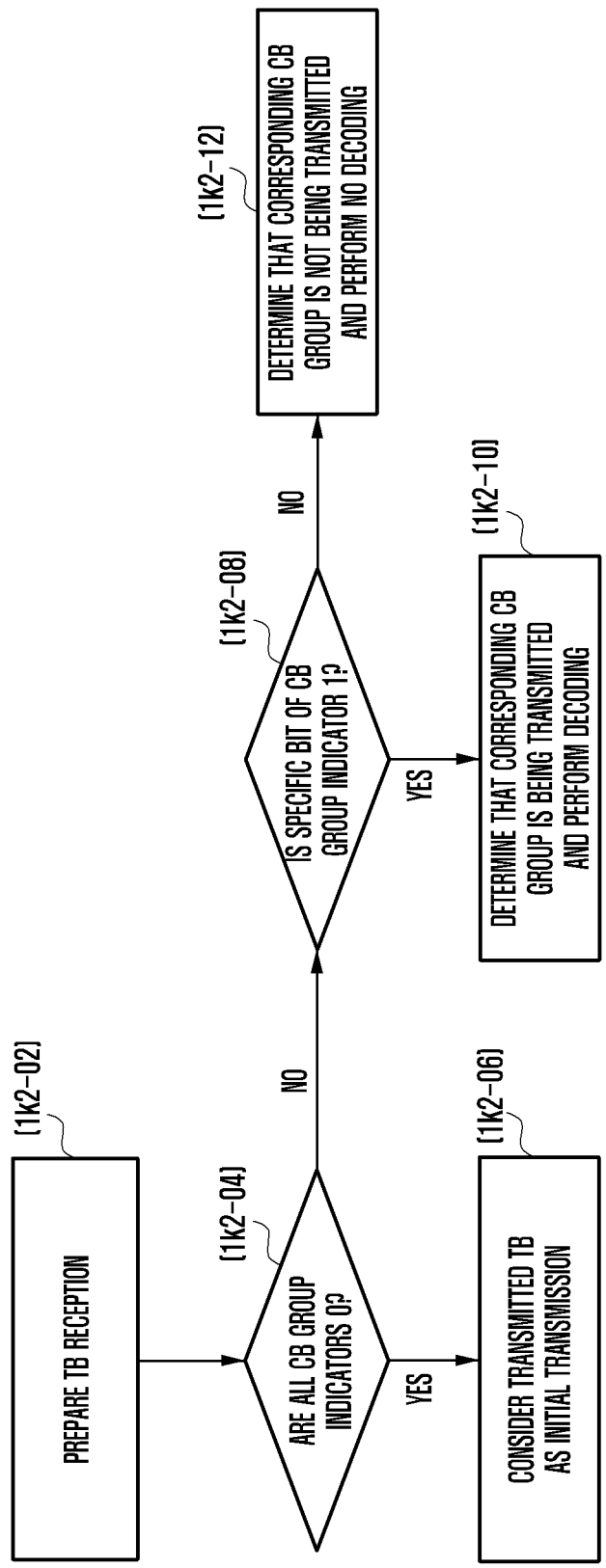
Figure 1K:
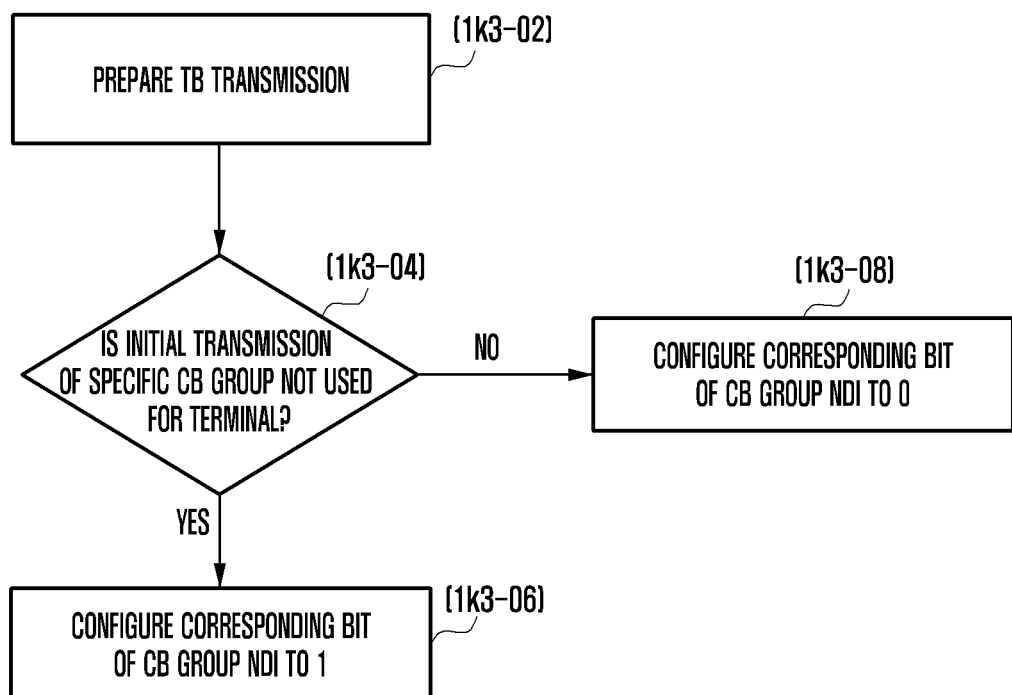
Figure 1K:
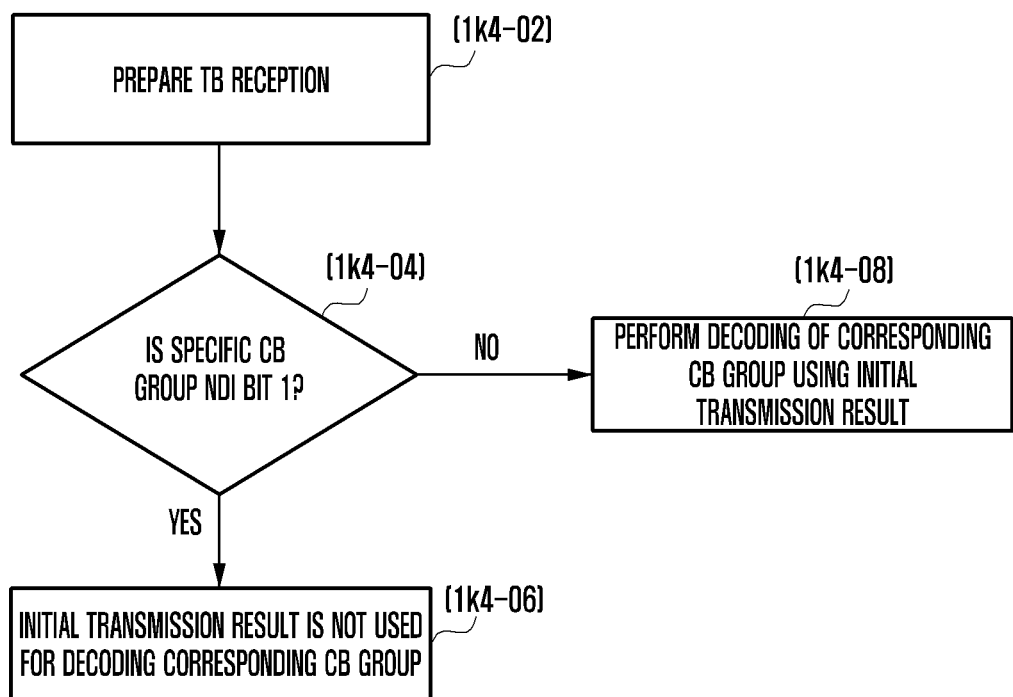

FIGS. 1KA to 1KD are flowcharts illustrating the operations of a base station and a terminal that configure the CB group indicator and the CB group NDI. For convenience, explanation will be made based on downlink data transmission, and may also be applied to uplink data transmission.

FIG. 1KA is a flowchart illustrating a method for a base station to configure a bit field of a CB group indicator indicating whether to transmit a CB group in transmitting a TB.

Referring to FIG. 1KA, in step 1k1-02, the base station prepares transmission of a TB, and in step 1k1-04, determines whether the TB transmission is an initial transmission.

If the TB is the initial transmission in step 1k1-04, all CB group indicators are configured to 0 in step 1k1-06. However, if the TB is not the initial transmission in step 1k1-04, the base station determines whether a specific CB group is to be transmitted in step 1k1-08.

If a specific CB group is to be transmitted, the corresponding bit of the CB group indicator is configured to 1 in step 1k1-10. However, if a specific CB group is not to be transmitted, a corresponding bit of the CB group indicator is configured to 0 in step 1k1-12.

FIG. 1KB is a flowchart illustrating a method for a terminal to decode CB groups by analyzing a bit field of a CB group indicator indicating whether to transmit a CB group in receiving a TB according to an embodiment of the present disclosure.

Referring to FIG. 1KB, in step 1k2-02, the terminal prepares for reception of a TB, and in step 1k2-04, determines whether CB group indicators are all 0. If the CB group indicators are all 0, the transmitted TB is identified as the initial transmission in step 1k2-06. If the CB group indicators are not all 0, the terminal determines whether a specific bit of the CB group indicator is 1 in step 1k2-08. If the specific bit of the CB group indicator is 1, the terminal determines that the corresponding CB group is transmitted, and decodes the corresponding CB group in step 1k2-10. If the specific bit of the CB group is 0, the terminal determines that the corresponding CB group is not transmitted, and the corresponding CB group is not decoded in step 1k2-12.

FIG. 1KC is a flowchart illustrating a method for a base station to configure a bit field of a CB group NDI so that an initial transmission of a CB group previously transmitted is not to be used for terminal decoding in transmitting a TB according to an embodiment of the present disclosure.

Referring to FIG. 1KC, the base station prepares for transmission of a TB in step 1k3-02, and determines whether to make the initial transmission of a specific CB group be non-used for terminal decoding in step 1k3-04. If the base station determines to make the initial transmission of a specific CB group be non-used for terminal decoding in step 1k3-04, in order for a terminal to perform decoding using only a currently transmitted CB group, without using the base station initial transmission of a specific CB group, a corresponding bit of a CB group NDI is configured to 1 in step 1k3-06. If the base station determines not to make the initial transmission of a specific CB group be non-used for terminal decoding in step 1k3-04, i.e., the terminal is to perform HARQ combining using the initial transmission of the specific CB group and perform decoding of the currently transmitted CB group, the corresponding bit of the CB group NDI is configured to 0 in step 1k3-08.

FIG. 1KD is a flowchart illustrating a method for a terminal to determine whether to use an initial transmission of a previously transmitted CB group for terminal decoding by confirming an NDI bit field of a specific CB group according to an embodiment of the present disclosure.

Referring to FIG. 1KD, the terminal prepares for reception of a TB in step 1k4-02, and determines whether a specific bit of a CB group NDI is 1 in step 1k4-04. If the specific bit of the CB group NDI is 1 in step 1k4-04, the initial transmission of the corresponding CB group is not used for decoding the current CB group in step 1k4-06. However, if the specific bit of the CB group NDI is 0 in step 1k4-04, HARQ combining is performed in order to use the initial transmission of the corresponding CB group for decoding of the current CB group in step 1k4-08.

Sizes of a bit field of a CB group indicator and an NDI bit field of the CB group may be preconfigured from the base station, or a determined value may be used.

If the bit field of a CB group indicator and an NDI bit field of the CB group are included in control information, NDI information of the TB may be omitted from the control information.

(1-1-1)-th Embodiment

In accordance with an embodiment of the present disclosure a method is provided for performing CB group unit retransmission while reducing the bit number of control information when configuring one piece of control information for transferring scheduling information of partial retransmission of data. Further, CB group indication value (CIV) information may be included in the control information for partial retransmission. For example, the CIV information is not included in the control information for an initial transmission or a full retransmission, but is included in the control information for a partial retransmission. Further, the control information may include a one-bit indicator for indicating whether the control information is for an initial transmission or full retransmission, or for a partial retransmission.

In a DCI for retransmission, it is possible to reduce resource allocation for information bits. For example, increasing a resource allocation unit value, as compared with that during the initial transmission, when performing the partial retransmission, reduces the resource allocation for information bits. For example, in an initial transmission, resource allocation information is transferred in 1 PRB, whereas in a retransmission, the resource allocation information is transferred in 4 PRBs. Accordingly, the number of bits of the resource allocation information can be reduced, and as a result, may be used for the CB group indicator.

For resource allocation, an RBG may be defined for resource allocation, and the resource allocation may be performed in a unit of the RBG.

TABLE 2

| system bandwidth $N\_RB^{DL}$ | RBG size 1 P1 | RBG size 2 P2 |
| --- | --- | --- |
| <=10 | 1 | 2 |
| 11-26 | 2 | 4 |
| 27-63 | 3 | 6 |
| 64-112 | 4 | 8 |
| 112-224 | 8 | 16 |
| 224-440 | 16 | 32 |

Table 2 is an example in which the RBG size according to the PRB number included in a system bandwidth is defined. In Table 2, P1 is an RBG value used to configure the resource allocation information bits included in the control information for the initial transmission or full retransmission, and P2 is an RBG value used to configure the resource allocation information bits included in the control information for partial retransmission.

For example, if there are 400 PRBs in the system frequency band, 1 RBG includes 16 PRBs in the initial transmission, and if resource allocation is made in a bit map method, 25-bit resource allocation information is necessary in the initial transmission or the full retransmission. However, in the partial retransmission, 1 RBG includes 32 PRBs, and 13-bit resource allocation information is necessary.

Accordingly, in the partial retransmission, as compared with the initial transmission or full retransmission, bits of the resource allocation information may be reduced by 12 bits, and these 12 bits may be used as a 6-bit CB group indicator and a 6-bit CB group NDI, where one TB is divided into 6 CB groups. Further, the 12 bits may be used to transfer 12-bit CIV information, where one TB is divided into 7 CB groups. A 1-bit partial retransmission indicator may be used to indicate whether the control information is for an initial transmission or full retransmission, or a partial retransmission.

FIG. 1KE is a diagram illustrating methods of a base station and a terminal according to an embodiment of the present disclosure.

Referring to FIG. 1KE, the base station prepares downlink or uplink scheduling in step 1k5-02, and determines whether the scheduling is for an initial transmission or a TB-unit full retransmission in step 1k5-04. If the scheduling is for the initial transmission or the full retransmission, the base station configures resource allocation information by setting a partial retransmission indicator to 0 and selecting P1 as an RBG value, and includes the configured resource allocation information in control information in step 1k5-06.

However, if the scheduling is for the partial retransmission, the base station configures the resource allocation information by setting the partial retransmission indicator to 1 and selecting P2 as the RBG, and includes the CB group indicator and CB group NDI information in the control information in step 1k5-08. Alternatively, the CB group indicator and the CB group NDI may be replaced by a CIV value as will be described below.

In step 1k5-12, the terminal decodes received control information.

In step 1k5-14, the terminal determines whether a partial retransmission indicator of a specific bit is 0.

If the partial retransmission indicator is 0, the terminal determines that the scheduling is for the initial transmission or the full retransmission, and analyzes the resource allocation information by selecting a P1 value as the RBG in step 1k5-16. In step 1k5-18, transmission/reception is performed to follow the initial transmission or the full retransmission.

However, if the partial retransmission indicator is 1 in step 1k5-14, the terminal determines that the corresponding control information is for a partial retransmission, analyzes the resource allocation information by selecting a P2 value as the RBG, and analyzes the CB group indicator and the CB group NDI value in step 1k5-20. Alternatively, the CB group indicator and the CB group NDI may be replaced by the CIV value, as will be described below.

The information indicated by the partial retransmission indicator value may differ depending on pre-engagement.

In the DCI for the retransmission, MCS and redundancy version (RV) bits to be applied may be reduced. For example, while performing a partial retransmission, the MCS and the RV are selected in a limited range as compared with those during performing the initial transmission, and thus, the MCS and RV bits can be reduced. For example, during the initial transmission, all MCSs from QPSK to 256QAM can be selected, whereas during the retransmission, only MCSs within a predetermined value of the MCSs used during the initial transmission may be selected. Accordingly, the number of bits for the MCS and RV can be reduced, and therefore, may be used for the CB group indicator.

(1-1-2)-th Embodiment

In accordance with an embodiment of the present disclosure, a method is provided for inserting an indicator for discriminating between an initial transmission and a partial retransmission, or an indicator for discriminating between a full retransmission and a partial retransmission, into control information for transferring scheduling information of the partial retransmission of data.

For example, if one DCI bit at a specific location is 0, the terminal determines that scheduling using the currently transferred DCI performs full retransmission of one TB, and analyzes the received DCI as a DCI for a full retransmission.

However, if one DCI bit at a specific location is 1, the terminal determines that scheduling using the currently transferred DCI performs retransmission in a unit of a CB group, and analyzes the received DCI as a DCI for a partial retransmission.

The above-described information may be transferred using one separate bit. For example, if the corresponding indicator is 0, it indicates a full retransmission, whereas if the corresponding indicator is 1, it indicates a partial retransmission.

The information may also be transferred using a 2-bit NDI value. For example, if the corresponding indicator is 00, it indicates an initial transmission, and if the corresponding indicator is 01, it indicates a full retransmission. However, if the corresponding indicator is 10, it indicates a partial retransmission.

(1-1-3)-th Embodiment

In accordance with an embodiment of the present disclosure, a method is provided for inserting an indicator for discriminating between an initial transmission and a partial retransmission, or an indicator for discriminating between a full retransmission and a partial retransmission into control information, where a CB group indicator and a CB group NDI are not transmitted from a base station to a terminal.

The above-described information may be transferred using one separate bit. For example, if the corresponding indicator is 0, it indicates a full retransmission, whereas if the corresponding indicator is 1, it indicates a partial retransmission.

The information may also be transferred using a 2-bit NDI value. For example, if the corresponding indicator is 00, the terminal may determine that it indicates an initial transmission, and if the corresponding indicator is 01, it indicates a full retransmission. However, if the corresponding indicator is 10, the terminal may determine that it indicates a partial retransmission.

In the case of the full retransmission, corresponding TBs are all retransmitted, whereas in the case of the partial retransmission, only CB groups determined as NACK may be retransmitted in accordance with HARQ-ACK information of the CB group transferred from the terminal. A method for the terminal to transfer the HARQ-ACK information of the CB group may be performed as in the (1-4)-th embodiment, (1-5)-th embodiment, and (1-5-1)-th embodiment of the present disclosure.

(1-2)-th Embodiment

In accordance with an embodiment of the present disclosure, a method is provided for configuring two pieces of control information for transferring scheduling information for a partial retransmission of data. A scheduling information provided in this embodiment may be referred to as two-level control information or two-stage control information.

Figure 1L:
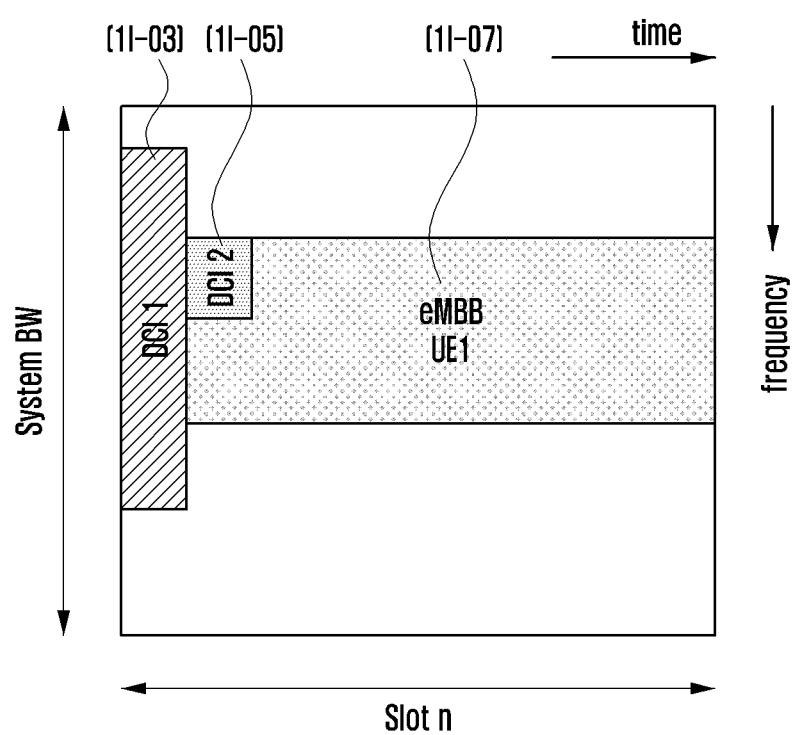
FIG. 1L illustrates control information mapped for transmission according to (an embodiment of the present disclosure.

FIG. 1L illustrates control information mapped for transmission according to an embodiment of the present disclosure. Specifically, FIG. 1L illustrates downlink data transmission, control signals DCI 1, and DCI 2 being transmitted, and data being mapped onto frequency-time resources.

Referring to FIG. 1L, in a region pre-engaged between a base station and a terminal or a region configured by the base station, the control signal DCI 1 1*l*-03 may be mapped to be transmitted. The DCI 1 1*l*-03 may include a carrier indicator field, resource block allocation, frequency hopping indicator, DCI format indicator, MCS value, RV value, NDI value, cyclic shift indicator to be used for DMRS, uplink index, SRS request indicator, resource allocation type indicator, and HARQ process number. In a part of the allocated resource block region indicated by the DCI 1 1*l*-03, the DCI 2 1*l*-05 may be transmitted.

The DCI 2 1*l*-05 may include a bit field of a CB group indicator and an NDI bit field of a CB group. Sizes of the bit field of the CB group indicator and the NDI bit field of the CB group may be calculated from control information included in the DCI 1 1*l*-03. For example, TBS may be calculated from the number of allocated resource blocks and the MCS value, and the number of CBs or the number of CB groups may be known from the predetermined or configured maximum length of the CB. Accordingly, the number of CBs or the number of CB groups may be the sizes of the bit field of the CB group indicator and the NDI bit field of the CB group.

For example, if the number of CBs calculated from the DCI 1 and predetermined information is 4, the CB group indicator and the CB group NDI are respectively composed of 4 bits. Accordingly, the terminal may receive the DCI 2, and may find out the CB group indicator and the CB group NDI information.

FIGS. 1KA to 1KD are flowcharts illustrating the operations of a base station and a terminal that configure the CB group indicator and the CB group NDI. For convenience, explanation will be made based on downlink data transmission, and may also be applied to uplink data transmission.

FIG. 1KA is a flowchart illustrating a method for a base station to configure a bit field of a CB group indicator indicating whether to transmit the CB group in transmitting a TB. When preparing transmission of a TB (1*k*1-02), the base station confirms whether the TB transmission is an initial transmission (1*k*1-04). If the TB is the initial transmission, all CB group indicators are configured to 0 (1*k*1-06). If the TB is not the initial transmission, it is confirmed whether a specific CB group is to be transmitted (1*k*1-08). If the CB group is transmitted, the corresponding bit of the CB group indicator is configured to 1 (1*k*1-10), whereas if the CB group is not transmitted, the corresponding bit of the CB group indicator is configured to 0 (1*k*1-12).

FIG. 1KB is a flowchart illustrating a method for a terminal to decode CB groups through analyzing of a bit field of a CB group indicator indicating whether to transmit a CB group in receiving a TB. When preparing reception of a TB (1*k*2-02), the terminal confirms whether CB group indicators are all 0 (1*k*2-04). If the CB group indicators are all 0, the transmitted TB is considered as the initial transmission (1*k*2-06). If the CB group indicators are not all 0, it is confirmed whether a specific bit of the CB group indicator is 1 (1*k*2-08). If the specific bit of the CB group indicator is 1, it is determined that the corresponding CB group is transmitted, and decoding of the corresponding CB group is performed (1*k*2-10). If the specific bit of the CB group is 0, it is determined that the corresponding CB group is not transmitted, and decoding of the corresponding CB group is not performed (1*k*2-12).

FIG. 1KC is a flowchart illustrating a method for a base station to configure a bit field of a CB group NDI so that the initial transmission of the CB group previously transmitted is made not to be used for terminal decoding in transmitting the TB. When preparing transmission of a TB (1*k*3-02), the base station determines whether to make the initial transmission of a specific CB group be non-used for terminal decoding (1*k*3-04). In order for a terminal to perform decoding using only currently transmitted CB group without using the initial transmission of the specific CB group, the corresponding bit of the CB group NDI is configured to 1 (1*k*3-06). If the terminal performs HARQ combining using the initial transmission of the specific CB group and performs decoding of the currently transmitted CB group, the corresponding bit of the CB group NDI is configured to 0 (1*k*3-08).

FIG. 1KD is a flowchart illustrating a method for a terminal to determine whether to use the initial transmission of the previously transmitted CB group for terminal decoding through confirming of an NDI bit field of a specific CB group. When preparing reception of a TB (1*k*4-02), the terminal confirms whether a specific bit of a CB group NDI is 1 (1*k*4-04). If the specific bit of the CB group NDI is 1, the initial transmission of the corresponding CB group is not used for decoding the current CB group (1*k*4-06). If the specific bit of the CB group NDI is 0, HARQ combining is performed in order to use the initial transmission of the corresponding CB group for decoding of the current CB group (1*k*4-08).

(1-2-1)-th Embodiment

According to the (1-2-1)-th embodiment, a method for selecting a channel coding applied to DCI 1 and DCI 2 in the (1-2)-th embodiment will be described.

The base station configures bit fields of DCI 1 and applies a polar code. A CRC may be added before the polar code is applied. Further, the base station configures bit fields of DCI 2 and applies a Reed-Muller (RM) code or a block code. The base station can apply different channel codes in accordance with the length of the bit field of DCI 2. If the bit field of DCI 2 is indicated as $o_n$, a channel code output $b_i$ may be calculated using Table 3 and Equation (1) below.

TABLE 3

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |

TABLE 3-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 0 | 1 | 0 | 1 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 1 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

$$b_i = \sum_{n=0}^{O-1} (o_n \cdot M_{i,n}) \bmod 2 \quad (1)$$

The terminal receives a control channel, and when decoding the control information, performs decoding through application of different channel codes in accordance with DCI 1 and DCI 2. That is, for decoding DCI 1, the terminal uses a decoder for the polar code, and for decoding DCI 2, the terminal uses a decoder for the block code or the RM code.

Figure 1M:
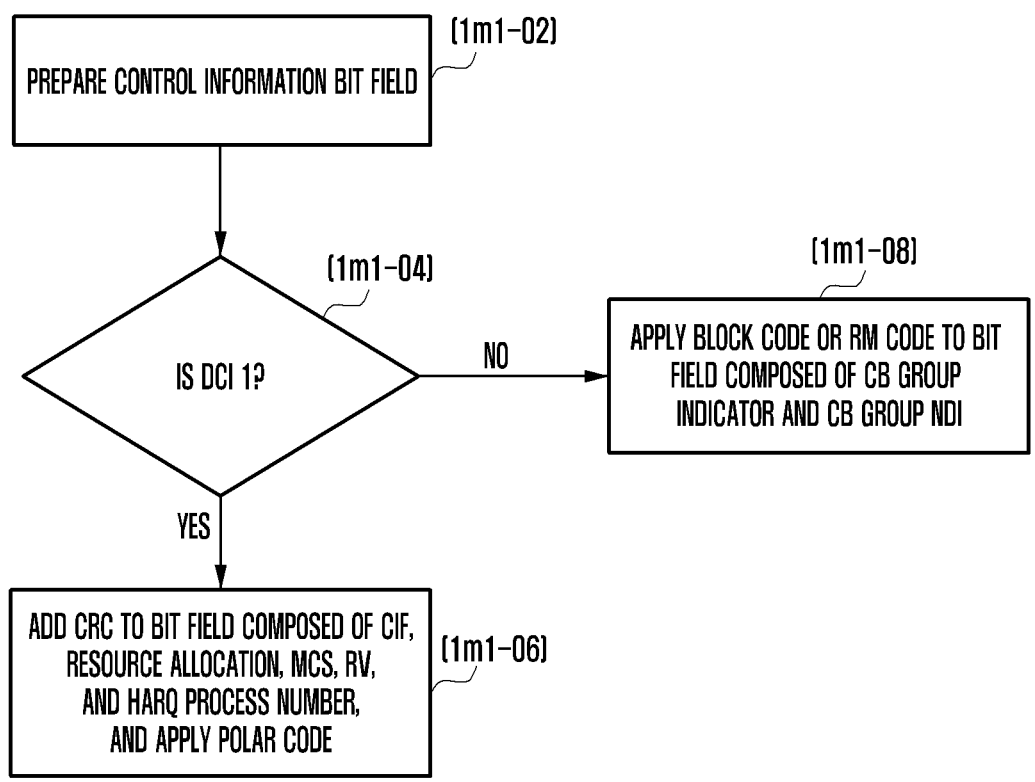
FIG. 1MA is a flowchart illustrating a method for a base station to apply a channel code based on a control information type according to an embodiment of the present disclosure.
Figure 1M:
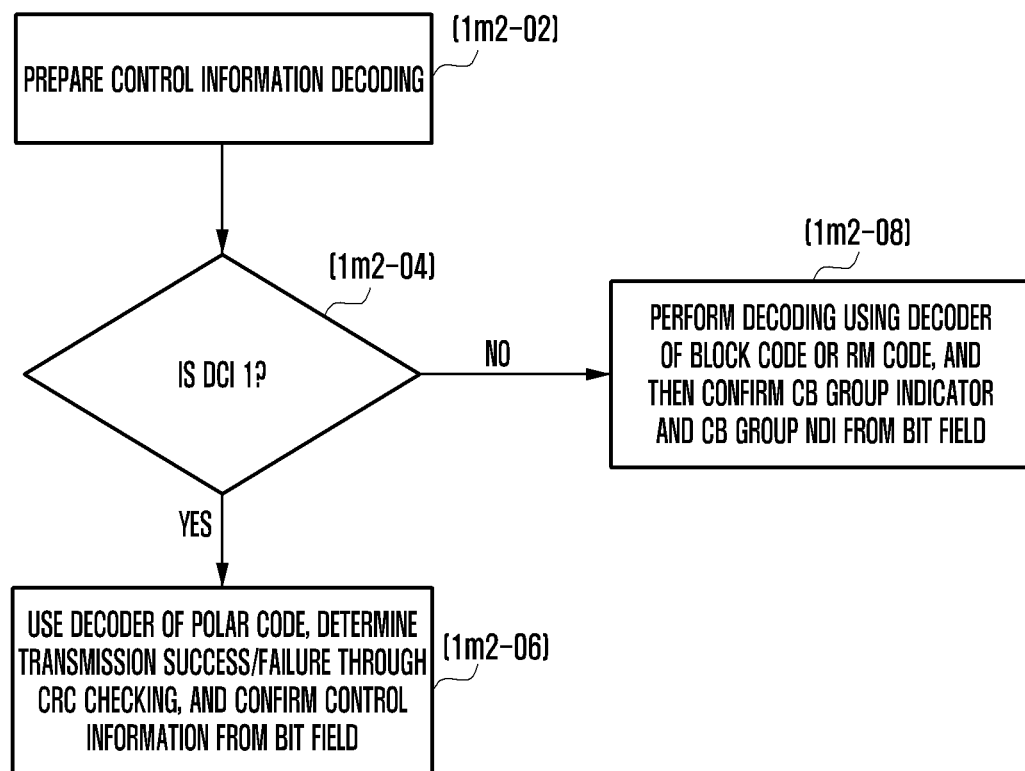

FIG. 1MA is a flowchart illustrating a method for a base station to apply a channel code based on a control information type according to an embodiment of the present disclosure.

Referring to the FIG. 1MA, a base station prepares control information bit field (1m1-02), and determines whether a format of the control information is DCI 1 (1m1-04). If the base station determines the format is not DCI 1, the base station applies a block code or a RM code to the bit field composed of a CB group indicator and a CP group NDI (1m1-08). If the base station determines the format is DCI 1, the base station adds CRC to the bit field composed of CIF, resource allocation, MCS, RV, and HARQ process number and applies a polar code to the bit field (1m1-06).

FIG. 1MB is a flowchart illustrating a method for a terminal to perform channel code decoding based on a control information type according to an embodiment of the present disclosure.

Referring to the FIG. 1MB, the terminal prepares decoding control information (1m2-02) and determines whether a format of the control information is DCI 1 (1m2-04). If the terminal determines the format is not DCI 1, the terminal performs decoding by using a decoder of a block code or a RM code, and confirms CB group indicator and CB group NDI from the bit field (1m2-08). If the terminal determines the format is DCI 1, the terminal performs decoding by using a polar code, determines transmission succeed/failure through CRC checking, and confirms the control information from the bit field (1m2-06).

Although FIGS. 1MA and 1MB illustrate that a polar code is applied to DCI 1 and an RM code is applied to DCI 2, they may be generalized by a method for applying a first channel code and a second channel code. Alternatively, the polar code may be used as the first channel code applied to DCI 1, and a repetition code may be used as the second channel code applied to DCI 2.

(1-2-2)-th Embodiment

In accordance with an embodiment of the present disclosure, one of a bit field of the CB group indicator and an NDI bit field of the CB group may be omitted from the control information based on the configuration of the base station.

For example, when the CB group NDI is omitted and the CB group indicator is used. During a partial retransmission, a base station may retransmit only specific CB groups, and may transfer to the terminal information on the CB groups that are being used for retransmission through the CB group indicator. The terminal and the base station may previous determine whether to perform decoding with respect to the CB groups received through partial retransmission, after performing HARQ combining of the initial transmission, or to perform decoding using only data of the newly received CB groups by discarding data of the corresponding CB groups received during the initial transmission.

For example, the terminal and the base station may predetermine to always perform decoding using only data of the newly received CB groups while discarding the data of the corresponding CB groups indicated by the CB group indicator received during the initial transmission while the partial retransmission is performed. Further, the base station may configure the terminal, through upper signaling, as to whether to perform decoding with respect to the CB groups received through the partial retransmission, after performing the HARQ combining of the initial transmission, or to perform decoding using only data of the newly received CB groups by discarding the data of the corresponding CB groups received during the initial transmission.

(1-2-3)-th Embodiment

In accordance with an embodiment of the present disclosure, a method is provided, in which a bit field of a CB group indicator and an NDI bit field of a CB group are included in one field to be simultaneously analyzed in control information based on the configuration of the base station. Specifically, a CB group indication value (CIV) is introduced, and through one CIV value, the CB group indicator and the CB group NDI information as described above according to the (1-1)-the embodiment or the (1-2)-th embodiment are transferred, will be described. As described above, if the CIV information is transferred from one piece of control information, the NDI information of a TB may be omitted.

For example, the CIV value may be determined as follows.

Three scenarios are considered, 1) one CB group is not retransmitted, 2) the terminal performs decoding of the corresponding CB group using only newly received portion while discarding the data for the initial transmission even if the retransmission is performed, or 3) the terminal performs decoding through performing HARQ combining with respect to the retransmitted portion and the initially transmitted portion after the retransmission is performed.

Accordingly, if it is assumed that N CB groups in total are transmitted during the initial transmission, the number of cases that the terminal should consider when the retransmission is performed may be 3^(N)−1 (or 3N−1), because a control signal in accordance with the retransmission will not be transferred when N CB groups exist, each group has three kinds of cases, and all the CB groups are not retransmitted. Accordingly, the number of cases 3N−1 to be considered by the terminal may be expressed as an N-digit ternary number.

For example, if 4 CB groups exist, the CIV value may be expressed as 0120(3). In the above case, X(3) indicates X as a ternary number.

In the above-described example, 0 at each digit indicates that the corresponding CB group has not been retransmitted, and 1 at each digit indicates that decoding should be performed using only newly received portion while discarding the data for the initial transmission, although the corresponding CB group has been retransmitted. Further, 2 at each digit may indicate that HARQ combining should be performed with respect to the retransmitted portion and the initially transmitted portion when the corresponding CB group has been retransmitted.

Accordingly, 0120(3) indicates to perform decoding using only data of the second retransmitted CB group while discarding the data of the second CB group initially transmitted, where first and fourth CB groups are not retransmitted, but the second CB group is retransmitted, and may indicate that the third CB group is retransmitted, and that decoding can be performed by performing HARQ combining with respect to the retransmitted portion and the initially transmitted portion.

Accordingly, the number of cases that the terminal should consider from 0001(3) to 2222(3) is 34−1=80 in total. That is, the CIV value can be expressed by a 4-digit ternary number, and the CIV value determined, as shown above, may be converted into a binary number to be inserted into a bit field of control information. That is, if 4 CB groups exist, and 4 bits of the CB group indicator and 4 bits of the CB group NDI are required, a total of 8 bits are required. However, using the above-described CIV value, a total of 7 bits are required for 80 cases. As described above, the CIV value may be directly converted into a binary number, or the CIV-1 value may be converted into a binary number to be included in the control information.

If CIV=0120(3) is converted into a 7-digit binary number, it becomes CIV=0001111(2). Accordingly, 0001111 may be included in the control information.

Further, the CIV-1 value may be converted into a binary number, and 0001110 may be included in the control information.

If the control information is received, the terminal identifies the above-described CIV value, and converts the CIV value into a ternary number, in order to determine transmission information for the respective CB groups.

The above-described method is merely exemplary to define the CIV value, and the CIV value may be defined by other methods. For example, two CB groups can be defined as shown in Table 4 below.

TABLE 4

| CIV | First CB group | Second CB group |
|---|---|---|
| 0 | Initial transmission | Initial transmission |
| 1 | Initial transmission | Retransmission |
| 2 | Initial transmission | Non-transmission |
| 3 | Retransmission | Initial transmission |
| 4 | Retransmission | Retransmission |
| 5 | Retransmission | Non-transmission |
| 6 | Non-transmission | Initial transmission |
| 7 | Non-transmission | Retransmission |

Using Table 4, if there is data previously received by the terminal for the corresponding CB group, the initial transmission may indicate to perform decoding using only newly received portion while discarding the previously received portion, and retransmission may indicate to perform decoding together with the data previously received for the corresponding CB group. Non-transmission may indicate that the corresponding CB group is not currently transmitted. Accordingly, in Table 4, for CIV=1, the first CB group may indicate that if the terminal receives the first CB group, the corresponding CB group is to be decoded using only a newly received portion while the previous reception portion is discarded, and the second CB group may indicate that the corresponding CB group is to be decoded by performing HARQ combining together with the previously received portion. Table 4 may be modified in various methods and may be applied to define the CIV information.

(1-3)-th Embodiment

In accordance with an embodiment of the present disclosure, a method is provided for configuring a CB indicator and a CB NDI bit field included in control information.

The number M of code block groups may be upper-signaled from the base station to the terminal, or information on an M value may be transferred to the DCI. Further, the number M may be automatically determined in accordance with the number of code blocks included in the TBS, TB, or system frequency bands. For example, the number M of code block groups may be determined in accordance with the TBS value of the scheduled data through the TBS as shown in Table 5 below.

TABLE 5

| TBS value | M |
| --- | --- |
| TBS < 61,440 | 1 |
| 61,440 < TBS < 122,880 | 2 |
| 122,880 < TBS < 184,320 | 3 |
| 184,320 < TBS < 245,760 | 4 |

Table 5 illustrates a scenario where the TBS value is smaller than 245,760, but is not limited thereto. The M value may be defined even with respect to a larger TBS value using a similar rule.

As another example, the M value may be determined in accordance with the system frequency band, assuming that the unit of the frequency resource is a resource block. The resource block corresponds to 180 kHz in the LTE system, and although the resource block corresponds to 12 subcarriers, it can be differently determined in the NR or 5G system. For example, one resource block may be a frequency band corresponding to 375 kHz. In accordance with the total number of resource blocks in the system frequency band, the M value may differ as shown in Table 6 below.

TABLE 6

| Total number of resource blocks in system frequency band | M |
| --- | --- |
| <=10 | 1 |
| 11-26 | 2 |
| 27-63 | 3 |
| 64-110 | 4 |

If transmission of several code blocks has failed after one TB is initially transmitted, a transmission end (e.g., a base station) may perform transmission only with respect to the failed code blocks when retransmission is performed. When the code block is transmitted during the retransmission, code block index information may be included in the code block to be transmitted. Accordingly, if data corresponding to the retransmission is received, a reception end may confirm the code block index information, and then perform decoding through combining with the initial transmission in decoding the corresponding code block.

After the number M of the CB groups is determined, respective CBs are included in the groups in due order.

For example, if the total number of CBs is C, $K_+$ and $K_-$ associated with CB groups can be calculated as shown in Equation (2).

$$K_+ = C - \lfloor C/M \rfloor \cdot M$$

$$K_- = M - K_+ \quad (2)$$

From the front, $K_+$ CB groups include $\lceil C/M \rceil$ CBs, and the remaining K-CB groups include $\lfloor C/M \rfloor$ CBs.

After configuring the C CBs to M CB groups, a CB group indicator and a CB group NDI having M-bit bit fields, respectively, may be generated. The n-th bit of the CB group indicator indicates the CBs belonging to the n-th CB group, and the m-th bit of the CB group NDI indicates the CBs belonging to the m-th CB group. Accordingly, the base station and the terminal may perform the methods as described above with reference to FIGS. 1KA, 1KB, 1KC, and 1KD.

For example, if C is 15 and M is 4, $K_+$ becomes 3, and $K_-$ becomes 1. That is, 3 CB groups include $\lceil C/M \rceil = \lceil 15/4 \rceil = 4$ CBs, and one CB group includes $\lfloor C/M \rfloor = \lfloor 15/4 \rfloor = 3$ CBs. Accordingly, CB 1 to CB 4 belong to CB group 1, and CB 5 to CB 8 belong to CB group 2. Further, CB 9 to CB 12 belong to CB group 3, and CB 13 to CB 15 belong to CB group 4. Although the CBs are successively included in the CB group in the description above, they may be modified to be included in the CB group in accordance with a specific rule.

Although a method has been described, in which the reception end performs feedback of whether the transmission of the code block has failed, and the transmission end performs partial retransmission of the code blocks, it is not necessary to always perform both operations in combination, and they may be separately used.

In accordance with an embodiment of the present disclosure, an initial transmission and a retransmission may indicate an initial transmission and a retransmission in a HARQ operation.

(1-4)-th Embodiment

Accordingly, a method will be described for a terminal to send HARQ-ACK feedback to a base station, when the terminal to which partial retransmission has been configured receives downlink transmission. In order to generate the HARQ-ACK information in a unit of a CB group, the terminal configures one or more bits.

Like the method for determining the M as described above, a bit field having the same size as the number M of CB groups is configured, the bits of the bit field may be used as information indicating whether the transmission of the respective CB groups has succeeded, and the bit field may be transferred from the terminal to the base station to be used as the HARQ-ACK feedback information.

For example, if the number of CBs C is 15 and M is 4, $K_+$ becomes 3, and $K_-$ becomes 1. That is, 3 CB groups include $\lceil C/M \rceil = \lceil 15/4 \rceil = 4$ CBs, and one CB group includes $\lfloor C/M \rfloor = \lfloor 15/4 \rfloor = 3$ CBs. Accordingly, CB 1 to CB 4 belong to CB group 1, and CB 5 to CB 8 belong to CB group 2. Further, CB 9 to CB 12 belong to CB group 3, and CB 13 to CB 15 belong to CB group 4. That is, the terminal transmits M-bit HARQ-ACK feedback to the base station using an uplink control channel. If transmission of CB group i has succeeded, the i-th bit is set to 1 in the M-bit HARQ-ACK feedback, and if transmission of CB group i has failed, the i-th bit is set to 0 in the M-bit HARQ-ACK feedback.

This method is also applicable for a terminal to which partial retransmission has been configured to transmit uplink data, and a base station to send the HARQ-ACK feedback to the terminal.

(1-5)-th Embodiment

According to an embodiment of the present disclosure, a method is provided for a terminal to send an HARQ-ACK when transmission of partial CB groups has failed during the initial transmission and retransmission is performed where the terminal to which partial retransmission has been configured receives downlink data.

When the terminal to which partial retransmission has been configured receives the downlink data, the HARQ-ACK feedback for the initial transmission may be performed as described above. If transmission of the partial CB groups has failed during the initial transmission, and the partial retransmission is performed only with respect to the transmission-failed CB groups, the terminal may transmit only the HARQ-ACK bits for the transmitted CB groups to the base station.

For example, if the number C of CBs transmitted during the initial transmission is 15, and M is 4, the terminal may perform the HARQ-ACK transmission for the initial transmission as described above. For example, if the terminal sends the base station feedback of the transmission failure of CB group 2 and CB group 3, the base station can include only CB group 2 and CB group 3 in the retransmission to be transmitted. Even if the terminal sends the base station feedback of the transmission failure of CB group 2 and CB group 3, it may be possible for the base station to retransmit all CB groups in accordance with the judgment of the base station. In this example, a base station includes only CB group 2 and CB group 3 in the retransmission. Accordingly, during the retransmission, only CB group 2 and CB group 3 are included in the retransmission, and a CB group indicator may indicate 0110.

For HARQ-ACK feedback for a partial retransmission, the terminal may configure a bit field, the size of which is different from the size of the bit field of the CB group indicator, but is the same as the size corresponding to the number of CB groups to be partially retransmitted, and transmit the bit field to the base station as the uplink control signal. For example, if only CB group 2 and CB group 3 are included in the retransmission, a 2-bit HARQ-ACK bit field is prepared, in which information on whether retransmitted CB group 2 has succeeded is configured to the first bit, and information on whether retransmitted CB group 3 has succeeded is configured to be transmitted to the base station.

(1-5-1)-th Embodiment

According to an embodiment of the present disclosure, another method is provided for a terminal to send an HARQ-ACK when transmission of partial CB groups has failed during the initial transmission and retransmission is performed, where the terminal to which partial retransmission has been configured receives downlink data.

When the terminal to which partial retransmission has been configured receives the downlink data, the HARQ-ACK feedback for the initial transmission may be performed as described above. If transmission of the partial CB groups has failed during the initial transmission, and the partial retransmission is performed only with respect to the transmission-failed CB groups, the terminal may reorganize M transmitted CB groups, and transmit, to the base station, HARQ-ACK bits having the same size as that of the HARQ-ACK bit for the initial transmission for the transmitted CB groups to the base station.

For example, if the number C of CBs transmitted during the initial transmission is 15, and M is 4, the terminal may perform the HARQ-ACK transmission for the initial transmission as described above.

For example, if the terminal sends the base station feedback of the transmission failure of CB group 2 and CB group 3, the base station can include only CB group 2 and CB group 3 in the retransmission to be transmitted. Even if the terminal sends the base station feedback of the transmission failure of CB group 2 and CB group 3, it may be possible for the base station to retransmit all CB groups in accordance with the judgment of the base station. In this example, the base station includes only CB group 2 and CB group 3 in the retransmission. Accordingly, during the retransmission, only CB group 2 and CB group 3 are included in the retransmission, and a CB group indicator may indicate 0110.

The HARQ-ACK feedback for the partial retransmission includes a bit field having the same size as the bit field of a CB group indicator, and for this, the terminal may reorganize 4 CB groups. Since each of CB group 2 and CB group 3 include 4 CBs, 8 CBs are retransmitted in total. In order to organize 8 CBs into new CB groups, two CBs may be included in one CB group. Accordingly, the terminal prepares a 4-bit HARQ-ACK, and whether transmission of the first and second CBs among 8 retransmitted CBs has succeeded is configured to the first HARQ-ACK, and whether transmission of the third and fourth CBs has succeeded is configured to the second HARQ-ACK. Whether transmission of the fifth and sixth CBs has succeeded is configured to the third HARQ-ACK, and whether transmission of the seventh and eighth CBs has succeeded is configured to the fourth HARQ-ACK to be transmitted to the base station.

If retransmission for the partial retransmission is needed again, the base station may be able to perform retransmission per newly configured CB group.

(1-6)-th Embodiment

The first to sixth embodiments refer to a reception method for a terminal using an HARQ process through the initial transmission, the whole TB retransmission, the whole CB retransmission during downlink transmission.

For respective received TBs and related HARQ operation information, a HARQ process may perform the following operations.

If an NDI value is a value different from a previous value, for a process for broadcasting, for a process for transmitting system information, or first received data, the received data is considered as an initial transmission.

If a CB group indicator and a CB group NDI are disabled or are not transferred in another embodiment, the received data is considered as an entire TB retransmission.

If CB group indicators are all 0 or CB group NDIs all indicate 0 in another embodiment, the received data is considered as an entire TB retransmission.

The received data is considered as CB group partial retransmission.

The terminal may perform the following operations.

If the received data corresponds to an initial transmission, decoding of received data is performed.

If a TB corresponding to received data is not successfully decoded, where the received data corresponds to an entire TB retransmission, the received data and the corresponding TB data of a soft buffer are combined, and decoding of the combined data is performed. The data combining may be performed by combining log-likelihood ratio (LLR) values.

If a TB corresponding to received data is not successfully decoded, where the received data corresponds to a CB group partial retransmission, a portion corresponding to a CB group in which both a CB group indicator and a CB group NDI indicate 1 is combined with the corresponding portion stored in the existing soft buffer, and a portion corresponding to a CB group in which the CB group indicator indicates 1, but the CB group NDI indicates 0 is replaced by a newly received portion while the corresponding portion stored in the existing soft buffer is discarded, and decoding of the combined or replaced data is performed.

If decoding of the data performed for the corresponding TB has succeeded, or the previous decoding of the corresponding TB has succeeded, the terminal performs the following operation.

If a HARQ process is for broadcasting, a decoded MAC PDU is transferred to an upper layer.

If a HARQ process is not for broadcasting and data decoding for the corresponding TB has first succeeded, a decoded MAC PDU is transferred to a place for dissolving and demultiplexing.

An ACK for the corresponding TB is generated.

If data decoding performed for a corresponding TB has not succeeded, and a previous decoding of the corresponding TB has not succeeded, a terminal performs the following operations.

Data of a soft buffer for the corresponding TB is replaced by data of which the decoding has been performed by the terminal.

A NACK for the corresponding TB is generated.

A MAC layer does not transfer the generated ACK or NACK to a physical layer if the HARQ process corresponds to a temporary C-RNTI value or a temporary terminal ID value, if contention resolution has not yet succeeded, if the HARQ process is a process for broadcasting, or if a timer for controlling a timing advance (TA) value is stopped or expires. Alternatively, the generated ACK or NACK is transferred from the MAC layer to the physical layer.

Figure 1N:
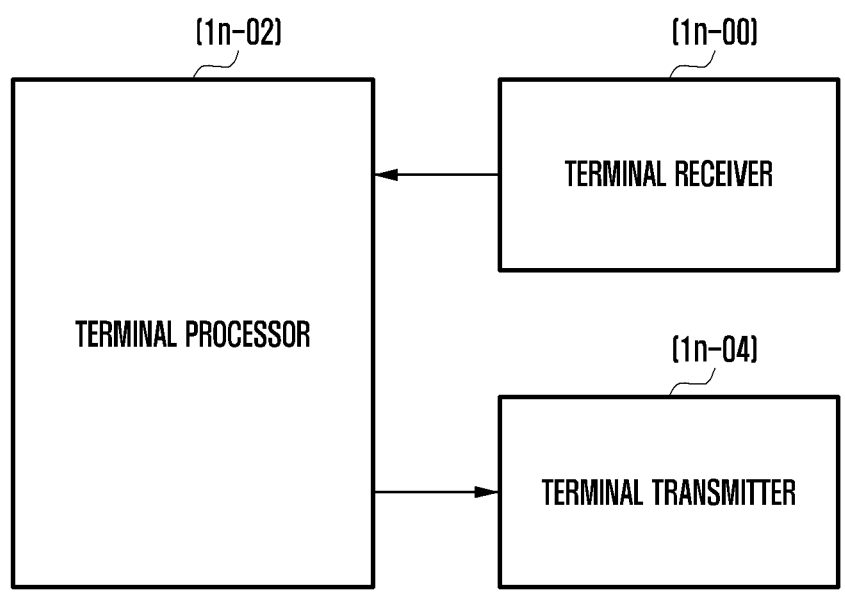
FIG. 1N illustrates a terminal according to an embodiment of the present disclosure.
Figure 10:
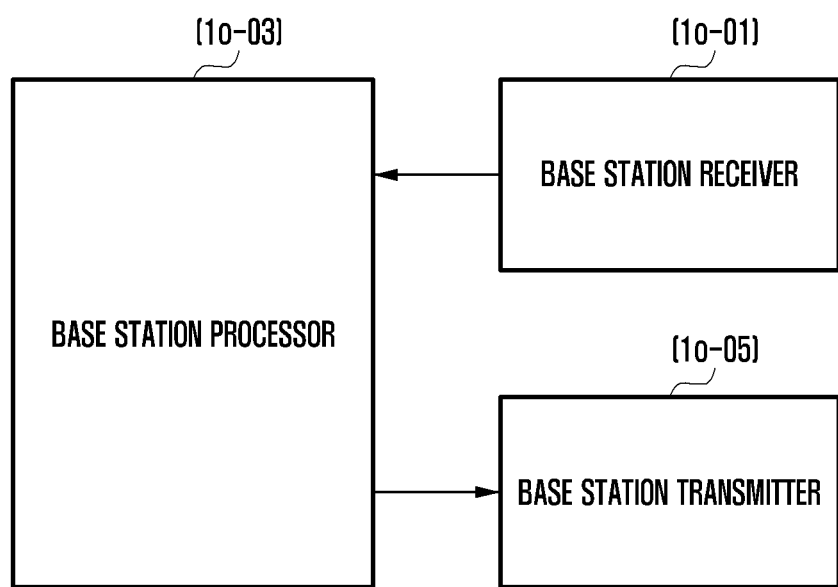

In order to perform the above-described embodiments of the present disclosure, a transmitter, a receiver, and a processor of a terminal or a base station are illustrated in FIG. 1N and FIG. 1O. A transmission/reception method for a base station or a terminal is provided to determine and receive control information for partial retransmission according to the (1-1)-th to (1-6)-th embodiments, and for this, the receiver, the processor, and the transmitter of the base station or the terminal should operate according to the respective embodiments.

FIG. 1N illustrates a terminal according to an embodiment of the present disclosure. Specifically, the terminal in FIG. 1N may perform the above-described methods.

Referring to FIG. 1N, the terminal includes a receiver $1n$-00, a transmitter $1n$-04, and a processor $1n$-02.

Alternatively, the receiver $1n$-00 and the transmitter $1n$-04 may be combined in a transceiver, which transmits/receives signals to/from the base station. The signals may include control information and data. For example, the transceiver may include an RF transmitter up-converting and amplifying the frequency of a transmitted signal, and an RF receiver low-noise-amplifying the received signal and down-converting the frequency of the amplified signal.

Further, the transceiver may receive a signal through a radio channel, output the signal to the processor $1n$-02, and transmit the signal output from the processor $1n$-02 through the radio channel. The processor $1n$-02 may control a series of processes so that the terminal can operate according to the above-described embodiments of the present disclosure. For example, when receiving the data signal from the base station, the receiver $1n$-00 may receive a CB group indicator, a CB group NDI, and data, and the processor $1n$-02 may perform data decoding in accordance with the CB group indicator and the CB group NDI. Thereafter, the transmitter $1n$-04 may transmit HARQ-ACK information that follows the CB group to the base station.

FIG. 1O illustrates a base station according to an embodiment of the present disclosure. Specifically, the base station in FIG. 1O may perform the above-described methods.

Referring to FIG. 1O, the base station includes a receiver $1o$-01, a transmitter $1o$-05, and a processor $1o$-03.

Alternatively, the receiver $1o$-01 and the transmitter $1o$-05 may be combined in a transceiver, which transmits/receives signals to/from the terminal. As described above, the signals may include control information and data. For example, the transceiver may include an RF transmitter up-converting and amplifying the frequency of a transmitted signal, and an RF receiver low-noise-amplifying the received signal and down-converting the frequency of the amplified signal.

Further, the transceiver may receive the signal through a radio channel, output the signal to the processor $1o$-03, and transmit the signal output from the processor $1o$-03 through the radio channel. The processor $1o$-03 may control a series of processes so that the base station can operate according to the above-described embodiments of the present disclosure.

For example, the processor $1o$-03 may operate to determine whether to insert a CB group indicator and a CB group NDI, and to generate the CB group indicator, the CB group NDI information, and corresponding data to be transferred to the terminal. Thereafter, the transmitter $1o$-05 transmits control information including the CB group indicator and the CB group NDI, and the receiver $1o$-01 receives feedback information from each CB group for which the transmission has succeeded.

Further, the processor $1o$-03 may operate to generate DCI including a CB group indicator and a CB group NDI information, or an upper signaling signal. The DCI or the upper signaling may indicate whether code block index information is included in the scheduled signal.

Second Embodiment

Hereinafter, embodiments of the present disclosure will be described in detail with reference to the accompanying drawings.

In explaining the embodiments, explanation of technical contents which are well known in the art to which the present disclosure pertains and are not directly related to the present disclosure will be omitted. This is to transfer the subject matter of the present disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card. Also, in the embodiments, "~unit" may include one or more processors.

A wireless communication system has escaped from an initial voice-oriented service providing system, and has been developed as a broadband wireless communication system that provides high-speed and high-quality packet data services in accordance with the communication standards, such as high speed packet access (HSPA) of 3GPP, long term evolution (LTE) or evolved universal terrestrial radio access (E-UTRA), LTE-advanced (LTE-A), high rate packet data (HRPD) of 3GPP2, ultra-mobile broadband (UMB), and 802.16e of IEEE. Further, for the 5G wireless communication system, 5G or new radio (NR) communication standards have been made.

In the wireless communication system including 5G as described above, at least one service of enhanced mobile broadband (eMBB), massive machine type communications (mMTC), and ultra-reliable and low-latency communications (URLLC) may be provided to the terminal. Hereinafter, in all embodiments of the present disclosure, the eMBB may be a service aiming at high-speed transmission of high-capacity data, the mMTC may be a service aiming at minimization of a terminal power and connection of multiple terminals, and the URLLC may be a service aiming at ultra-reliability and low latency, but are not limited thereto. Further, in all embodiments of the present disclosure, it is assumed that the URLLC service transmission time is shorter than the eMBB or mMTC service transmission time, but is not limited thereto. The three kinds of services as described above may be important scenarios in an LTE system or 5G/new radio or next radio (NR) system beyond LTE.

Hereinafter, embodiments of the present disclosure will be described in detail with reference to the accompanying drawings. In describing the present disclosure, a detailed description of related known functions or configurations will be omitted if it is determined that it obscures the disclosure in unnecessary detail. Further, all terms used in the description are general terms that are widely used in consideration of their functions in the present disclosure, but may differ depending on intentions of a user or an operator, or customs. Accordingly, they should be defined based on the contents of the whole description of the present disclosure. Hereinafter, a base station is a subject that performs resource allocation to a terminal, and may be at least one of an eNode B (or eNB), gNode B (or gNB), Node B, base station (BS), radio connection unit, base station controller, and node on a network. The terminal may include user equipment (UE), mobile station (MS), cellular phone, smart phone, computer, or multimedia system capable of performing a communication function.

In the present disclosure, a downlink (DL) is a radio transmission path of a signal that is transmitted from the base station to the terminal, and an uplink (UL) means a radio transmission path of a signal that is transmitted from the terminal to the base station. Also, embodiments of the present disclosure to be described hereinafter may also be applied to other communication systems having similar technical backgrounds or channel types. Further, the embodiments of the present disclosure may also be applied to other communication systems through partial modifications thereof in a range that does not greatly deviate from the scope of the present disclosure through the judgment of those skilled in the art.

In an LTE system that is a representative example of the broadband wireless communication system, an orthogonal frequency division multiplexing (OFDM) method is adapted for a downlink (DL), and a single carrier frequency division multiple access (SC-FDMA) method is adapted for an uplink (UL). The uplink means a radio link through which a terminal (user equipment (UE) or mobile station (MS)) transmits data or a control signal to a base station (BS or eNode B), and the downlink means a radio link through which the base station transmits data or a control signal to the terminal. In general, the multiple access method as described above may separate data and control information from each other for each user by allocating and operating time-frequency resources on which the data or the control information is carried for each user so that the resources do not overlap each other, that is, so that the orthogonality is realized.

The LTE system adapts a hybrid automatic repeat request (HARQ) method in which a physical layer re-transmits the corresponding data if a decoding failure occurs during initial transmission. The HARQ method enables a receiver to transmit information (negative acknowledgement (NACK)) for notifying a transmitter of the decoding failure if the receiver could not accurately decode the data, so that the transmitter can re-transmit the corresponding data on the physical layer. The receiver combines the data re-transmitted by the transmitter with the previous data of which the decoding has failed to heighten data reception performance. Further, if the receiver has accurately decoded the data, it transmits information (acknowledgement (ACK)) for notifying the transmitter of a decoding success, so that the transmitter can transmit new data.

Figure 2A:
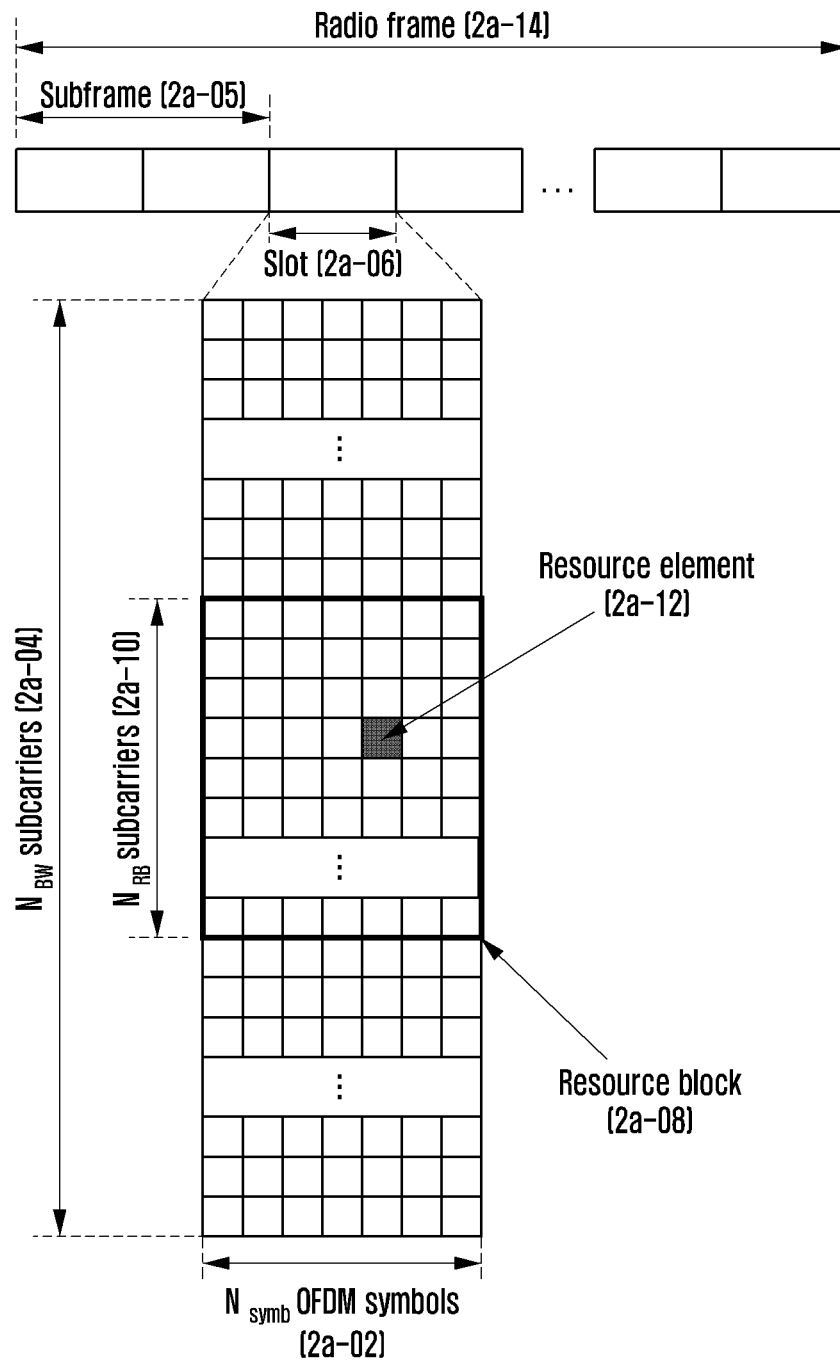
FIG. 2A is a diagram illustrating a basic structure of a time-frequency domain that is a radio resource region in which data or a control channel is transmitted in a downlink in an LTE system or a similar system.

FIG. 2A is a diagram illustrating the basic structure of a time-frequency domain that is a radio resource region from which data or a control channel is transmitted through a downlink in an LTE system.

In FIG. 2A, a horizontal axis represents a time domain, and a vertical axis represents a frequency domain. In the time domain, the minimum transmission unit is an OFDM symbol, and $N_{symb}$ OFDM symbols 2a-02 are gathered to constitute one slot 2a-06, and two slots are gathered to constitute one subframe 2a-05. The length of the slot is 0.5 ms, and the length of the subframe is 0.1 ms. Further, the radio frame 2a-14 is a time domain interval composed of 10 subframes. The minimum transmission unit in the frequency domain is a subcarrier, and the transmission bandwidth of the whole system is composed of $N_{BW}$ subcarriers 2a-04 in total.

In the time-frequency domain, the basic unit of a resource is a resource element (RE) 2a-12, and it may be indicated as an OFDM symbol index and a subcarrier index. A resource block (RB) 2a-08 or a physical resource block (PRB) is defined as $N_{symb}$ successive OFDM symbols 2a-02 in the time domain and $N_{RB}$ successive subcarriers 2a-10 in the frequency domain. Accordingly, one RB 2a-08 is composed of $N_{symb} \times N_{RB}$ REs 2a-12. In general, the minimum transmission unit of data is the RB unit as described above. In the LTE system, it is general that $N_{symb}$ is $N_{symb}=7$, $N_{RB}$ is $N_{RB}=12$, and $N_{BW}$ and $N_{RB}$ are in proportion to the system transmission bandwidth.

The data rate is increased in proportion to the number of RBs being scheduled to a terminal. In the LTE system, 6 transmission bandwidths are defined and operated. In the case of an FDD system that divides and operates a downlink and an uplink through a frequency, the transmission bandwidth of the downlink and the transmission bandwidth of the uplink may differ from each other. The channel bandwidth indicates an RF bandwidth that corresponds to the system transmission bandwidth. Table 1A presents a corresponding relationship between the system transmission bandwidth defined in the LTE system and the channel bandwidth. For example, in the LTE system having the channel bandwidth of 10 MHz, the transmission bandwidth is composed of 50 RBs.

TABLE 7

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

In the case of downlink control information, it is transmitted within the first N OFDM symbols in the subframe. In general, the number N is N={1, 2, 3}. Accordingly, in accordance with the amount of control information to be transmitted in the current subframe, the value N may be varied for each subframe. The control information includes a control channel transmission interval indicator indicating how many OFDM symbols the control information is transmitted through, scheduling information on downlink data or uplink data, and a HARQ ACK/NACK signal.

In the LTE system, the scheduling information on the downlink data or the uplink data is transferred from the base station to the terminal through downlink control information (DCI). The uplink (UL) means a radio link through which the terminal transmits data or a control signal to the base station, and the downlink (DL) means a radio link through which the base station transmits data or a control signal to the terminal.

The DCI is defined in accordance with various formats, and applies and operates a determined DCI format in accordance with whether the scheduling information is uplink data scheduling information (UL grant) or downlink data scheduling information (DL grant), whether the DCI is compact DCI having a small size of control information, whether spatial multiplexing using multiple antennas is applied, or whether the DCI is DCI for power control. For example, DCI format 1 that is the scheduling control information (DL grant) of the downlink data may include at least one of the following control information.

Resource allocation type 0/1 flag: This is to notify whether a resource allocation type is type 0 or type 1. The type 0 allocates resources in the unit of a resource block group (RBG) through applying of a bitmap type. In the LTE system, the basic unit for scheduling is a resource block (RB) that is expressed as a time and frequency domain resource, and the RBG is composed of a plurality of RBs to be considered as the basic unit for scheduling in the type 0. The type 1 allocates a specific RB in the RBG.

Resource block assignment: This notifies of the RB that is allocated for data transmission. The expressed resource is determined in accordance with the system bandwidth and the resource allocation method.

Modulation and coding scheme (MCS): This notifies of a modulation method used for data transmission and the size of a transport block that is data to be transmitted.

HARQ process number: This notifies of the process number of HARQ.

New data indicator: This notifies of whether HARQ transmission is initial transmission or retransmission.

Redundancy version: This notifies of a redundancy version of HARQ.

Transmit power control (TPC) command for physical uplink control channel (PUCCH): This notifies of a transmission power control command for a PUCCH that is an uplink control channel.

The DCI is transmitted through a physical downlink control channel (PDCCH) that is a downlink physical control channel or an enhanced PDCCH (EPDCCH) after passing through a channel coding and modulation process.

In general, the DCI is independently channel-coded with respect to each terminal, and then is configured as an independent PDCCH to be transmitted. In the time domain, the PDCCH is mapped and transmitted for the control channel transmission interval. The mapping location of the frequency domain of the PDCCH is determined by the identifier (ID) of each terminal, and the PDCCH is spread throughout the transmission band of the whole system.

The downlink data may be transmitted on a physical downlink shared channel (PDSCH) that is a physical channel for transmitting the downlink data. The PDSCH may be transmitted after the control channel transmission interval, and scheduling information, such as a concrete mapping location or a modulation method in the frequency domain, is notified by the DCI that is transmitted through the PDCCH.

Through an MCS composed of 5 bits among control information constituting the DCI, the base station notifies the terminal of the modulation method applied to the PDSCH to be transmitted to the terminal and the transport block size (TBS). The TBS corresponds to the size before channel coding for error correction is applied to the transport block (TB) to be transmitted by the base station.

The modulation method supported in the LTE system is quadrature phase shift keying (QPSK), 16 quadrature amplitude modulation (16QAM), or 64QAM, and respective modulation orders (Qm) correspond to 2, 4, and 6. That is, in the case of the QPSK modulation, 2 bits per symbol may be transmitted, and in the case of the 16OQAM modulation, 4 bits per symbol may be transmitted. Also, in the case of the 64QAM modulation, 6 bits per symbol may be transmitted.

In 3GPP LTE Rel-10, bandwidth extension technology has been adopted to support higher data transmission rate as compared with LTE Rel-8. The technology that is called bandwidth extension or carrier aggregation (CA) can increase the data transmission rate for the extended band as compared with LTE Rel-8 terminal that transmits data in one band through extension of the band. The above-described bands may be called component carriers (CCs), and the LTE Rel-8 terminal is prescribed to have one component carrier with respect to downward and upward. Further, tied upward component carriers SIB-2-connected to the downward component carrier may be called a cell. The SIB-2 connection relationship between the downward component carrier and the upward component carrier is transmitted as a system signal or an upper signal. A terminal that supports the CA may receive downward data through a plurality of serving cells, and may transmit upward data.

In Rel-10, in a situation where it is difficult for the base station to send a physical downlink control channel (PDCCH) to a specific terminal in a specific serving cell, it may configure a carrier indicator field (CIF) that is a field notifying that another serving cell transmits the PDCCH, and the corresponding PDCCH indicates a physical downlink shared channel (PDSCH) or a physical uplink shared channel (PUSCH) of another serving cell. The CIF may be configured to the terminal supporting the CA.

The CIF is determined to indicate another serving cell through addition of 3 bits to PDCCH information in the specific serving cell, and is included only when cross carrier scheduling is performed. If the CIF is not included, the cross carrier scheduling is not performed. If the CIF is included in downlink assignment (DL) information, the CIF indicates a serving cell to which the PDSCH that is scheduled by the DL assignment is to be transmitted, and if the CIF is included in the uplink resource assignment information (UL grant), the CIF is defined to indicate the serving cell to which the PUSCH is to be transmitted.

As described above, in LTE-10, the carrier aggregation (CA) that is the bandwidth extension technology is defined, and a plurality of serving cells can be configured to the terminal. Further, for data scheduling of the base station, the terminal periodically or non-periodically transmits channel information for the plurality of serving cells to the base station. The base station schedules data per carrier to transmit the data, and the terminal transmits A/N feedback for the data transmitted per carrier. In LTE Rel-10, maximally 21-bit A/N feedback is designed to be transmitted, and if transmissions of the A/N feedback and the channel information overlap each other in one subframe, it is designed to transmit the A/N feedback, and to discard the channel information. In LTE Rel-11, maximally 22-bit A/N feedback and channel information of one cell are designed to be transmitted from transmission resources of PUCCH format 3 through multiplexing of the channel information of one cell together with the A/N feedback.

In LTE-13, maximally 32 serving cell configuration scenarios are assumed, and the number of serving cells has been extended up to 32 at maximum using not only a licensed band but also unlicensed band. Further, considering that the number of licensed bands, such as LTE frequency, has been limited, the LTE service is provided in a non-licensed band, such as 5 GHz band, and this is called a licensed assisted access (LAA). In the LAA, carrier aggregation technology in an LTE is applied to support that an LTE cell that is a licensed band is operated as a P cell, and an LAA cell that is an unlicensed band is operated as an S cell. Accordingly, feedback generated in the LAA cell that is an S cell like the LTE should be transmitted only from the P cell, and in the LAA cell, downward subframes and upward subframes may be freely applied. Unless separately described in the description, LTE may be called to include all LTE evolved technology, such as LTE-A and LAA.

On the other hand, new radio access technology (NR) that is a beyond LTE communication system, that is, 5G wireless cellular communication system (in the description, referred to as "5G"), is required to freely reflect various requirements of a user and a service provider, and thus services that satisfy the various requirements can be supported.

Accordingly, 5G may be defined as technology to satisfy the requirements selected for respective 5G oriented services, such as enhanced mobile broadband (eMBB, hereinafter referred to as "eMBB" in the description), massive machine type communication (mMTC, hereinafter referred to as "mMTC" in the description), and ultra-reliable and low latency communications (URLLC, hereinafter referred to as "URLLC" in the description), among requirements, such as 20 Gbps of terminal maximum transmission speed, 500 km/h of terminal maximum speed, 0.5 ms of maximum delay time, and 1,000,000 UE/km$^2$ of terminal connection density.

For example, in order to provide eMBB in 5G, from the viewpoint of one base station, it is required to provide 20 Gbps of terminal maximum transmission speed through downlink and to provide 10 Gbps of terminal maximum transmission speed through uplink. At the same time, bodily sensed terminal average transmission speed should be increased. In order to satisfy the requirements as described above, there is a need for improvement of transmission/reception technology including more improved multiple-input multiple-output (MIMO) transmission technology.

Also, in order to support an application service, such as Internet of things (IoT) in 5G, an mMTC is considered. In order to efficiently provide the IoT, the mMTC requires massive terminal connection support, terminal coverage improvement, improved battery time, and terminal cost reduction. Since the IoT is attached to several sensors and various machines to provide communication functions, it is necessary to support large number of terminals (e.g., 1,000,000 UE/km$^2$) in the cell. Further, since there is high possibility that due to the service characteristics, the terminal is located in a shaded area, such as underground of a building or an area where the cell is not covered, a wider coverage than the coverage provided by the eMBB is necessary. There is a high possibility that the mMTC is configured as a cheap terminal, and since it is difficult to frequently exchange the battery of the terminal, a very long battery lifetime is required.

Last, in the case of the URLLC that is a cellular based wireless communication used for a specific purpose, it is a service used for remote control of a robot or machine device, industry automation, unmanned aerial vehicle, remote health care, and emergency situation alarm, and thus it is necessary to provide communication having low latency and ultra-reliability. For example, the URLLC should satisfy the maximum delay time that is shorter than 0.5 ms, and also should satisfy a packet error rate that is equal to or lower than $10^{-5}$. Accordingly, for the URLLC, transmit time interval (TTI) that is shorter than that of a 5G service, such as eMBB, should be provided, and design requirement in which wide resources should be allocated in the frequency band.

Services considered in the 5G wireless cellular communication system as described above should be provided as one framework. That is, for efficient resource management and control, it is preferable the respective services are not independently operated, but are integrally controlled and transmitted as one system.

Figure 2B:
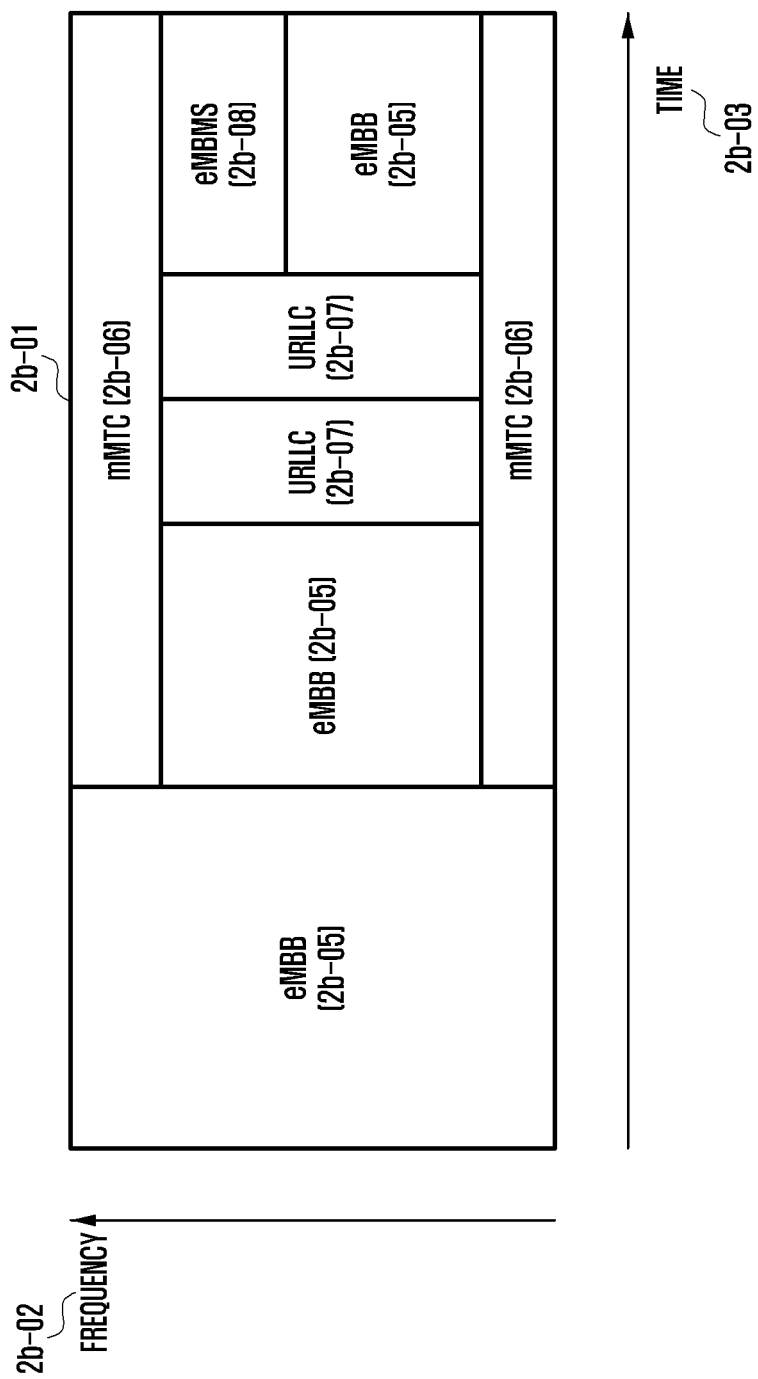
FIG. 2B illustrates services being considered in 5G being multiplexed through one system for transmission.

FIG. 2B illustrates services being considered in 5G being multiplexed through one system to be transmitted.

Referring to FIG. 2B, frequency-time resource 2b-01 used by 5G includes a frequency axis 2b-02 and a time axis 2b-03. In FIG. 2B, eMBB 2b-05, mMTC 2b-06, and URLLC 2b-07 are operated by a 5G base station in one framework. Further, as a service that may be additionally considered in 5G, enhanced mobile broadcast/multimedia service (eMBMS) 2b-08 for providing cellular based broadcasting service is provided.

The services being considered in 5G, such as eMBB 2b-05, mMTC 2b-06, URLLC 2b-07, and eMBMS 2b-08, may be multiplexed to be transmitted through time-division multiplexing (TDM) or frequency division multiplexing (FDM) in one system frequency bandwidth operated by 5G, and spatial division multiplexing may also be considered. For eMBB 2b-05, the maximum frequency bandwidth is transmitted at a specific time to provide increased data transmission speed. Accordingly, in the service of eMBB 2b-05, it is TDM multiplexed with other services in the system transmission bandwidth 2b-01, and it is TDM multiplexed with other services in the system transmission bandwidth as needed by other services.

For mMTC 2b-06, in contrast with other services, in order to secure a wide coverage, increased transmission interval is required, and the coverage may be secured through repeated transmission of the same packet in the transmission interval. In order to reduce complexity of the terminal and the terminal cost, the transmission bandwidth that can be received by the terminal is limited. In consideration of such requirements, mMTC 2b-06 is FDM-multiplexed with other services in the 5G transmission system bandwidth 2b-01.

In order to satisfy low latency requirements requested by the service, URLLC 2b-07 has a short TTI as compared with other services. In order to satisfy ultra-reliable requirements, low coding rate and a wide bandwidth are desirable. In consideration of the requirements of the URLLC 2b-07, the URLLC 2b-07 is TDM-multiplexed with other services in the 5G transmission system bandwidth 2b-01.

In order to satisfy the requirements required by the respective services, the respective services, as described above, may have different transmission/reception technique and transmission/reception parameters. For example, the respective services may have different numerology in accordance with the respective service requirements. Here, the numerology includes a cyclic prefix (CP) length, subcarrier spacing, OFDM symbol length, and a TTI in a communication system based on OFDM or orthogonal frequency division multiple access (OFDMA).

As an example in which the services have different numerologies, eMBMS 2b-08 may have a long CP length as compared with other services. Because eMBMS 2b-08 transmits broadcasting-based upper traffic, the same data can be transmitted in all cells. In this case, as seen from the terminal, if signals received from a plurality of cells arrive within the CP length, the terminal can receive and decode all signals, and thus, single frequency network (SFN) diversity gain can be obtained. Even the terminal located on the boundary can receive the broadcasting information without coverage limit. However, if the CP length is relatively long as compared with that of other services, waste due to CP overhead occurs. A long OFDM symbol length, as compared with that of other services is required, and thus, narrower subcarrier interval as compared with that of other services is required.

As another example in which different numerologies are used between services in 5G, for URLLC, since a short TTI is required, as compared with that of other services, a shorter OFDM symbol length is required, and a wider subcarrier interval may be required.

As described above, in order to satisfy various requirements in 5G, necessity of various services is described, and requirements for the representatively considered services are described.

The frequency range in which 5G is considered to be operated reaches several GHz to several tens of GHz, and in the several GHz band having low frequency, frequency division duplex is preferred rather than TDD, and in the several tens GHz band having high frequency, it is considered that TDD is more suitable than the FDD. However, in contrast with the FDD that seamlessly provides upward/downward transmission resources through putting of separate frequency for the upward/downward transmission, TDD should support both the upward/downward transmission at one frequency, and in accordance with time, provides only the upward resource or downward resource.

If it is assumed that URLLC upward transmission or downward transmission is necessary in the TDD, it becomes difficult to satisfy the low latency requirements required by the URLLC due to the delay up to time when the upward or downward resource appears. Accordingly, for the TDD, in order to satisfy the low latency requirements of the URLLC, there is a need for a method for dynamically changing the subframe upward or downward depending on whether the URLLC data is upward or downward.

However, even when multiplexing services and technologies for beyond 5G phase 2 or beyond 5G in 5G, it is required to provide 5G phase 2 or beyond 5G technology and services so that there is no backward compatibility problem in operating the previous 5G technologies. The requirement conditions are called forward compatibility, and technologies for satisfying the forward compatibility should be considered when designing the initial 5G.

In the initial LTE standardization stage, consideration of the forward compatibility is unprepared, and thus, there may be a limit in providing a new service in the LTE framework. For example, in enhanced machine type communication (eMTC) applied in LTE release-13, communication becomes possible only in the frequency corresponding to 1.4 MHz, regardless of the system bandwidth provided by the serving cell in order to reduce the cost of the terminal through reduction of complexity of the terminal. Accordingly, since the terminal that supports the eMTC cannot receive the PDCCH transmitted over the full band of the existing system bandwidth, a signal is unable to be received at the time interval when the PDCCH is transmitted.

Accordingly, the 5G communication system should be designed so that services considered after the 5G system efficiently coexist with the 5G communication system. In the 5G communication system, for future compatibility, resources can be freely allocated and transmitted so that services to be considered hereafter can be freely transmitted in the time-frequency resource region supported in the 5G communication system. In order to support future compatibility in the 5G communication system, there is a need for a method for freely allocating time-frequency resources FIGS. 2C and 2D illustrate a communication system to which the present disclosure is applied. Schemes proposed according to the present disclosure can be applied to both the system of FIG. 2C and the system of FIG. 2D.

Referring to FIG. 2C, an upper portion illustrates a 5G cell 2c-02 operating in a stand-alone manner in one base station 2c-01. A terminal 2c-04 is a 5G capable terminal having a 5G transmission/reception module. The terminal 2c-04 acquires synchronization through a synchronization signal transmitted from a 5G stand-alone cell 2c-01, receives system information, and then attempts a random access to the 5G base station 2c-01. The terminal 2c-04 additionally configures a 5G non-standalone cell 2c-15 after RRC connection with the 5G stand-alone base station 2c-11 is completed, and transmits and receives data through the 5G stand-alone base station 2c-11 or a 5G non-standalone base station 2c-12.

It is assumed that the duplex type of the 5G stand-alone base station 2c-11 or the 5G non-standalone base station 2c-12 is not limited, and the 5G stand-alone base station 2c-11 and the 5G non-standalone base station 2c-12 are connected together through an ideal backhaul network or a non-ideal backhaul network. Accordingly, when the ideal backhaul network 2c-13 is connected, rapid X2 communication 2c-13 between base stations becomes possible.

In the system illustrated in the lower portion of FIG. 2C, the 5G cell may be provided with a plurality of serving cells.

Referring to FIG. 2D, the upper portion illustrates an LTE cell 2d-02 and 5G cell 2d-03 coexisting in one base station 2d-01 in the network. The terminal 2d-04 may be an LTE capable terminal having an LTE transmission/reception module, a 5G capable terminal having a 5G transmission/reception module, or a terminal having both the LTE transmission/reception module and the 5G transmission/reception module.

The terminal 2d-04 acquires synchronization through a synchronization signal transmitted from the LTE cell 2d-04 or the 5G cell 2d-03, receives system information, and then transmits/receives data through the base station 2d-01 and the LTE cell 2d-o2 or the 5G cell 2d-03. The duplex type of the LTE cell 2d-02 or the 5G cell 2d-03 is not limited. If the LTE cell is a P cell, uplink control transmission is performed through the LTE cell 2d-02, and if the 5G cell is a P cell, the uplink control transmission is performed through the 5G cell 2d-03.

In the system illustrated on the upper portion of FIG. 2D, the LTE cell and the 5G cell may be provided with a plurality of serving cells, and may support 32 serving cells in total. It is assumed that in the network, the base station 2d-01 is provided with both the LTE transmission/reception module (system) and the 5G transmission/reception module (system), and the base station 2d-01 can manage and operate in real time the LTE system and the 5G system For example, when the LTE system and the 5G system operate at different times by dividing resources on time, allocation of the time resource of the LTE system and the 5G system can be dynamically selected. The terminal 2d-04 can know what resources the data reception from the LTE cell 2d-02 and the 5G cell 2d-03 is performed through by receiving a signal indicating allocation of resources (time resource, frequency resource, antenna resource, or space resource) dividedly operated by the LTE cell and the 5G cell.

The lower portion of FIG. 2D illustrates installation of an LTE macro base station 2d-11 for wide coverage in the network and a 5G small base station 2d-12 for data throughput increase. The terminal 2d-14 may be an LTE capable terminal having an LTE transmission/reception module, a 5G capable terminal having a 5G transmission/reception module, or a terminal having both the LTE transmission/reception module and the 5G transmission/reception module.

The terminal 2d-14 acquires synchronization through a synchronization signal transmitted from an LTE base station 2d-11 or a 5G base station 2d-12, receives system information, and then transmits/receives data through the LTE base station 2d-11 and the 5G base station 2d-12. The duplex type of the LTE macro base station 2d-11 or the 5G small base station 2d-12 is not limited. If the LTE cell is a P cell, uplink control transmission is performed through the LTE cell 2d-11, and if the 5G cell is a P cell, the uplink control transmission is performed through the 5G cell 2d-12.

It is assumed that the LTE base station 2d-11 and the 5G base station 2d-12 have an ideal backhaul network or a non-ideal backhaul network. Accordingly, when the ideal backhaul network 2c-13 is connected, rapid X2 communication 2c-13 between base stations becomes possible. Even if the uplink transmission is performed only with respect to the LTE base station 2d-11, it is possible for the 5G base station 2d-12 to receive in real time related control information from the LTE base station 2d-11 through the X2 communication 2d-13.

In the system illustrated in the lower portion of FIG. 2D, the LTE cell and the 5G cell may be provided with a plurality of serving cells, and may support 32 serving cells in total. The base station 2d-11 or 2d-12 can manage and operate in real time the LTE system and the 5G system. For example, when the LTE system and the 5G system are operated at different times by dividing the resources on time, allocation of the time resource of the LTE system and the 5G system can be dynamically selected, and it is possible to transmit the signal to another base station 2d-12 through X2.

The terminal 2d-14 can know what resources the data transmission/reception from the LTE cell 2d-11 and the 5G cell 2d-12 is performed through by receiving a signal indicating allocation of resources (time resource, frequency resource, antenna resource, or space resource) dividedly operated by the LTE cell and the 5G cell.

However, when the LTE base station 2d-11 and the 5G base station 2d-12 have a non-ideal backhaul network 2d-13, rapid X2 communication 2d-13 between base stations becomes impossible. Accordingly, the base station 2d-11 or 2d-12 can semi-statically operate the LTE system and the 5G system.

For example, when the base station 2d-11 operates the LTE system and the 5G system at different times by dividing the resources on time, allocation of the time resource of the LTE system and the 5G system is selected, and the signal is pre-transmitted to another base station 2d-12, so that the resource discrimination between the LTE system and the 5G system becomes possible. The terminal 2d-14 can know what resources the data transmission/reception from the LTE cell 2d-11 and the 5G cell 2d-12 is performed through by receiving a signal indicating allocation of resources (time resource, frequency resource, antenna resource, or space resource) dividedly operated by the LTE cell and the 5G cell from the LTE base station 2d-11 or the 5G base station 2d-12.

In order to explain the method and the apparatus proposed in the embodiments, the terms "physical channel" and "signal" may be used in an LTE or LTE-A system in the related art. However, the contents of the present disclosure may also be applied to a wireless communication system excluding the LTE and LTE-A systems.

Embodiments of the present disclosure can be applied to an FDD or TDD system and also a new type duplex mode (e.g., an LTE frame structure type 3).

Hereinafter, upper signaling or upper signal indicates a signal transfer method from the base station to the terminal using a downlink data channel of a physical layer, or a signal transfer method from the terminal to the base station using an uplink data channel of the physical layer, and refers to transferring between the base station and the terminal through at least one method of RRC signaling, packet data convergence protocol (PDCP) signaling, and MAC CE.

Figure 2E:
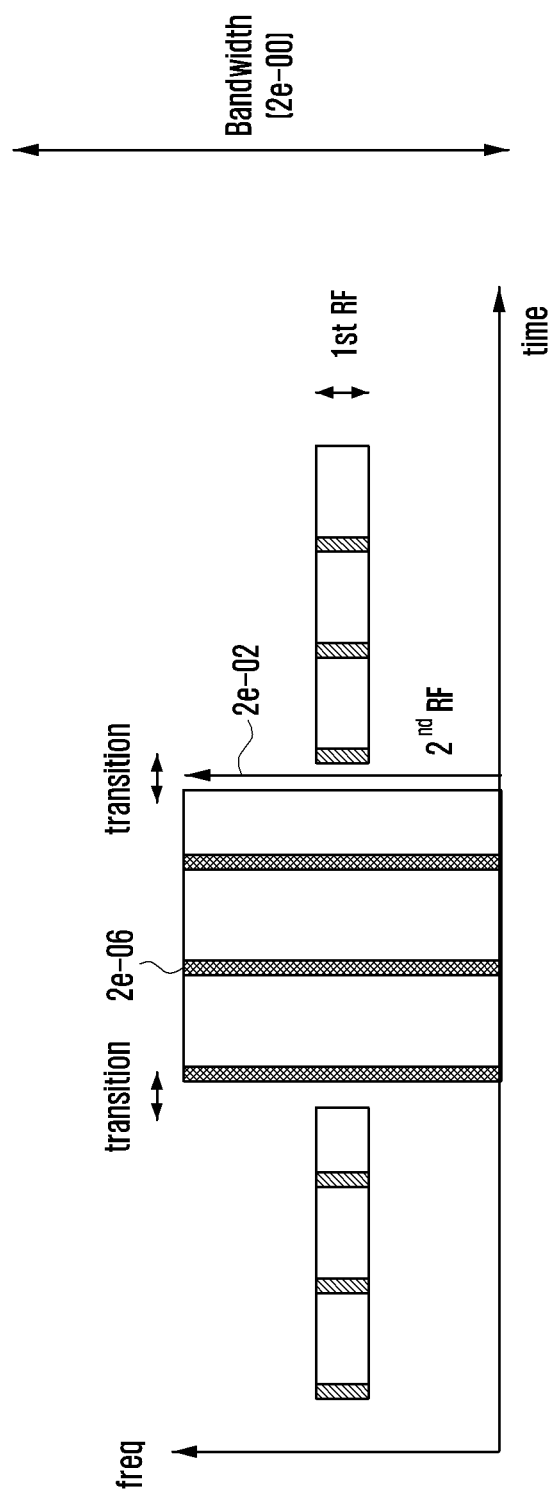
FIG. 2E illustrates a situation to be addressed according to an embodiment the present disclosure.

FIG. 2E illustrates a situation to be addressed according to an embodiment of the present disclosure.

Referring to FIG. 2E, a network, a base station, or a cell may perform communication with a terminal using a partial frequency bandwidth or a frequency resource region, e.g., a frequency resource region that is equal to or smaller than an entire bandwidth 2e-00, such as 2e-02 and 2e-02, among a wireless resource region for the whole downlink or uplink frequency band 2e-00 pre-defined to perform mobile communication with the terminal.

For example, when the base station and the terminal, which can perform communication by adaptively changing the frequency bandwidth, perform communication with each other, or when the base station and the terminal, which can perform communication by adaptively using at least one bandwidth, perform communication with each other, the terminal may be configured from the base station one or more frequency bands used to perform the communication. More specifically, the terminal may transfer, to the base station, supportability (or UE capability) for the minimum or maximum frequency bandwidth that can be supported by the terminal itself, all supportable frequency resource regions, or partial frequency resource region among the frequency band 2e-00 through an RRC signal.

The base station, which has received information on the frequency bandwidth supportable by the terminal or the UE capability, may configure one or more different frequency bandwidths among the frequency bandwidth used to perform downlink or uplink transmission to the terminal through RRC configuration information. The terminal may receive from the base station at least one frequency bandwidth (e.g., minimum frequency bandwidth) transferred through a master information block (MIB) or a system information block (SIB) among the frequency bandwidth used to perform the downlink or uplink transmission with the base station. It is also possible that at least one frequency bandwidth (e.g., a minimum frequency bandwidth) is predefined among the frequency bandwidth used to perform the downlink or uplink transmission to the base station with respect to the carrier frequency for performing the communication, or the bandwidth of a synchronization signal received from the base station in the frequency band may be determined as at least one frequency bandwidth (e.g., a minimum frequency bandwidth) among the frequency bandwidth used to perform the downlink or uplink transmission with the base station.

For convenience in explanation, in performing communication between the base station and the terminal, the smallest frequency bandwidth that the base station has configured to the terminal among the used frequency bandwidth is referred to as a first frequency bandwidth, and a frequency bandwidth having a bandwidth wider than the bandwidth of the first frequency bandwidth is referred to as a second frequency bandwidth. Although an explanation will be made on the assumption that two different frequency bandwidths are used, it is apparent that the technology proposed in the present disclosure is not limited thereto.

If the terminal has the minimum frequency region, the terminal can generally minimize power consumption required for the terminal to perform signal processing, e.g., control signal reception and decoding, and data signal reception and decoding. Accordingly, in performing communication with the base station, it is preferable to minimize the power consumption of the terminal through minimizing of the frequency bandwidth for performing the communication, as compared with the terminal transmitting and receiving a signal on the assumption that a single frequency bandwidth (e.g., maximum frequency bandwidth) is used. However, if the frequency bandwidth is minimized, data throughput becomes lowered while the signal is transmitted or received using a broadband. Accordingly, the frequency bandwidth may be adaptively changed in consideration of the data throughput and the power consumption.

In general, a terminal receives a control channel transmitted from a base station, and receives a downlink signal in accordance with the received control information. Information on a location of the control channel transmitted by the base station or a search space may be predefined or may be configured to the terminal through an upper signal from the base station, a broadcasting channel (e.g., a PBCH), or a channel (e.g., an SIB) for transmitting the system information.

When the base station transmits downlink control information through a control channel, it may be predefined or configured from the base station to the terminal so that control information transmitted only to one terminal, control information commonly transmitted to at least one terminal or a group composed of terminals, and control information transmitted to all terminals that perform communication with the base station are transmitted through different search spaces.

More specifically, the terminal may receive through an MIB or an SIB all or at least one of time or frequency location information of a search space for control information that the base station transmits to a group of terminals or specific terminals, common control information (common control channel, cell-specific control channel, or common control channel).

In order to perform communication with the base station, the terminal may receive through the MIB or the SIB all or at least one of time or frequency information of a search space for a control channel (UE-specific control channel or UE-inherent control channel) that the base station transmits to the terminal.

In configuring the search space location, at least one of the MIB, the SIB, and RRC signals may include at least one of time or frequency location information for the search space. The time or frequency location information for the search space may be predefined between the base station and the terminal, or the terminal may configure the search space through at least one value of a control channel element (CCE) index, a PRB index, and a subband index based on at least one of the frequency band having the smallest frequency bandwidth and a center frequency of the frequency band among the frequency bandwidth configured from the base station. Further, the time or frequency location information for the search space may be predefined between the base station and the terminal, or the terminal may configure the search space through a positive/negative offset value based on at least one of a lowest CCE index, a lowest PRB index, and a lowest subband index of the frequency band having the smallest frequency bandwidth among the frequency bandwidth configured from the base station. Further, the time or frequency location information for the search space may be predefined between the base station and the terminal, or the terminal may configure the search space through a positive/negative offset value based on the center frequency of the frequency band having the smallest frequency bandwidth among the frequency bandwidth configured from the base station.

When the search space location for the common control channel or terminal inherent control channel is configured through the MIB, the SIB, or the RRC signal, the terminal may receive information indicating frequency bandwidth or frequency region change (or increase) from the base station, or the terminal that has determined to require the change of the frequency band should reconfigure the common control channel in the changed frequency bandwidth or the search space location for the terminal inherent control channel.

Herein, the search space location for the common control channel or the terminal inherent control channel through the MIB, SIB, or RRC signal is referred to as a first search space, and the search space location for the common control channel or terminal inherent control channel after changing the frequency bandwidth of the terminal is referred to as a second search space. Further, it is also possible to refer to the search space for the first frequency bandwidth as the first search space, and to refer to the search space for the second frequency bandwidth as the second search space.

Figure 2F:
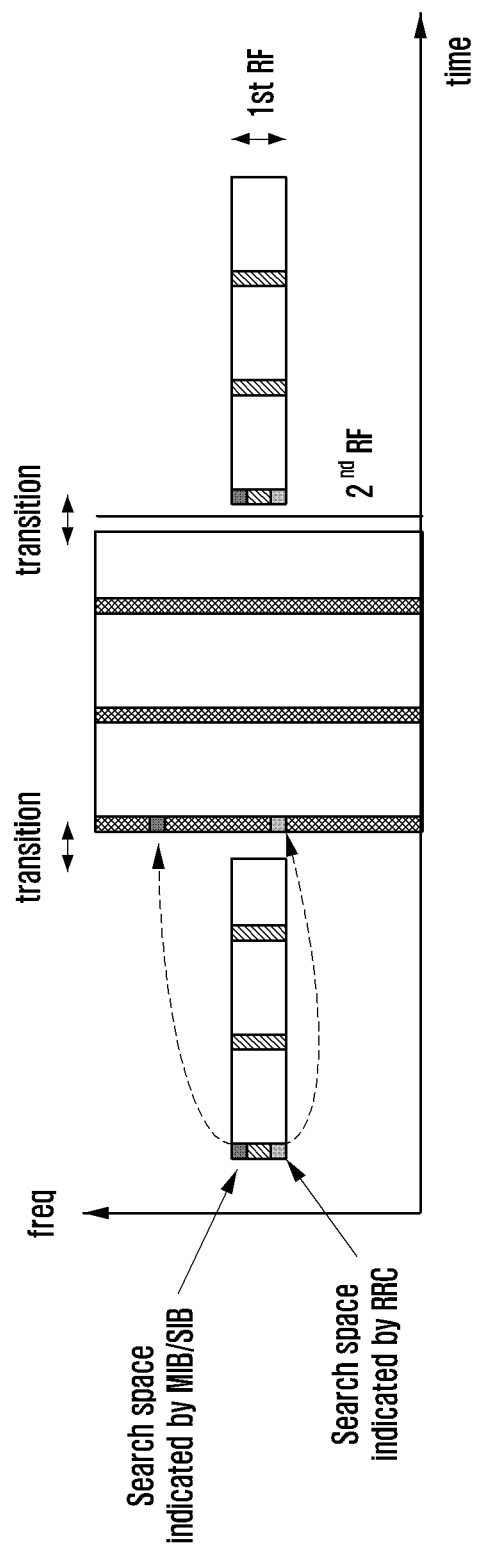
FIGS. 2F and 2G illustrate methods proposed according to embodiments the present disclosure.
Figure 2G:
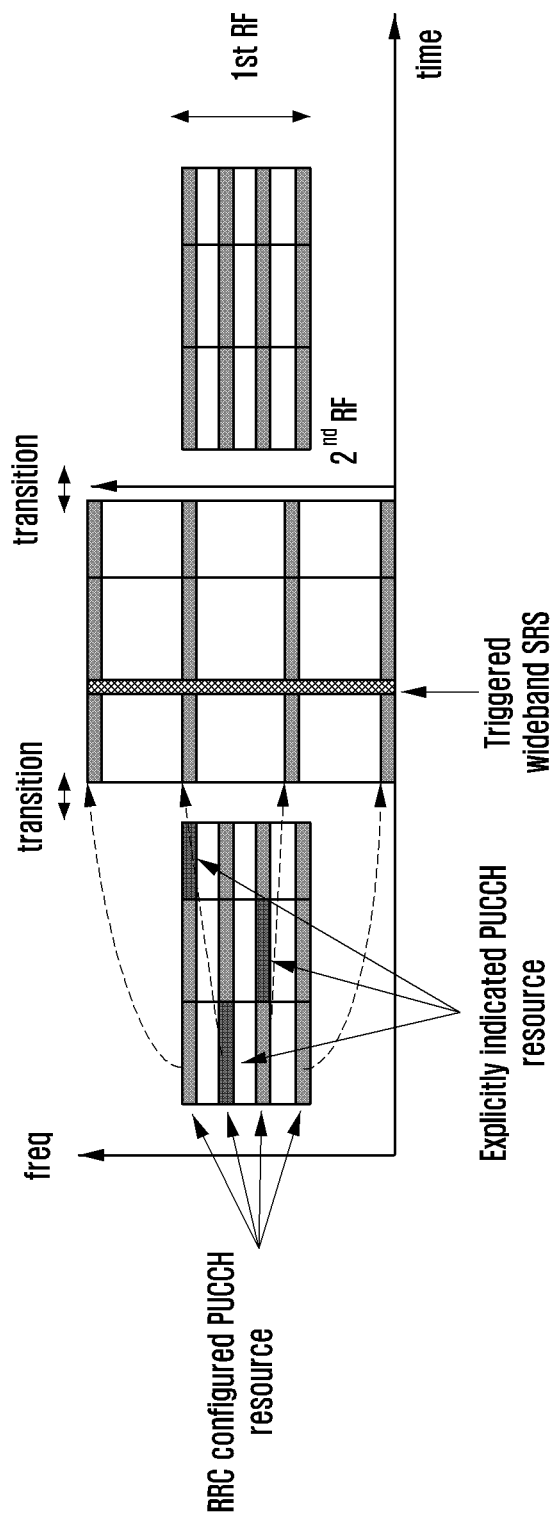

FIGS. 2F and 2G illustrate methods proposed according to embodiments the present disclosure.

Method 1-1: As illustrated in FIG. 2F, if the first frequency bandwidth is included entirely within the second frequency band, the terminal may determine that the first search space and the second search space are the same location. That is, a physical resource location from which the control channel is received is the same as the frequency location.

Method 1-2: As illustrated in FIG. 2F, if the first frequency bandwidth is included entirely within the second frequency band, the terminal may determine that the common control channel of the first search space and the common control channel of the second search space are the same location. That is, a physical resource location from which the control channel is received is the same as the frequency location. The terminal may configure the terminal inherent control channel of the first search space and the terminal inherent control channel of the second search space differently from each other. For example, the search space for the terminal inherent control channel of the second search space may be configured through addition of the positive/negative offset value to the first search space. The offset value may be predefined in accordance with the change of the frequency bandwidth, or the base station may transmit a signal for requesting the bandwidth change to the terminal.

Method 1-3: If at least a part of the first frequency bandwidth is not included in the second frequency band, the terminal may determine that the first search space and the second search space are different locations.

The terminal may configure the second search space through at least one value of a CCE index transmitted through, e.g., an MIB, an SIB, or an RRC signal. For example, the terminal may configure the second search space through at least one value of a CCE index, a PRB index, or a subband index received through the MIB/SIB/RRC signal based on a center frequency of the frequency band in the second frequency bandwidth that the base station has configured to the terminal. The location corresponding to the CCE index, PRB index, or subband index that is received through the MIB/SIB/RRC signal based on at least one of the lowest CCE index, lowest PRB index, and lowest subband index of the second frequency bandwidth may be considered as the second search space, or the second search space may be configured through the received positive/negative offset value.

Method 2: If the base station configures the frequency bandwidth change to the terminal, the second search space information is included in the configuration information to be transmitted, and thus, the terminal may determine the second search space location through reception of the configuration information. The configuration information may include only the search space information (at least one of a CCE index, a PRB index, subband index, and an offset) for the UE-specific control channel among the second search space. The terminal may determine that the search space for the common control channel in the second frequency band is the same as the first search space.

In the same manner as the change of the downlink frequency bandwidth, it is also possible to change the uplink frequency bandwidth. The terminal may transfer to the base station channel information including decoding success/failure (ACK/NACK) for the downlink data channel received from the base station through the PUCCH transmission, and periodic or aperiodic channel information. The terminal may receive a plurality of PUCCH resources used to perform the PUCCH transmission configured from the base station through the RRC signal. The physical resource used for PUCCH transmission may be configured from the base station through the downlink control channel. Accordingly, if the change of the uplink frequency bandwidth is necessary, e.g., when changing the frequency bandwidth or frequency due to the frequency band being wider than the first frequency band or when uplink transmission (e.g., an SRS transmission) in another frequency band is necessary, it is also necessary to reconfigure the PUCCH transmission resource (second PUCCH resource) preconfigured through the upper signal.

Method 3-1: As illustrated in FIG. 2G, if the first frequency bandwidth is included entirely within the second frequency band, the terminal may determine that the first PUCCH resource and the second PUCCH resource are at the same location. That is, a physical resource location from which the PUCCH is transmitted is the same as the frequency location.

Method 3-2: If at least a part of the first frequency bandwidth is not included in the frequency band, the terminal may determine the second PUCCH resource by applying variables used during the configuration of the first PUCCH resource to the second frequency band.

Method 4: The terminal may determine the second PUCCH resource by scaling and applying variables used during the configuration of the first PUCCH resource to the second frequency band in accordance with a ratio of the first frequency bandwidth to the second frequency bandwidth.

For example, for configuring the first PUCCH resource in the first frequency bandwidth, the configured variable, e.g., a PUCCH resource list value is configured to {0, 10, 30, 500}, and if the second frequency bandwidth is twice as wide as the first frequency bandwidth, the second PUCCH resource may be configured to {0, 29, 60, 1000} that is obtained by scaling the variables used to configure the first PUCCH resource. If the maximum value of the variable used to configure the PUCCH transmission resource is fixed to N, the PUCCH resource value may be configured so that it is always equal to or smaller than N by additionally performing a modulo operation for the scaling. For example, if the number N is N=549, the second PUCCH resource may be configured to {0, 20, 60, 451}.

Method 5: If the base station configures frequency bandwidth change to the terminal, the second PUCCH resource information is included in the configuration information to be transmitted, and thus, the terminal may receive the configuration information and may determine the second PUCCH resource information. The second PUCCH resource information included in the configuration information may include at least one of a scaled factor for the first PUCCH resource information and an offset value, and the terminal that has received the configuration information may configure the second PUCCH resource by applying the information to the first PUCCH resource.

On the other hand, embodiments of the present disclosure have been presented to assist those of ordinary skill in the art to gain a comprehensive understanding of the present disclosure, and do not limit the scope of the present disclosure. It will be apparent to those of ordinary skill in the art to which the present disclosure pertains that various modifications are possible based on the technical concept of the present disclosure in addition to the embodiments disclosed herein. Further, if needed, the respective embodiments may be combined with each other to be operated. For example, portions of the embodiments of the present disclosure may be combined with each other to be operated by the base station and the terminal. Further, although the above-described embodiments are presented based on the NR system, they may be applied to other systems, such as a FDD or TDD LTE system, and other modifications based on the technical idea of the embodiments can be embodied.

Although preferred embodiments of the present disclosure have been described in the specification and drawings and specific wordings have been used, these are merely used as general meanings to assist those of ordinary skill in the art to gain a comprehensive understanding of the present disclosure, and do not limit the scope of the present disclosure. It will be apparent to those of ordinary skill in the art to which the present disclosure pertains that various modifications are possible based on the technical concept of the present disclosure in addition to the embodiments disclosed herein.

On the other hand, embodiments of the present disclosure have been presented to assist those of ordinary skill in the art to gain a comprehensive understanding of the present disclosure, and do not limit the scope of the present disclosure. It will be apparent to those of ordinary skill in the art to which the present disclosure pertains that various modifications are possible based on the technical concept of the present disclosure in addition to the embodiments disclosed herein. Further, the respective embodiments may be combined with each other to be operated. For example, portions of the embodiments 3-1 and 3-2 of the present disclosure or portions of embodiments 3-3 and 3-4 may be combined with each other to be operated by the base station and the terminal. Further, although the above-described embodiments are presented based on the FDD LTE system, they may be applied to other systems, such as a TDD LTE system, and 5G or NR system, and other modifications based on the technical idea of the embodiments can be embodied.

As described above, in the present disclosure, the uplink scheduling grant signal and the downlink data signal are called the first signal, and the uplink data signal for the uplink scheduling grant and the HARQ ACK/NACK for the downlink data signal are called the second signal. However, the kinds of the first signal and the second signal as described above are merely exemplary to easily explain the technical contents of the present disclosure and to help understanding of the present disclosure, but are not intended to limit the scope of the present disclosure. That is, it will be apparent to those of ordinary skill in the art to which the present disclosure pertains that other first and second signals can be embodied based on the technical idea of the present disclosure.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method by a base station in a wireless communication system, the method comprising:
    transmitting, to a terminal, first information related to a number of code block groups (CBGs) included in a transport block (TB), wherein the first information is transmitted by radio resource control (RRC) signaling;
    determining the CBGs for the TB based on a number of code blocks (CBs) included in the TB and the first information, wherein the determined CBGs include a first group of a first number of CBs and a second group of a second number of CBs, and wherein the first number of CBs and the second number of CBs are determined based on dividing of the number of CBs included in the TB by the number of CBGs associated with the first information;
    transmitting, to the terminal, data based on the determined CBGs and control information including second information related to transmission of the TB and third information; and
    receiving, from the terminal, feedback information for the TB transmitted based on the determined CBGs,
    wherein the first number of CBs included in the first group is a smallest integer that is larger than or equal to a value obtained by dividing the number of CBs included in the TB by the number of CBGs associated with the first information,
    wherein the second number of CBs included in the second group is a largest integer that is smaller than or equal to the value obtained by dividing the number of CBs included in the TB by the number of CBGs associated with the first information,
    wherein the second information includes resource allocation information related to the transmission of the TB,
    wherein the third information indicates one or more CBGs among the determined CBGs that are transmitted, and
    wherein a bit length of the third information is determined based on the first information.

2. The method of claim 1, wherein the control information further includes fourth information associated with performing hybrid automatic repeat request (HARQ) combining for the transmitted CBG among the determined CBGs.

3. The method of claim 1, further comprising retransmitting, to the terminal, at least one of the CBGs included in the TB based on the feedback information,
    wherein the feedback information includes acknowledgement (ACK) information corresponding to each of the determined CBGs.

4. A method by a terminal in a wireless communication system, the method comprising:
    receiving, from a base station, first information related to a number of code block groups (CBGs) included in a transport block (TB), wherein the first information is transmitted by radio resource control (RRC) signaling;
    receiving, from the base station, data and control information including second information related to transmission of the data and third information;
    determining CBGs included in the data TB based on a number of code blocks (CBs) included in a TB and the first information, wherein the determined CBGs include a first group of a first number of CBs and a second group of a second number of CBs, and wherein the first number of CBs and the second number of CBs are determined based on dividing the number of CBs included in the TB by the number of CBGs associated with the first information;
    decoding the determined CBGs based on the second information and the third information; and
    transmitting, to the base station, feedback information for the determined CBGs based on a result of the decoding,
    wherein the first number of CBs included in the first group is a smallest integer that is larger than or equal to a value obtained by dividing the number of CBs included in the TB by the number of CBGs associated with the first information,
    wherein the second number of CBs included in the second group is a largest integer that is smaller than or equal to the value obtained by dividing the number of CBs included in the TB by the number of CBGs associated with the first information,
    wherein the second information includes resource allocation information related to the transmission of the TB,
    wherein the third information indicates one or more CBGs among the determined CBGs that are received, and
    wherein a bit length of the third information is determined based on the first information.

5. The method of claim 4, wherein the control information further includes fourth information associated with performing hybrid automatic repeat request (HARQ) combining for the received CBG among the determined CBGs.

6. The method of claim 4, further comprising receiving, from the base station, at least one of the CBGs included in the TB based on the feedback information,
    wherein the feedback information includes acknowledgement (ACK) information corresponding to each of the determined CBGs.

7. A base station in a wireless communication system, the base station comprising:
    a transceiver; and
    a controller coupled with the transceiver and configured to:
        transmit, to a terminal, first information related to a number of code block groups (CBGs) included in a transport block (TB), wherein the first information is transmitted by radio resource control (RRC) signaling,
        determine the CBGs for the TB based on a number of code blocks (CBs) included in the TB and the first information, wherein the determined CBGs include a first group of a first number of CBs and a second group of a second number of CBs, and wherein the first number of CBs and the second number of CBs are determined based on dividing of the number of CBs included in the TB by the number of CBGs associated with the first information,
        transmit, to the terminal, data based on the determined CBGs and control information including second information related to transmission of the TB and third information, and
        receive, from the terminal, feedback information for the TB transmitted based on the determined CBGs,
    wherein the first number of CBs included in the first group is a smallest integer that is larger than or equal to a value obtained by dividing the number of CBs included in the TB by the number of CBGs associated with the first information,
    wherein the second number of CBs included in the second group is a largest integer that is smaller than or equal to the value obtained by dividing the number of CBs included in the TB by the number of CBGs associated with the first information,
    wherein the second information includes resource allocation information related to the transmission of the TB,
    wherein the third information indicates one or more CBGs among the determined CBGs that are transmitted, and
    wherein a bit length of the third information is determined based on the first information.

8. The base station of claim 7, wherein the control information further includes fourth information associated with performing hybrid automatic repeat request (HARQ) combining for the transmitted CBG among the determined CBGs.

9. The base station of claim 7, wherein the controller is further configured to retransmit, to the terminal, at least one of the CBGs included in the TB based on the feedback information, and
    wherein the feedback information includes acknowledgement (ACK) information corresponding to each of the determined CBGs.

10. A terminal in a wireless communication system, the terminal comprising:
    a transceiver; and
    a controller coupled with the transceiver and configured to:
        receive, from a base station, first information related to a number of code block groups (CBGs) included in a transport block (TB), wherein the first information is transmitted by radio resource control (RRC) signaling,
        receive, from the base station, data and control information including second information related to transmission of the data and third information,
        determine CBGs included in the data based on a number of code blocks (CBs) included in a TB and the first information, wherein the determined CBGs include a first group of a first number of CBs and a second group of a second number of CBs, and wherein the first number of CBs and the second number of CBs are determined based on dividing the number of CBs included in the TB by the number of CBGs associated with the first information,
        decode the determined CBGs based on the second information and the third information, and
        transmit, to the base station, feedback information for the determined CBGs based on a result of the decoding, wherein the first number of CBs included in the first group is a smallest integer that is larger than or equal to a value obtained by dividing the number of CBs included in the TB by the number of CBGs associated with the first information, wherein the second number of CBs included in the second group is a largest integer that is smaller than or equal to the value obtained by dividing the number of CBs included in the TB by the number of CBGs associated with the first information, wherein the second information includes resource allocation information related to the transmission of the TB, wherein the third information indicates one or more CBGs among the determined CBGs that are received, and wherein a bit length of the third information is determined based on the first information.

11. The terminal of claim 10, wherein the control information further includes fourth information associated with performing hybrid automatic repeat request (HARQ) combining for the received CBG among the determined CBGs.

12. The terminal of claim 10, wherein the controller is further configured to receive, from the base station, at least one of the CBGs included in the TB based on the feedback information, and wherein the feedback information includes acknowledgement (ACK) information corresponding to each of the determined CBGs.

* * * * *